(12) United States Patent
Talebi Fard et al.

(10) Patent No.: US 11,405,851 B2
(45) Date of Patent: Aug. 2, 2022

(54) CLOSED ACCESS GROUP OVERLOAD AND CONGESTION CONTROL

(71) Applicant: Ofinno, LLC, Reston, VA (US)

(72) Inventors: Peyman Talebi Fard, Sterling, VA (US); Esmael Dinan, McLean, VA (US); Jinsook Ryu, Herndon, VA (US); Kyungmin Park, Vienna, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 77 days.

(21) Appl. No.: 16/897,113

(22) Filed: Jun. 9, 2020

(65) Prior Publication Data
US 2020/0389835 A1    Dec. 10, 2020

Related U.S. Application Data

(60) Provisional application No. 62/859,351, filed on Jun. 10, 2019.

(51) Int. Cl.
| | |
|---|---|
| *H04W 28/04* | (2009.01) |
| *H04W 48/04* | (2009.01) |
| *H04W 76/16* | (2018.01) |
| *H04W 8/18* | (2009.01) |
| *H04W 28/02* | (2009.01) |
| *H04W 12/40* | (2021.01) |
| *H04W 12/76* | (2021.01) |

(52) U.S. Cl.
CPC .......... *H04W 48/04* (2013.01); *H04W 8/186* (2013.01); *H04W 12/40* (2021.01); *H04W 12/76* (2021.01); *H04W 28/0289* (2013.01); *H04W 76/16* (2018.02)

(58) Field of Classification Search
None
See application file for complete search history.

(56) References Cited

U.S. PATENT DOCUMENTS

| | | | |
|---|---|---|---|
| 9,603,044 B2 | 3/2017 | Zhang et al. | |
| 2019/0159108 A1 | 5/2019 | Lee et al. | |
| 2020/0163140 A1* | 5/2020 | Mochizuki | ............ H04W 88/06 |

(Continued)

FOREIGN PATENT DOCUMENTS

| | | |
|---|---|---|
| WO | 2018008927 | 1/2018 |
| WO | 2018128458 | 7/2018 |
| WO | 2019030429 | 2/2019 |

OTHER PUBLICATIONS

3GPP TS 22.261 V16.7.0 (Mar. 2019); Technical Specification; 3rd Generation Partnership Project; Technical Specification Group Services and System Aspects; Service requirements for the 5G system; Stage 1; (Release 16).

(Continued)

*Primary Examiner* — Brandon M Renner
(74) *Attorney, Agent, or Firm* — Sachin Kandhari; Kavon Nasabzadeh; Philip R. Smith

(57) ABSTRACT

A wireless device receives from a base station, barring information for a closed access group. The barring information comprises a first closed access group identifier (CAG ID). The wireless device determines a barring decision based on the first CAG ID. The first CAG ID is an authorized CAG ID of the wireless device. Based on the barring decision, the wireless device sends to the base station, an access request associated with the first CAG ID.

20 Claims, 39 Drawing Sheets

(56) References Cited

U.S. PATENT DOCUMENTS

| | | | | |
|---|---|---|---|---|
| 2020/0351755 | A1* | 11/2020 | Huang-Fu | H04W 8/186 |
| 2021/0029581 | A1* | 1/2021 | Kim | H04W 28/0289 |
| 2021/0092634 | A1* | 3/2021 | Kang | H04W 28/0247 |
| 2021/0126753 | A1* | 4/2021 | Mochizuki | H04L 5/0037 |
| 2021/0136659 | A1* | 5/2021 | Ianev | H04W 28/02 |

OTHER PUBLICATIONS

3GPP TS 23.501 V16.0.2 (Apr. 2019); Technical Specification; 3rd Generation Partnership Project; Technical Specification Group Services and System Aspects; System Architecture for the 5G System; Stage 2; (Release 16).

3GPP TS 23.502 V16.0.2 (Apr. 2019); Technical Specification; 3rd Generation Partnership Project; Technical Specification Group Services and System Aspects; Procedures for the 5G System; Stage 2; (Release 16).

3GPP TS 24.501 V16.0.2 (Mar. 2019); Technical Specification; 3rd Generation Partnership Project; Technical Specification Group Core Network and Terminals; Non-Access-Stratum (NAS) protocol for 5G System (5GS); Stage 3 Release 16).

3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).

3GPP TS 38.304 V15.3.0 (Mar. 2019); Technical Specification; 3rd Generation Partnership Project; Technical Specification Group Radio Access Network; NR; User Equipment (UE) procedures in Idle mode and RRC Inactive state; (Release 15).

3GPP TS 38.331 V15.5.1 (Apr. 2019); Technical Specification; 3rd Generation Partnership Project; Technical Specification Group Radio Access Network; NR; Radio Resource Control (RRC) protocol specification; (Release 15).

3GPP TS 38.413 V15.3.0 (Mar. 2019); Technical Specification; 3rd Generation Partnership Project; Technical Specification Group Radio Access Network; NG-RAN; NG Application Protocol (NGAP); (Release 15).

"RP-190729 Private Network Support for NG-RAN; 3GPP TSG RAN Meeting #83; Shenzhen, China, Mar. 18-21, 2019 (revision of RP-190677); ; Source:China Telecom; Title:New Work Item Proposal on Private Network Support for NG-RAN; Document forApproval."

"S2-1905028_CAG and Network Slice Selection; 3GPP TSG-SA WG2 Meeting #133; 8 Reno, Nevada (USA), May 13-17, 2019; ; Source:Ericsson, China Mobile; Title:Discussion of CAG and Network Slice Selection; Agenda item:6.15.3."

"S2-1905029-CR-CAG and Network Slice Selection; 3GPP TSG-SA WG2 Meeting #133; 9 Reno, Nevada (USA), May 13-17, 2019; CR-Form-v11.4; ; Change Request."

"S2-1905030_23501-NPN-and-UAC; 3GPP TSG-SA WG2 Meeting #133; 0 Reno (NV), USA, May 13-17, 2019rev of S2-190xxxx; CR-Form-v11.4; ; Change Request."

"S2-1905215 LS Vertical LAN Access; 3GPP SA WG2 Meeting #133TD ; 5 Reno, NV, USA, May 13-17, 2019; ; Title:[DRAFT] LS on Access to NPN cells; Response to:-; Release:Release 16."

"S2-1905278-23501-emergency CAG-r3; 3GPP TSG-SA WG2 Meeting #133 ; 8 Reno, NV, USA, May 13-17, 2019; CR-Form-v11.2; ; Change Request."

"S2-1905309-S-NSSAI-op-def-access categories; 3GPP TSG-SA WG2 Meeting #133; 9 Reno (NV), USA, May 13-17, 2019; CR-Form-v11.4; ; Change Request."

"S2-1905310-DP-applying-UAC-for-NPN-access-control; 3GPP TSG-SA WG2 Meeting #133; 0 Reno (NV), USA, May 13-17, 2019; Source:OPPO; Title:Unified access control for access control of SNPN and CAG capable UEs; Agenda item:6.15.3; Document for:Discussion and action."

"S2-1905314-rev-of-3488-CR-23501-UAC-for-NPN-CAG; 3GPP TSG-SA WG2 Meeting #133; 4 Reno (NV), USA, May 13-17, 2019rev of S2-1903488; CR-Form-v11.4; ; Change Request."

"S2-1905791_NPN_sharing_Emer; SA WG2 Meeting #S2-133; 1 May 13-17, 2019, Reno, NV, US; ; Source:Intel; Title:On RAN sharing and Emergency services with Non-Public Networks; Document for:Approval."

"S2-1906547_was05030_23501-NPN-and-UAC; 3GPP TSG-SA WG2 Meeting #133; 7 Reno (NV), USA, May 13-17, 2009revof S2-190xxxx; CR-Form-v11.4; ; Change Request."

"S2-1906548-rev-of-S2-1905309-S-NSSAI-op-def-access categories; 3GPP TSG-SA WG2 Meeting #133; 8 Reno (NV), USA, May 13-17, 2019rev of S2-1905309; CR-Form-v11.4; ; Change Request."

"S2-1906549_was05029-CR-CAG and Network Slice Selection; 3GPP TSG-SA WG2 Meeting #133; 9 Reno, Nevada (USA), May 13-17, 2019; CR-Form-v11.4; ; Change Request."

"S2-1906702_was06547_was05030_23501-NPN-and-UAC; 3GPP TSG-SA WG2 Meeting #133; 2 Reno (NV), USA, May 13-17, 2019rev of S2-1906547; CR-Form-v11.4; ; Change Request."

"S2-1906705 was S2-1906552_Update and enforcement of new Allowed CAG list and CAG-only indication; 3GPP TSG-SA2 Meeting #133; 5 Reno, NV, USA, May 13-17, 2019was S2-1906552; CR-Form-v11.4; ; Change Request."

"S2-1906706_was06549_was05029-CR-CAG and Network Slice Selection; 3GPP TSG-SA WG2 Meeting #133; 6 Reno, Nevada (USA), May 13-17, 2019; CR-Form-v11.4; ; Change Request."

"S2-1906774_was06702_was06547_was05030_23501-NPN-and-UAC; 3GPP TSG-SA WG2 Meeting #133; 4 Reno (NV), USA, May 13-17, 2019rev of S2-1906702; CR-Form-v11.4; ; Change Request."

Extended European Search Report, dated Nov. 19, 2020, in European Patent Application No. 20179170.4.

R2-1900761; 3GPP TSG RAN WG2 Meeting #105; Athens, Greece, Feb. 25-Mar. 1, 2019; Agenda item: 11.13; Source: Intel Corporation; Title: RAN2 impact on Non-Public Network Deployment using CAG; Document for: Discussion/Decision.

S2-1905803; 3GPP TSG-SA2 Meeting #133; Reno, Nevada, United States, May 13-May 17, 2019; Source to WG: ORANGE; Source to TSG: S2; Title: Back-off timer enforcement.

* cited by examiner

CM State Transition in UE

CM State Transition in AMF

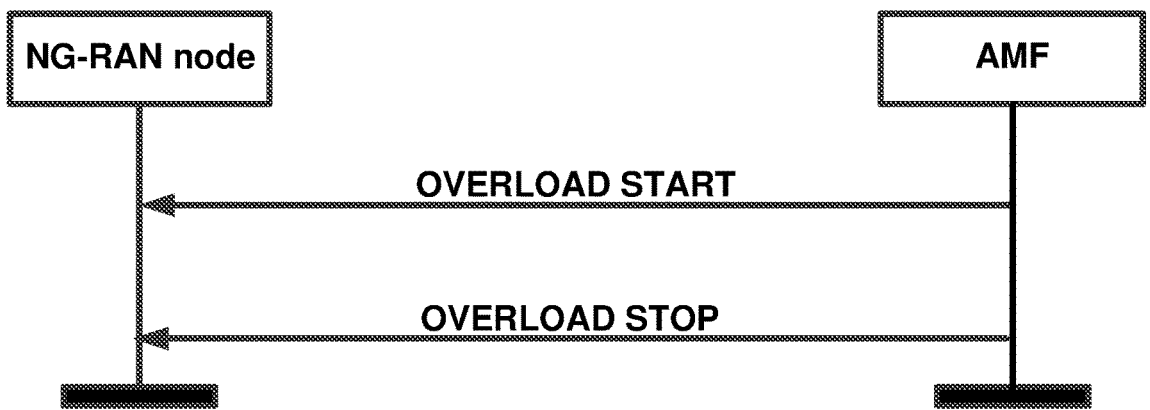

OVERLOAD START

| IE/Group Name | Presence | Range | IE type and reference | Criticality | Assigned Criticality |
|---|---|---|---|---|---|
| Message Type | M | | | YES | ignore |
| AMF Overload Response | O | | Overload Response | YES | reject |
| AMF Traffic Load Reduction Indication | O | | Traffic Load Reduction Indication | YES | ignore |
| Overload Start CAG List | | 0..1 | | YES | ignore |
| >Overload Start CAG Item | | 1..<max noofCAGItems> | | - | |
| >>CAG Overload List | M | | | - | |
| >>CAG Overload Response | O | | Overload Response | - | |
| >>CAG Traffic Load Reduction Indication | O | | Traffic Load Reduction Indication | - | |

FIG. 19

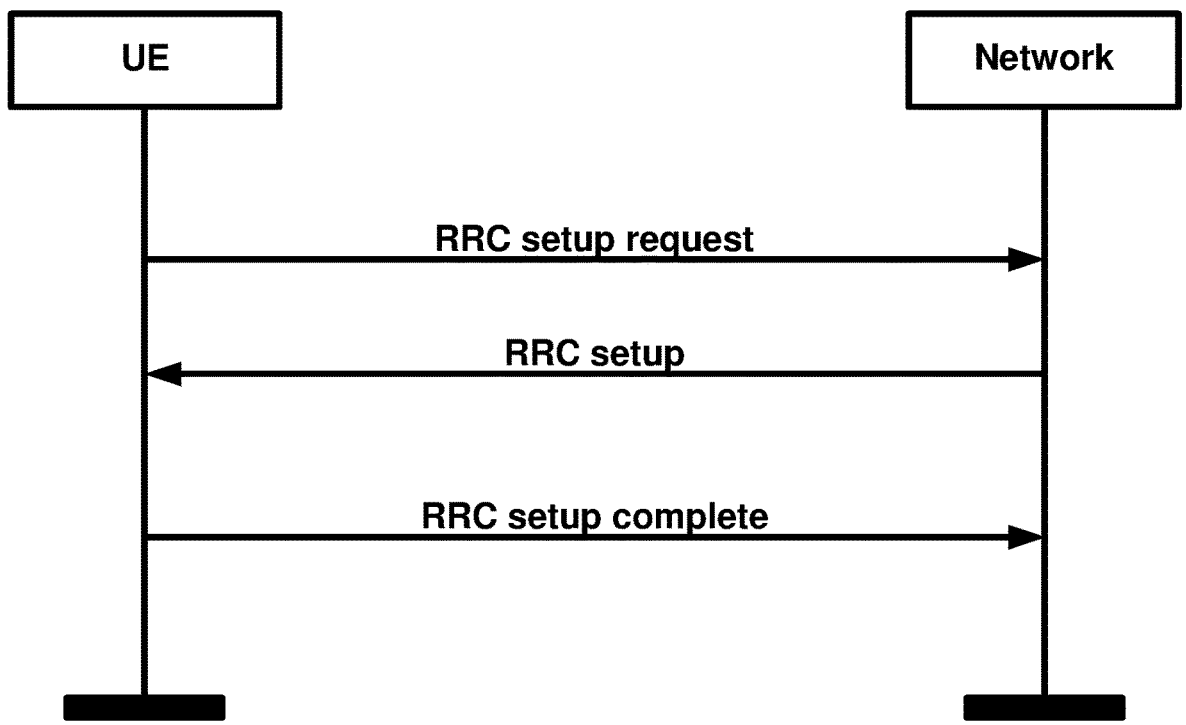
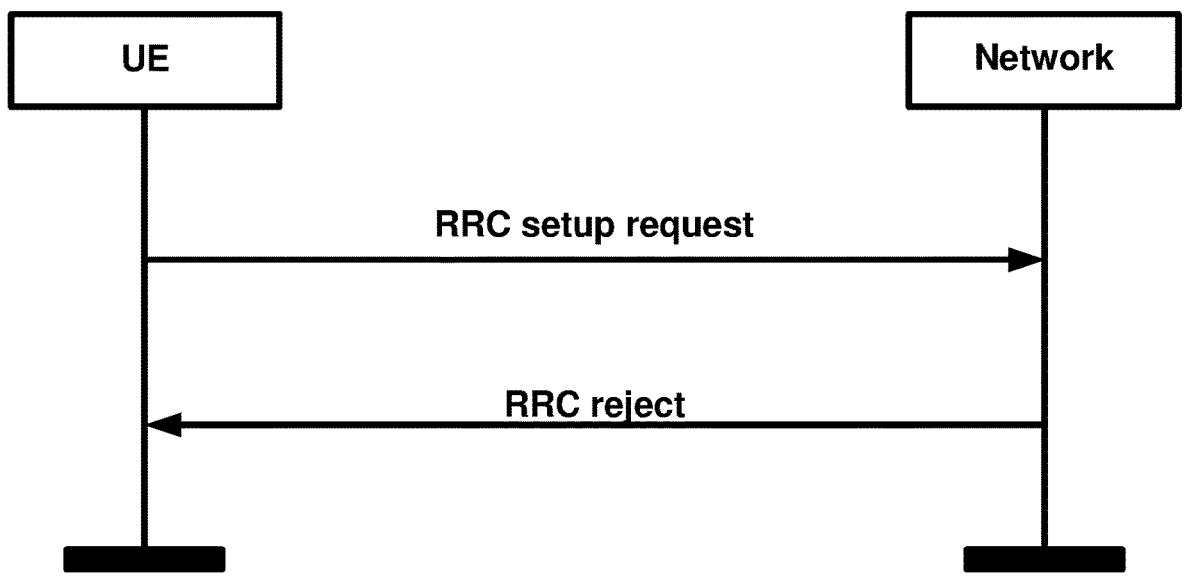
FIG. 22

```
┌─────────────────────────────────────────────────────────────┐
│   Base station receives from a network entity of a core     │
│   network, a message indicating a start of an overload of   │
│   the core network, the message comprising a 1st CAG ID     │
│                          3910                                │
└─────────────────────────────────────────────────────────────┘
                              │
                              ▼
┌─────────────────────────────────────────────────────────────┐
│  Base station sends to a wireless device, barring           │
│  information for a closed access group, the barring         │
│  information comprising the 1st CAG ID.                     │
│                          3920                                │
└─────────────────────────────────────────────────────────────┘
                              │
                              ▼
┌─────────────────────────────────────────────────────────────┐
│   Base station receives from the wireless device, an        │
│   access request based on a barring decision by the         │
│   wireless device.                                           │
│                          3930                                │
└─────────────────────────────────────────────────────────────┘
```

FIG. 39

CLOSED ACCESS GROUP OVERLOAD AND CONGESTION CONTROL

CROSS-REFERENCE TO RELATED APPLICATIONS

This application claims the benefit of U.S. Provisional Application No. 62/859,351, filed Jun. 10, 2019, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 19 is an example call flow as per an aspect of an embodiment of the present disclosure.

FIG. 22 is an example diagram as per an aspect of an embodiment of the present disclosure.

FIG. 39 is a flow chart of an aspect of an example embodiment of the present disclosure.

DETAILED DESCRIPTION OF EXAMPLES

Figure 1:
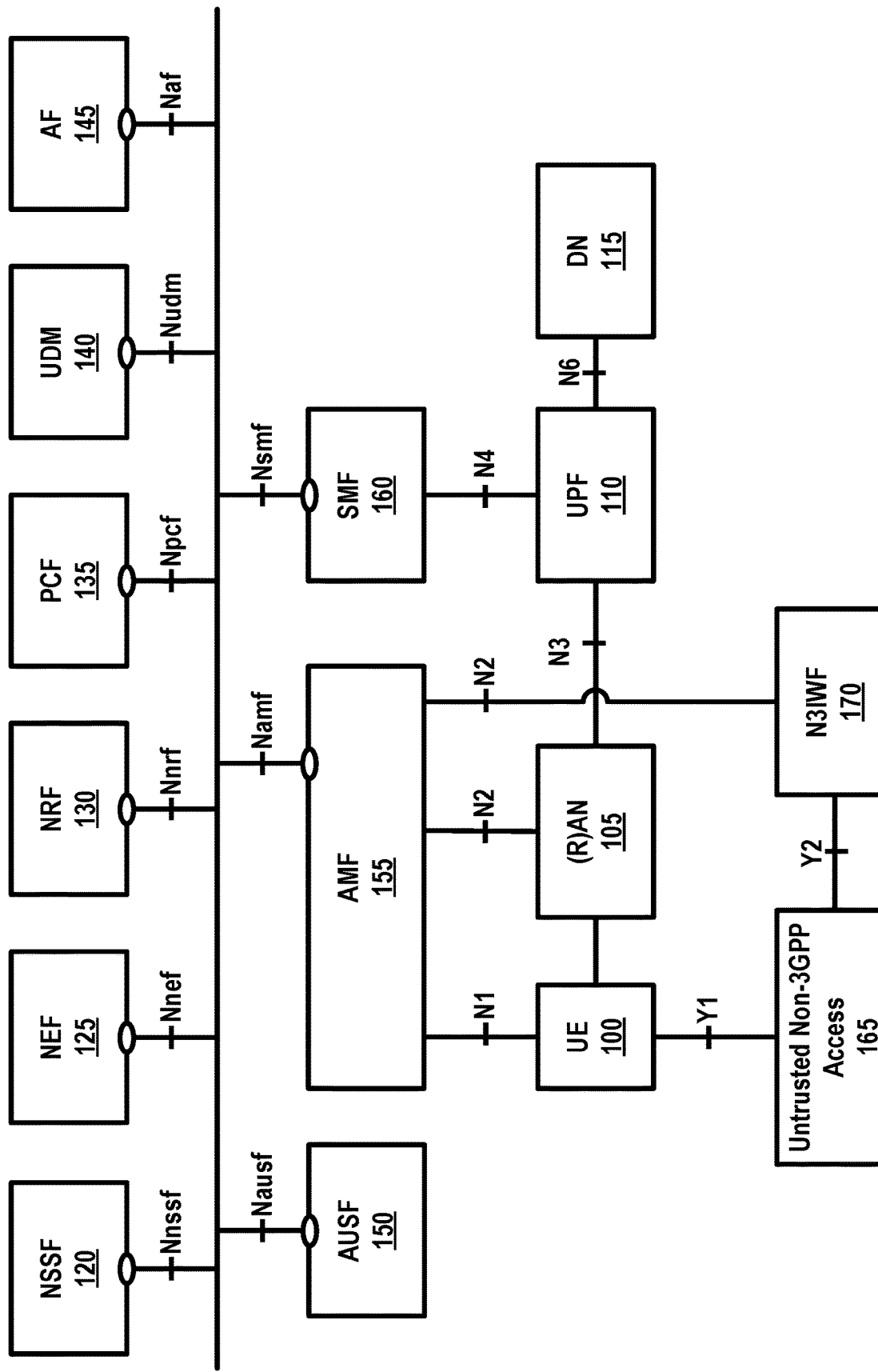
FIG. 1 is a diagram of an example 5G system architecture as per an aspect of an embodiment of the present disclosure.

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

The following acronyms are used throughout the present disclosure:

| | |
|---|---|
| 5G | 5th generation mobile networks |
| 5GC | 5G Core Network |
| 5GS | 5G System |
| 5G-AN | 5G Access Network |
| 5QI | 5G QoS Indicator |
| AF | Application Function |
| AMF | Access and Mobility Management Function |
| AN | Access Network |
| CAG | Closed Access Group |
| CDR | Charging Data Record |
| CCNF | Common Control Network Functions |
| CIoT | Cellular IoT |
| CN | Core Network |
| CP | Control Plane |
| DDN | Downlink Data Notification |
| DL | Downlink |
| DN | Data Network |
| DNN | Data Network Name |
| F-TEID | Fully Qualified TEID |
| GPSI | Generic Public Subscription Identifier |
| GTP | GPRS Tunneling Protocol |
| GUTI | Globally Unique Temporary Identifier |
| HFN | Hyper Frame Number |

-continued

| | |
|---|---|
| HO | Handover |
| IMSI | International Mobile Subscriber Identity |
| LADN | Local Area Data Network |
| LI | Lawful Intercept |
| MEI | Mobile Equipment Identifier |
| MICO | Mobile Initiated Connection Only |
| MME | Mobility Management Entity |
| MO | Mobile Originated |
| MSISDN | Mobile Subscriber ISDN |
| MT | Mobile Terminating |
| N3IWF | Non-3GPP InterWorking Function |
| NAI | Network Access Identifier |
| NAS | Non- Access Stratum |
| NB-IoT | Narrow Band IoT |
| NEF | Network Exposure Function |
| NF | Network Function |
| NGAP | Next Generation Application Protocol |
| NR | New Radio |
| NRF | Network Repository Function |
| NPN | Non Public Network |
| NSI | Network Slice Instance |
| NSSAI | Network Slice Selection Assistance Information |
| NSSF | Network Slice Selection Function |
| OCS | Online Charging System |
| OFCS | Offline Charging System |
| PCF | Policy Control Function |
| PDCP | Packet Data Convergence Protocol |
| PDU | Packet/Protocol Data Unit |
| PEI | Permanent Equipment Identifier |
| PLMN | Public Land Mobile Network |
| RAN | Radio Access Network |
| RLC-AM | Radio Link Control Acknowledge mode |
| QFI | QoS Flow Identity |
| RM | Registration Management |
| RRM | Radio Resource Management |
| Sl-AP | S1 Application Protocol |
| SBA | Service Based Architecture |
| SEA | Security Anchor Function |
| SCM | Security Context Management |
| SMF | Session Management Function |
| SMSF | SMS Function |
| S-NSSAI | Single Network Slice Selection Assistance information |
| SSB | Synchronization Signal Block |
| SUCI | Served User Correlation ID |
| SUPI | Subscriber Permanent Identifier |
| TA | Tracking Area |
| TEID | Tunnel Endpoint Identifier |
| TSN | Time Sensitive Networking |
| UE | User Equipment |
| UL | Uplink |
| UL CL | Uplink Classifier |
| UPF | User Plane Function |

Figure 2:
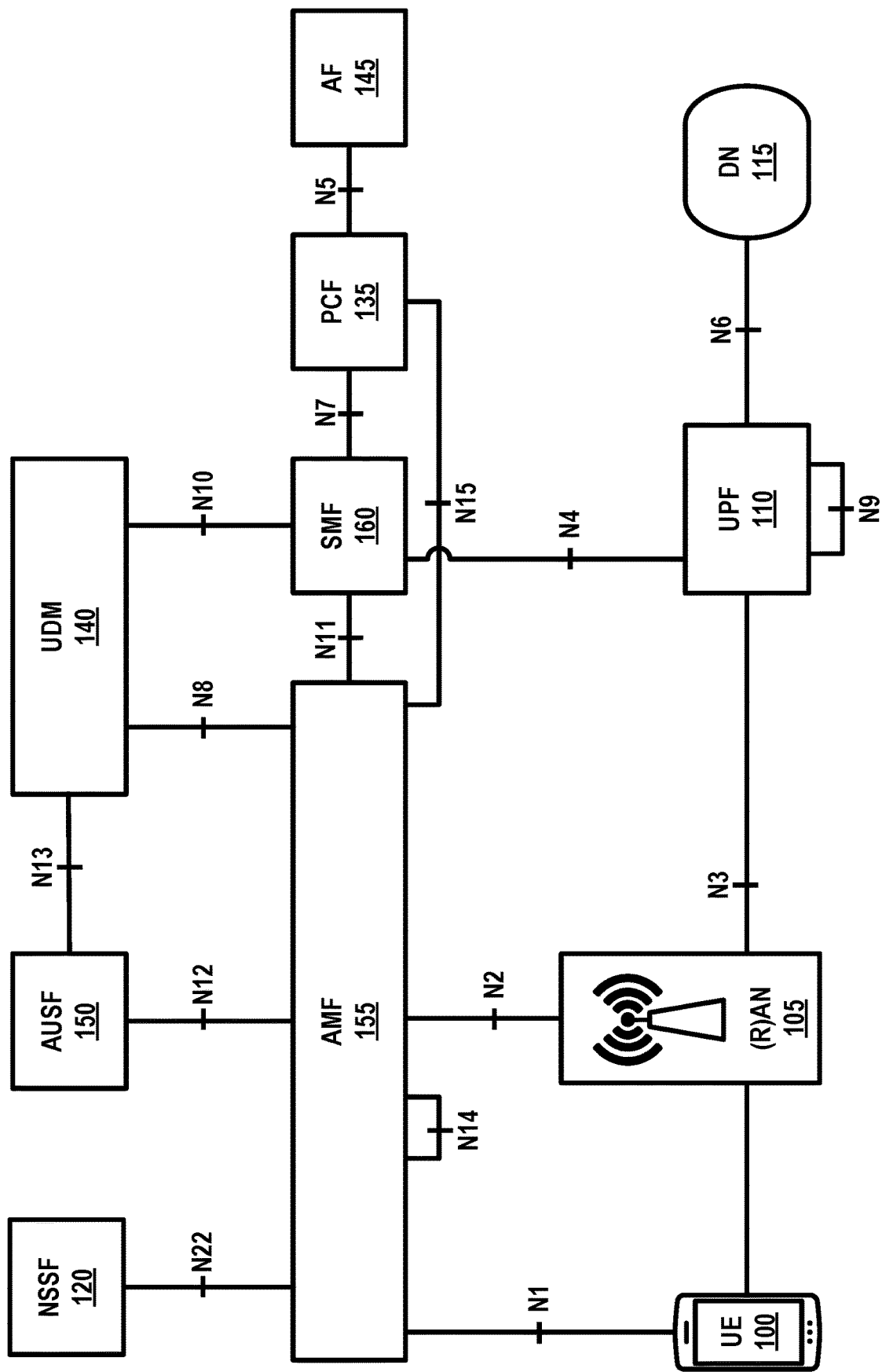
FIG. 2 is a diagram of an example 5G System architecture as per an aspect of an embodiment of the present disclosure.

Example FIG. 1 and FIG. 2 depict a 5G system comprising of access networks and a 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
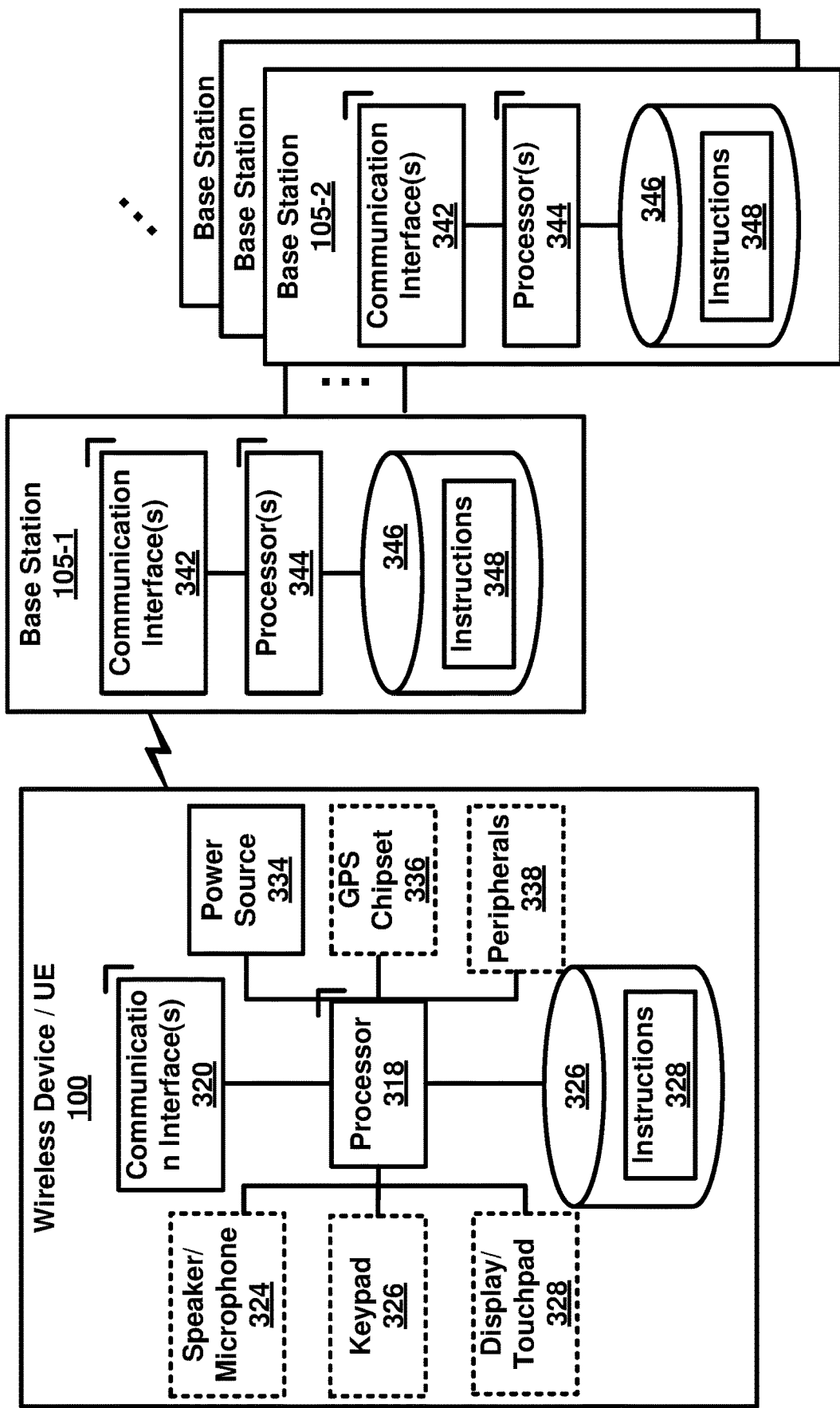
FIG. 3 is a system diagram of an example wireless device and a network node in a 5G system as per an aspect of an embodiment of the present disclosure.
Figure 4:
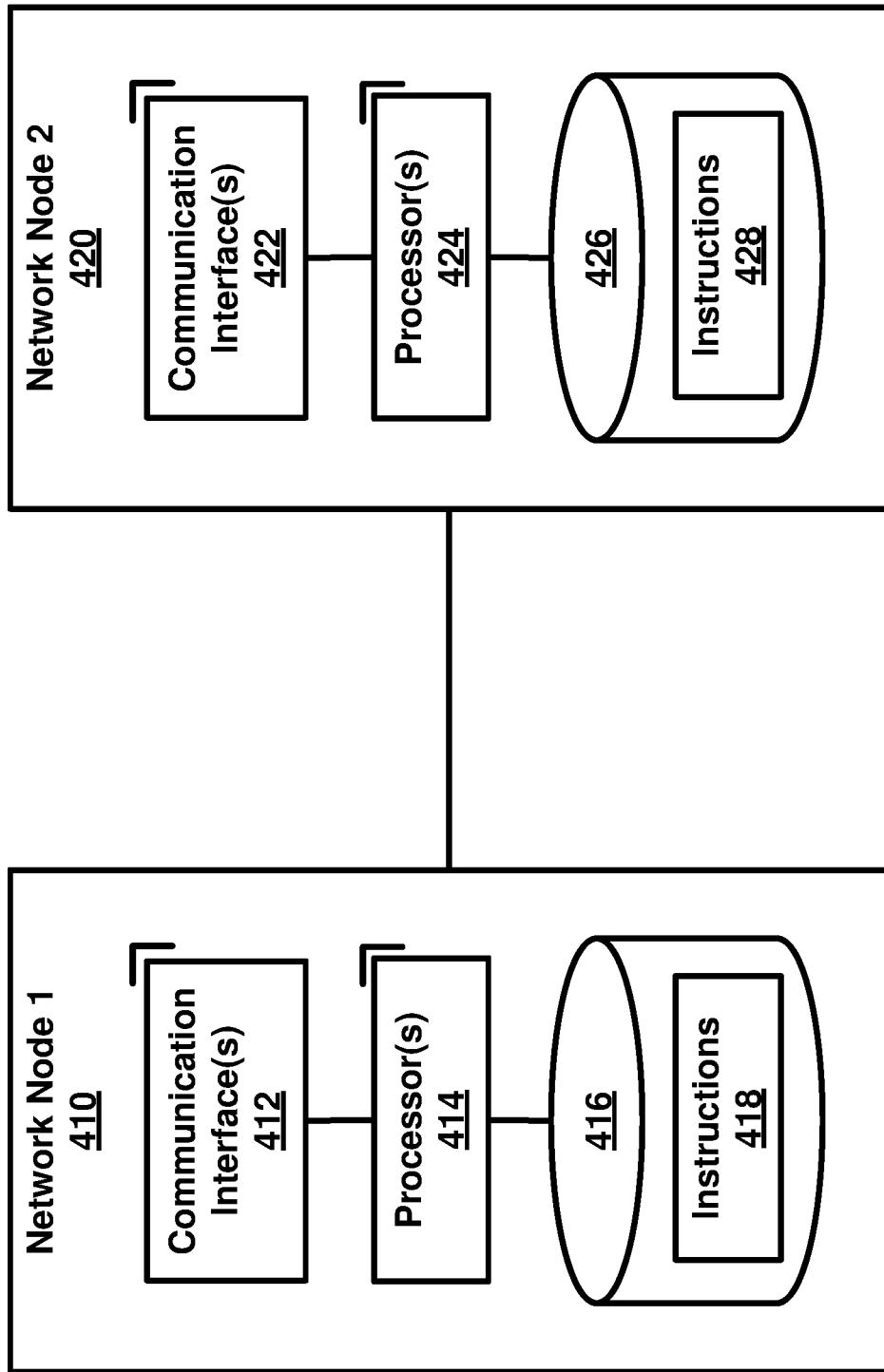
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
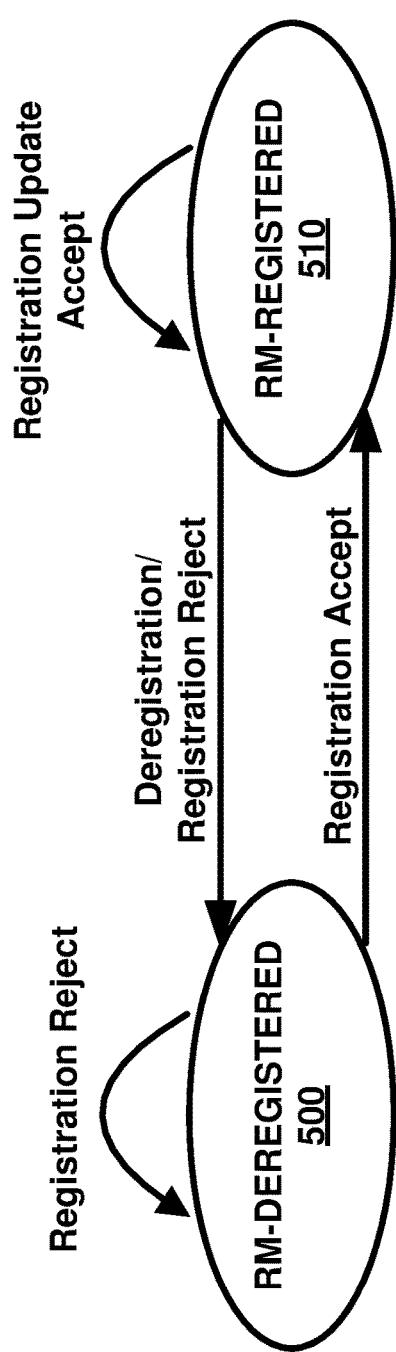
FIG. 5A and FIG. 5B depict two registration management state models in UE 100 and AMF 155 as per an aspect of embodiments of the present disclosure.
Figure 5B:
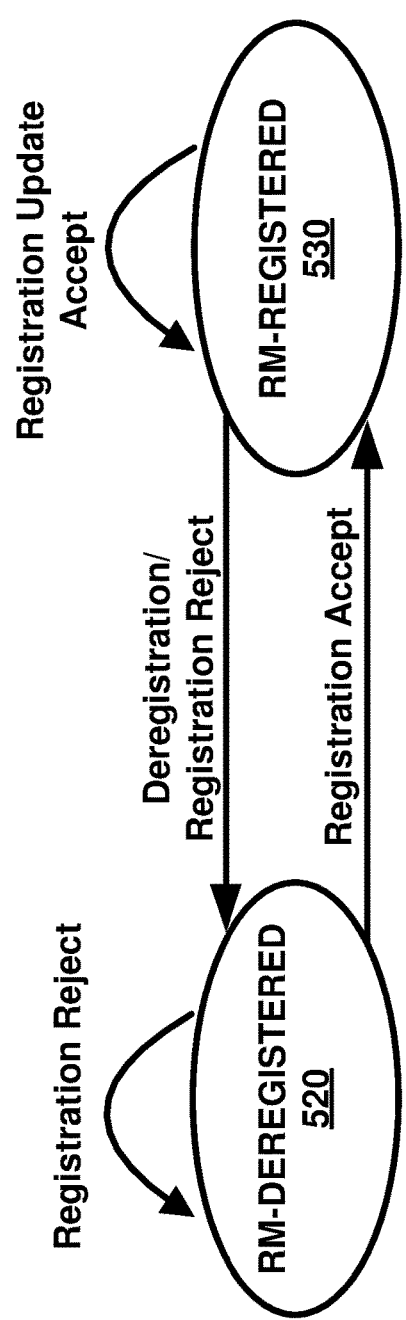

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
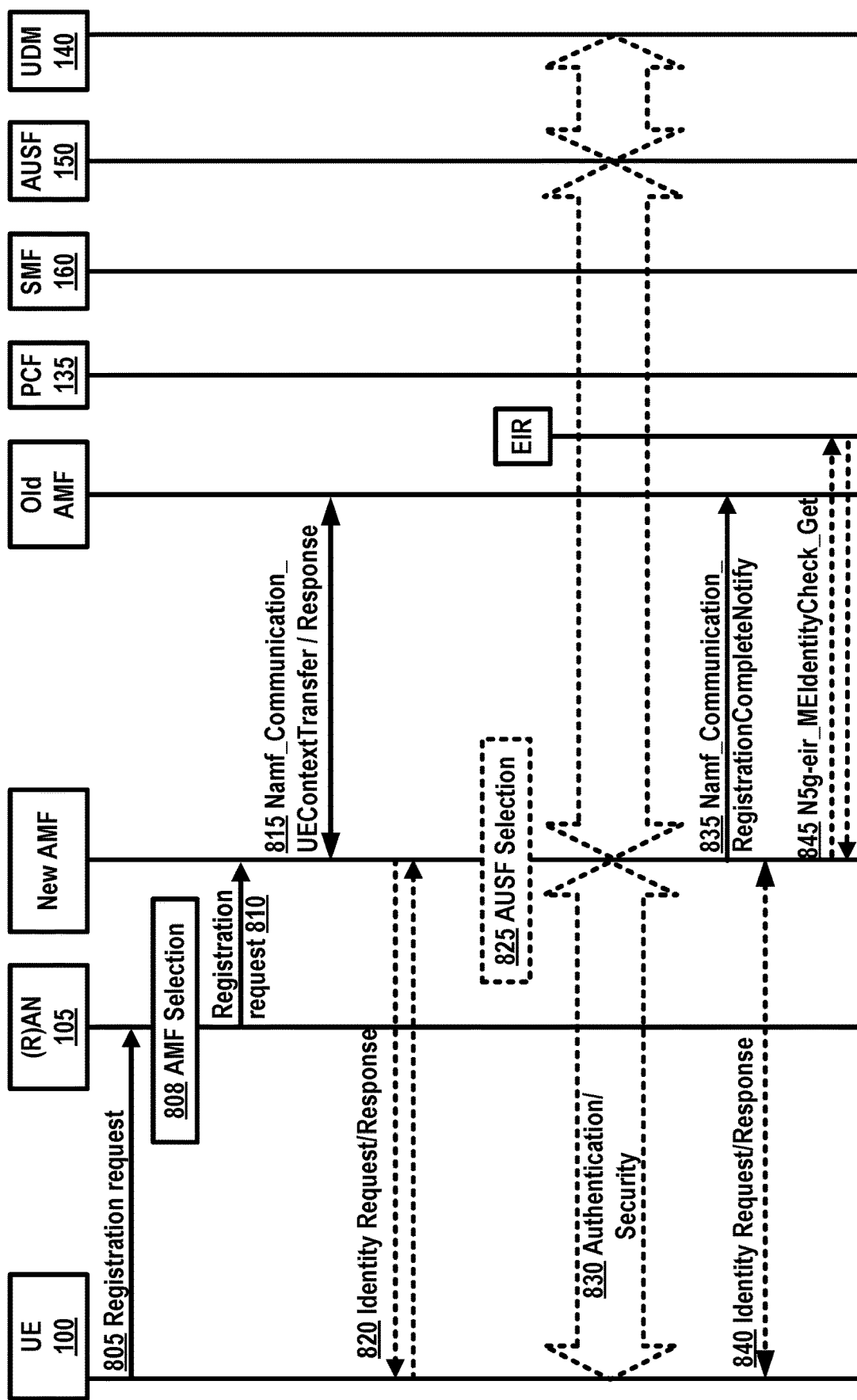
FIG. 8 is an example call flow as per an aspect of an embodiment of the present disclosure.
Figure 9:
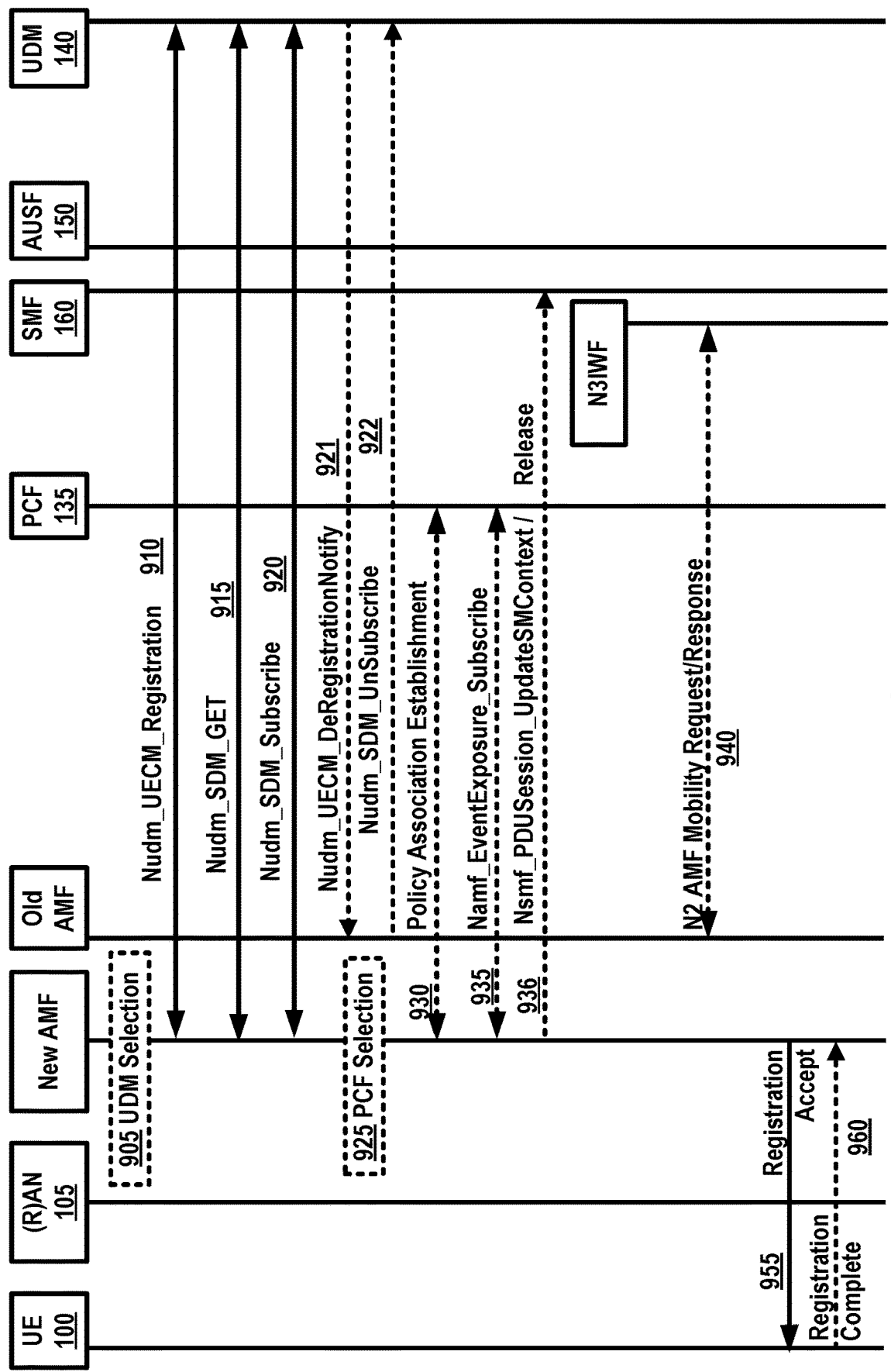
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
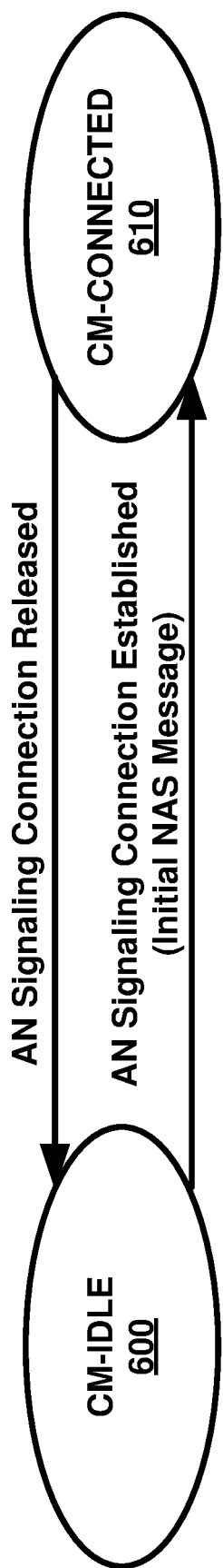
FIG. 6A and FIG. 6B depict two connection management state models in UE 100 and AMF 155 as per an aspect of embodiments of the present disclosure.
Figure 6B:
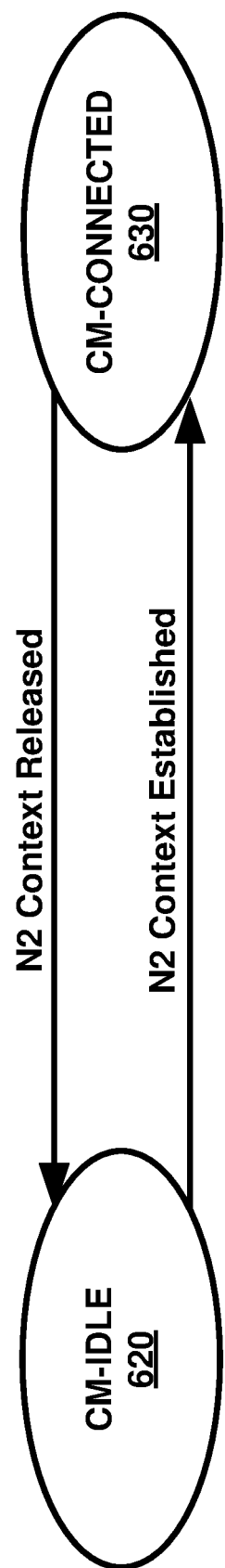

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
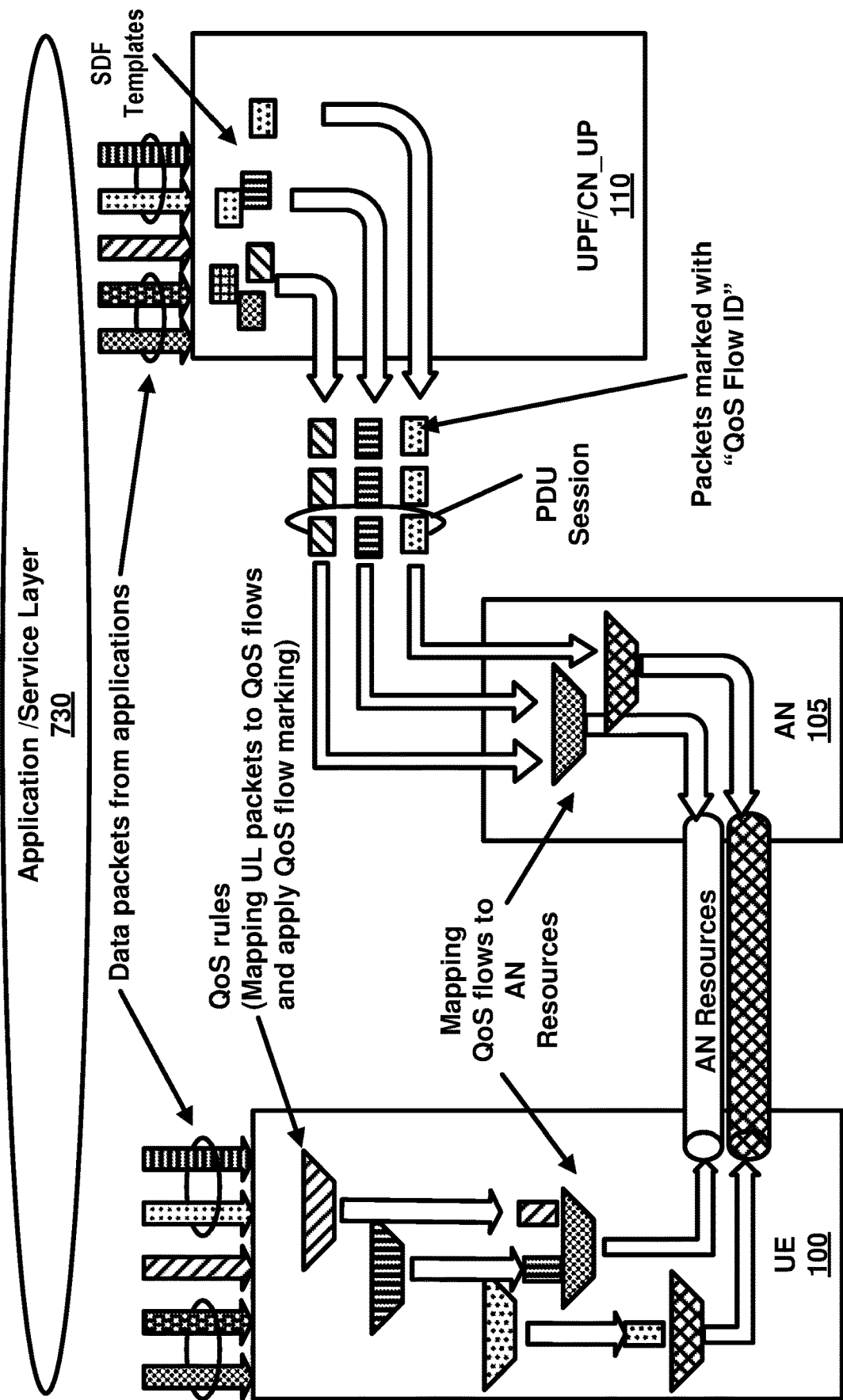
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
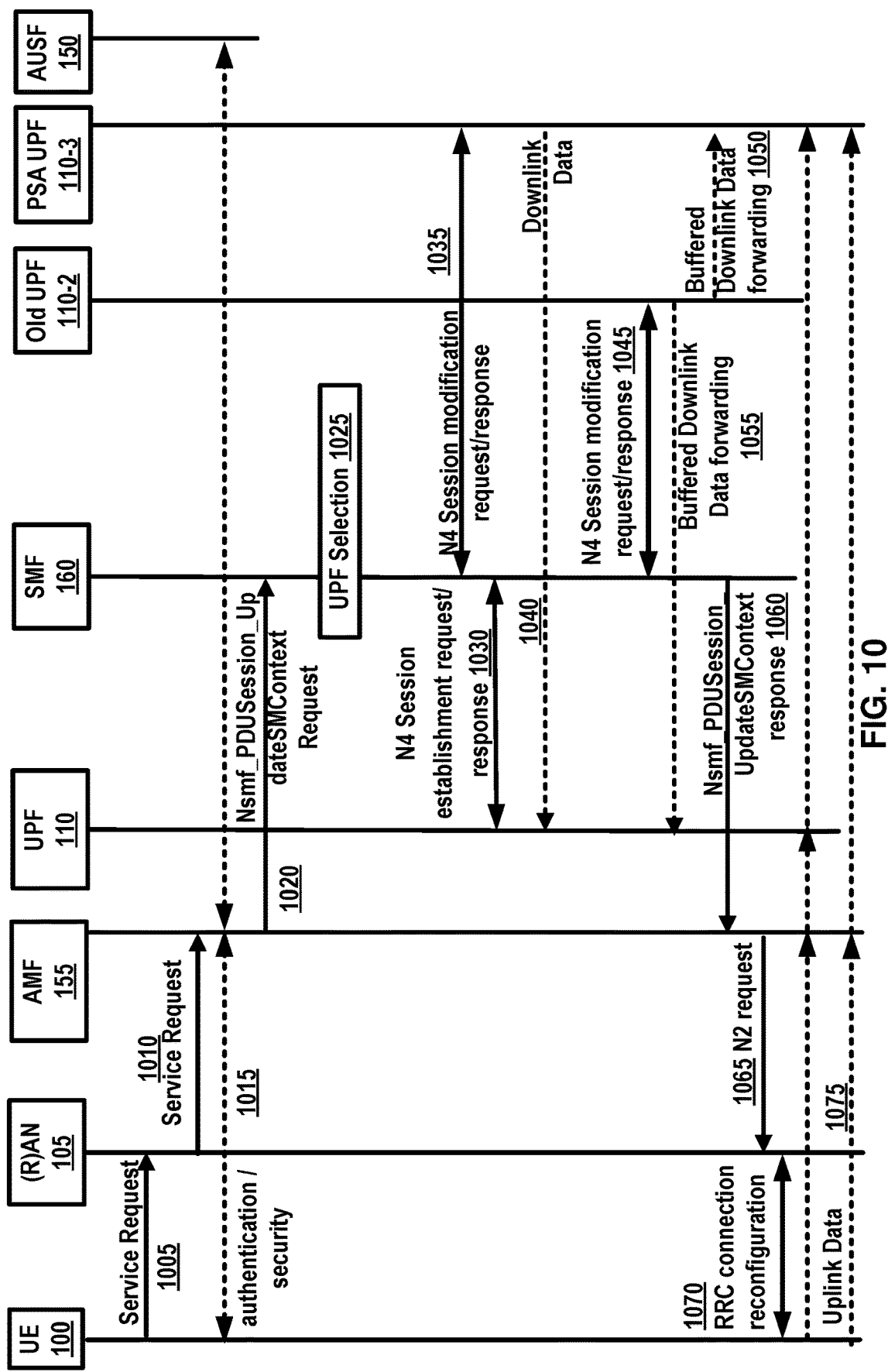
FIG. 10 is an example call flow as per an aspect of an embodiment of the present disclosure.
Figure 11:
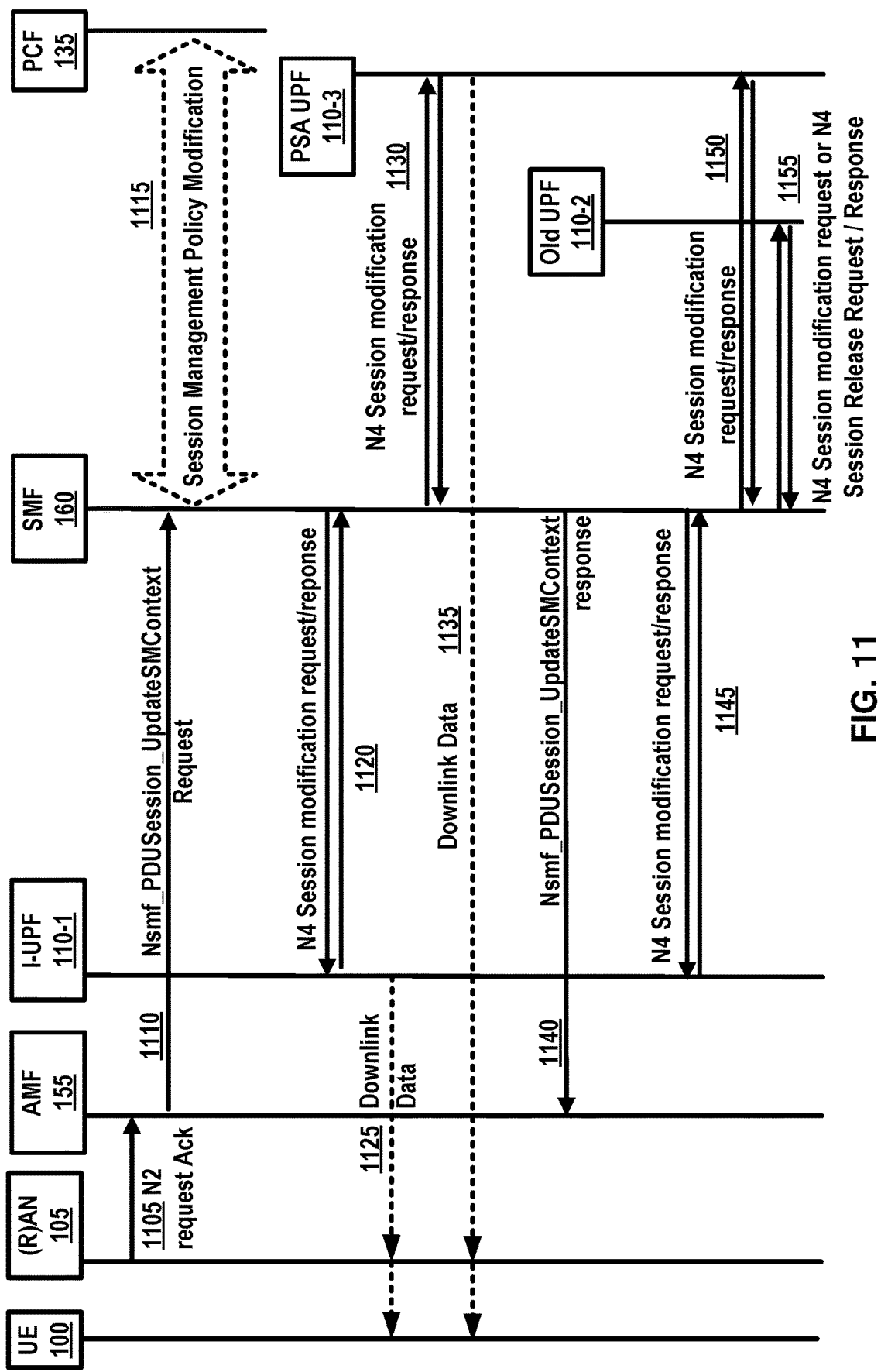
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
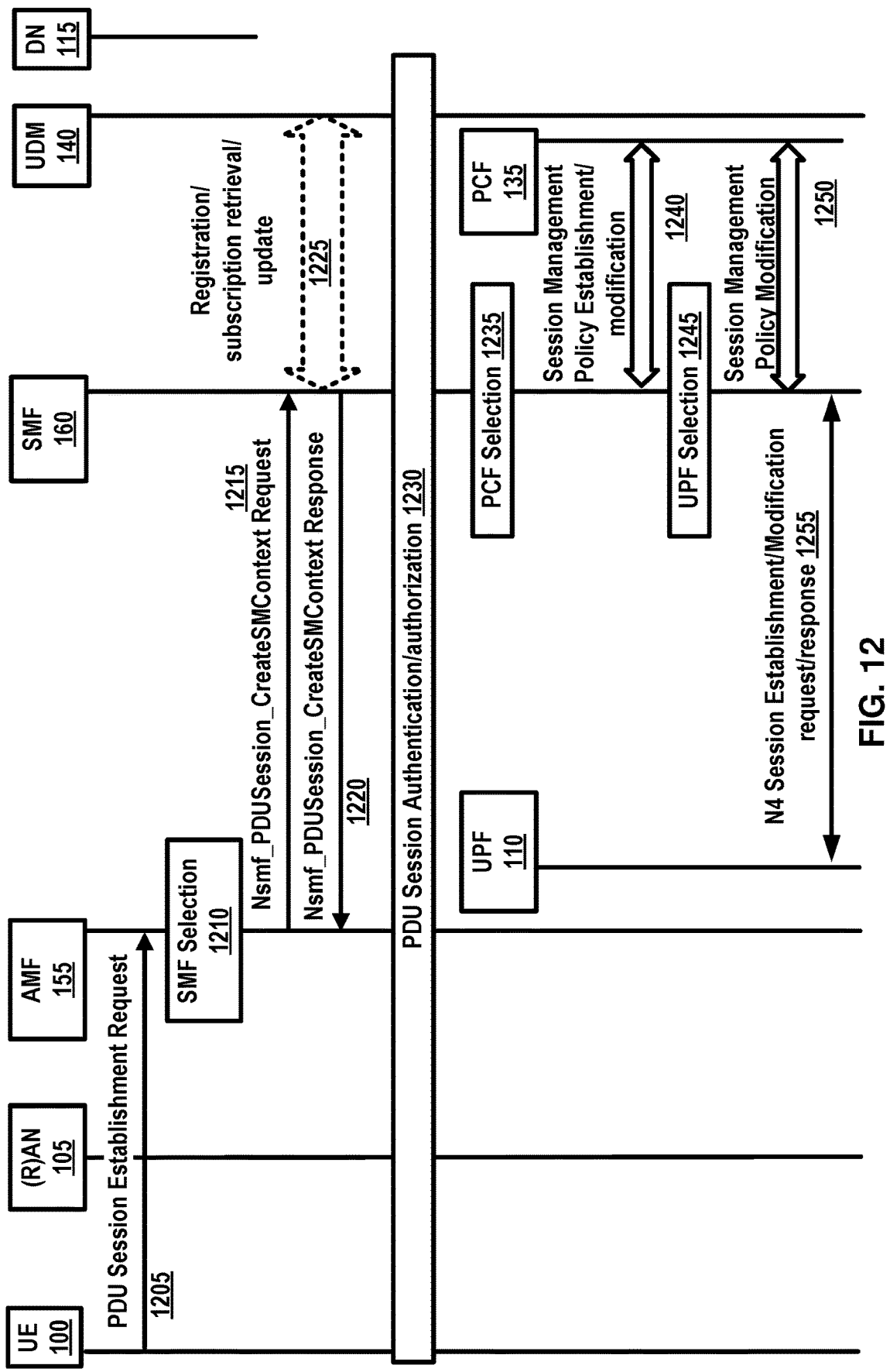
FIG. 12 is an example call flow as per an aspect of an embodiment of the present disclosure.
Figure 13:
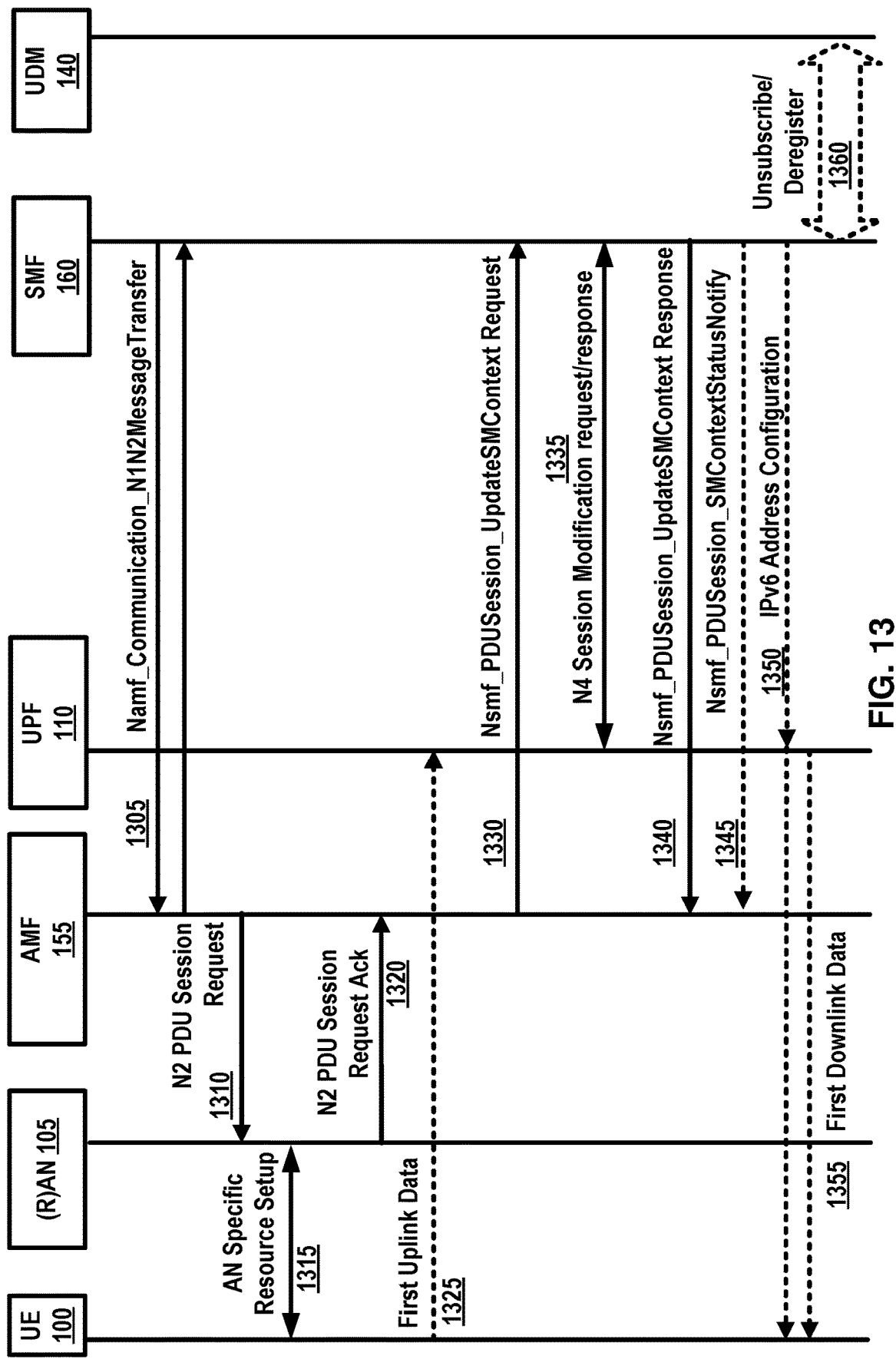
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
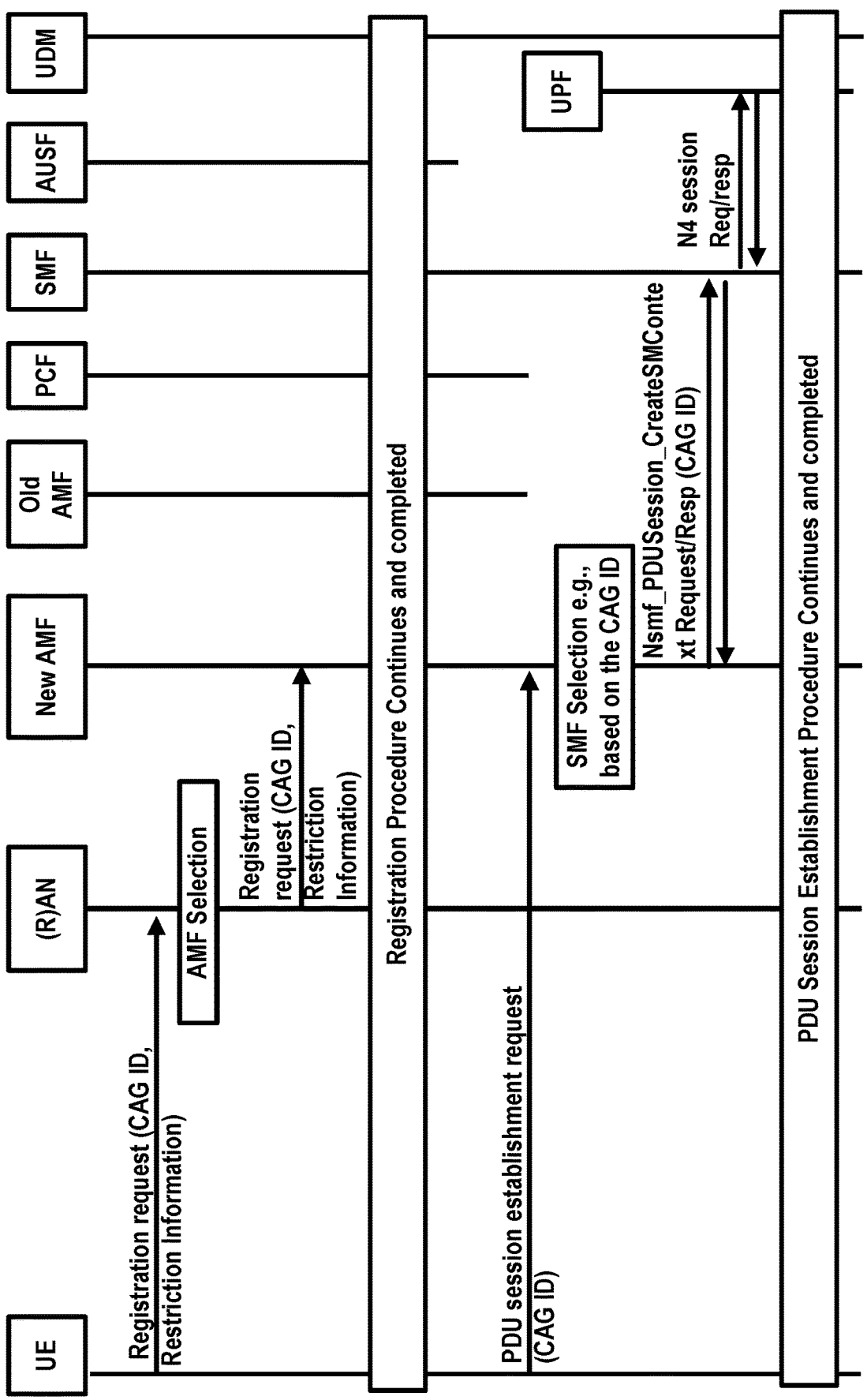
FIG. 14 is an example call flow as per an aspect of an embodiment of the present disclosure.

In an example embodiment as depicted in FIG. 14, the registration procedure as described in FIG. 8 and FIG. 9 may further comprise sending by the UE to the RAN node the AN message that may comprise a CAG ID, NPN ID, and/or the like. In an example, the CAG ID may be included in the AN parameters. The RAN node may select the AMF further based on the CAG ID. The N2 message may further comprise the CAG ID, NPN ID, and/or the like. In an example, the AN parameters may comprise the CAG Identifier if the UE is accessing the NG-RAN using a CAG cell.

In an example embodiment as depicted in FIG. 14, the UE may send a request to establish a PDU session. The PDU session establishment procedure as depicted in FIG. 12 and FIG. 13 may be employed. The PDU session establishment request message may further comprise a CAG ID, NPN ID, and/or the like. The CAG ID may be included in the NAS message sent from the UE to the AMF. The AMF may select the SMF further based on the CAG ID. The Nsmf_PDUSession_CreateSMContext Request from the AMF to the SMF may further comprise the CAG ID. The SMF may select the UPF based on the CAG ID, CAG information, NPN ID, SNPN information/identifier, and/or the like.

Figure 15:
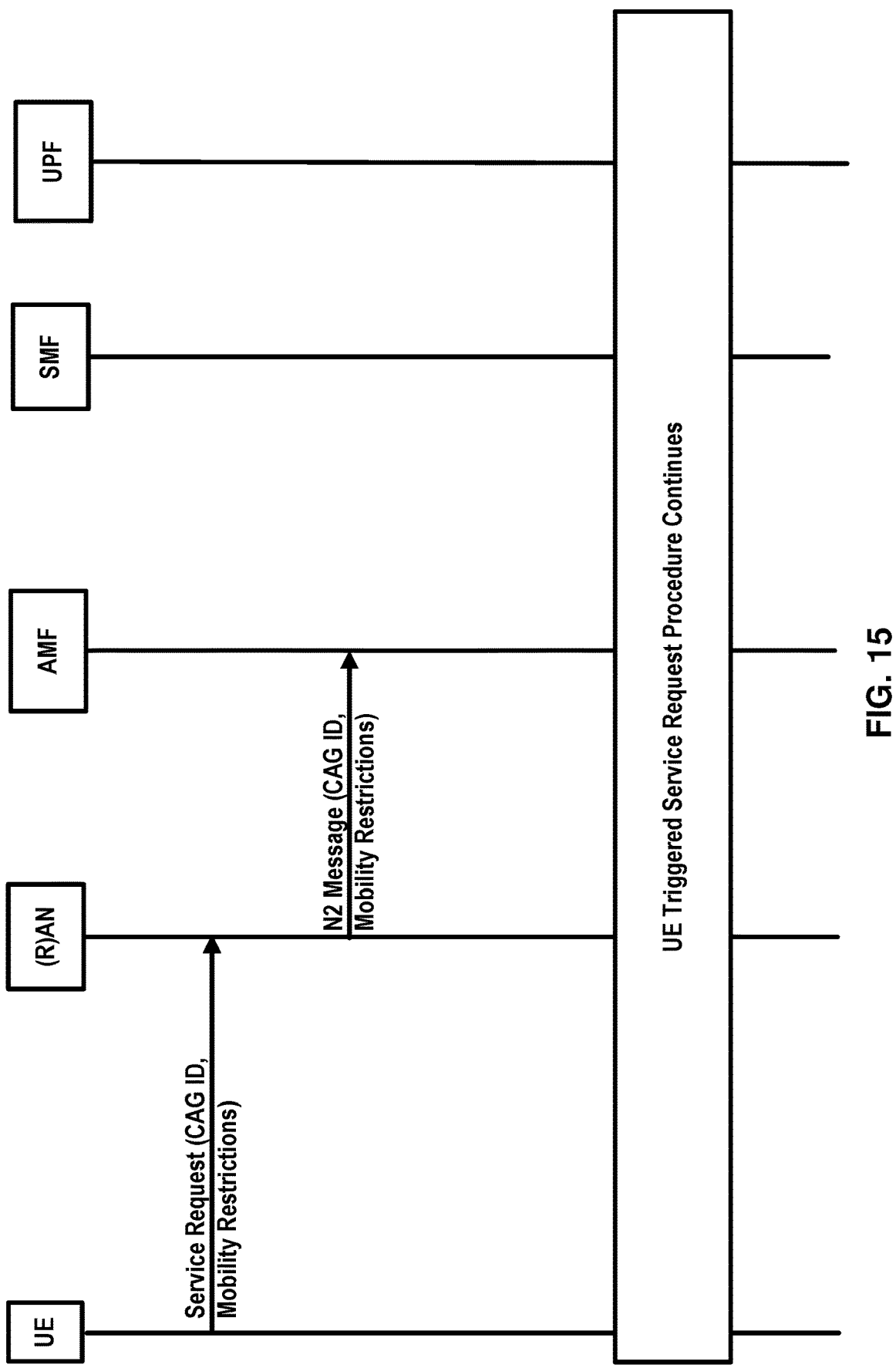
FIG. 15 is an example call flow as per an aspect of an embodiment of the present disclosure.

In an example as depicted in FIG. 15, service request procedure (as depicted in FIG. 10 and FIG. 11) may employ the CAG ID when the UE is accessing the RAN, or NG-RAN node via a CAG cell. The service request message may further comprise the CAG ID. The AN parameter included in the service request message may further comprise the CAG ID. The N2 message may further comprise the CAG ID.

In an example, wireless network systems may support public networks (for example, PLMN) and non-public networks (NPN). To enable NPNs deployed as part of a PLMN, a closed access group (CAG) may be employed to restrict access to NPN resources, cells, slices, DNN, and/or the like. In an example, a UE may be restricted to access only CAG cells and not allowed to access PLMN cells and/or resources.

Overload control and congestion control in a core network as a result of excessive signaling messages associated with a certain CAG may cause service interruption, delays and network failures and may hinder access of other users and devices that do not belong to congested CAG. Existing solutions for reducing the network load may not be efficient when CAG network causes the congestion in a wireless network. For example, reduction of load based on network slices, and/or data network name (DNN) may not address the overload/congestion issue caused by a CAG. For example, network slice based overload and barring may not enable the possibility to prevent devices from access attempt to the network in areas which the devices are not allowed to use the network slice. For example, a wireless device may not access the network slice allocated for a non-public network (NPN), a closed access group (CAG), a PLMN, and/or the like. DNN based overload and barring may not enable the possibility to prevent devices from access attempt to the network in areas which the devices are not allowed to use the DNN. For example, the wireless device may not access the DNN allocated for a non-public network (NPN), a closed access group (CAG), a PLMN, and/or the like. Slice based congestion control may be used to prevent access of UE (to use the slice). The slice based congestion control may be not applicable preventing access of UE belonging to specific CAGs.

In an example, a wireless device may be authorized to access one or more network slices. The wireless device may be authorized to access one or more data networks identified by DNNs. The wireless device may be allowed to access the wireless network via one or more CAGs (e.g., CAG ID 1, CAG ID 2, and/or the like) when the RAN node and/or the cells support the CAGs. When a core network element of the wireless network, or a network slice within the wireless network is overloaded/congested, overload control may be employed to reduce the load of signaling that are targeted to the network slice. A wireless device may need to access to the overloaded network slice. An example implementation of legacy technologies may bar or reject the requests on the basis of network slice information and/or DNN. This may not provide access to the network resources. Examples of critical access may be emergency dispatch services, law enforcement, and/or the like. In an example, an operator or an enterprise network may designate (allow, setup, or allocate) a number of CAG ID for different services, users, groups, and/or the like with different priority levels (or criticality). The operator may determine to give priority access for services in times of congestion or overload to different users of a NPN.

In an example embodiment, a wireless device may be configured and authorized to access the network resources via one or more CAG IDs. Example embodiments comprise techniques for access control, overload control, congestion control and/or the like based on the CAG. If the wireless device access via CAG ID 1 to the overloaded network slice and/or DNN is barred and the wireless device is authorized to access via CAG ID 2 and the cell supports CAG ID 2, then the wireless device may attempt the access via CAG ID 2. If a wireless device is authorized to access via CAG ID 1, and CAG ID 1 access to the overloaded network slice or DNN is subject to barring, then the wireless device may be barred until the overload condition is alleviated. Example embodiments provide enhanced load control mechanisms when CAG networks are implemented. For example, example embodiments use CAG parameters in an enhanced network signaling to control wireless network load, e.g., when a wireless network is congested.

Example embodiments comprise techniques for reducing a load of a wireless network in response to determining that a RAN node, a network element of a core network, and/or the like may be overloaded or congested. Example embodiments may comprise access barring, congestion/overload control, and/or the like in response to access attempts for a closed access group (CAG). A core network element such as an AMF may determine that the core network element is overloaded/congested. A CAG associated with a CAG ID may be a cause of the overload/congestion. An example embodiment may comprise sending by the core network element to a base station an indication that the core network element is overloaded. The indication may further comprise the CAG ID of the CAG that is causing overload/congestion.

An example embodiment may comprise receiving, by the base station from the core network element, a CAG specific congestion/load information indicating a load of one or more CAGs. The base station may determine a barring configuration based on the received CAG specific load information. The barring configuration may be associated with a set of rules or mechanisms performed/employed by the base station to reduce the overload/congestion. To reduce the overload/congestion, the base station may send a barring information to be configured in the wireless device. In an example, the base station may employ CAG information in response to congestion situation of the base station. The base station may bar a CAG based on local policy.

An example embodiment may comprise determining, by a wireless device, a barring decision based on the CAG ID included on the barring information. Based on the barring decision the wireless device may determine whether or not to attempt access to the network.

Non-public networks (NPN) may be intended for the use of a private entity such as an enterprise, and may be deployed in a variety of configurations, utilizing both virtual and physical elements. The NPN may be deployed as standalone networks (e.g., stand-alone non-public network (SNPN)). In an example, the NPN may be hosted by a PLMN and may be offered as a slice of a PLMN (e.g., a public network integrated NPN).

A close access group (CAG) may be employed to prevent unauthorized UEs from trying to access a Public network integrated NPN. A CAG may be employed to access one or more network slices. One or more CAGs may be employed to access a network slices. One or more CAGs may be employed to access one or more network slices.

A RAN node, NG-RAN node, a base station, and/or the like may provide access to SNPNs. The RAN node may broadcast one or more CAG IDs, one or multiple PLMN IDs, one or more NPN IDs, NIDs, SNPN IDs, and/or the like. A list of NIDs per PLMN ID may identify a non-public network that the RAN node provides access to.

In an example, public network integrated NPNs may be NPNs made available via PLMNs e.g., by employing a dedicated DNNs, or by one (or more) network slice instances allocated for the NPN. The network slicing functionalities may be employed to support NPNs. When an NPN is made available via a PLMN, then the UE has a subscription for the PLMN.

In an example, network slicing may not enable the possibility to prevent UEs from trying to access the network in areas which the UE is not allowed to use the network slice allocated for the NPN. Closed access groups may be employed to apply access control. Closed access groups may be employed in addition to network slicing to apply access control. A closed access group may identify a group of subscribers who are permitted to access one or more CAG cells associated to the CAG. The CAGs or CAG IDs may be associated with a priority to access the network. A CAG may be associated with a location, geographic area, region and/or the like. For example, to access a network slice, or a wireless network, UEs accessing from different locations may be associated with different CAG IDs. For example, to access a network slice, or a wireless network, UEs associated with different organizations, different priority levels, and/or the like may access the wireless network, or network slice with different CAG IDs.

In an example, a CAG may be employed for public network integrated NPNs to prevent UE(s), which are not allowed to access the NPN via the associated cell(s), from automatically selecting and accessing the associated cell(s).

A CAG may be identified by a CAG Identifier (CAG ID) which may be unique within the scope of a PLMN ID. A CAG cell may broadcast one or multiple CAG Identifiers per PLMN. A RAN node or an NG-RAN node may support broadcasting a total of twelve CAG Identifiers. A CAG cell may broadcast a human-readable network name per CAG Identifier. The human-readable network name per CAG Identifier may be employed for presentation to user when user requests a manual CAG selection.

Figure 16:
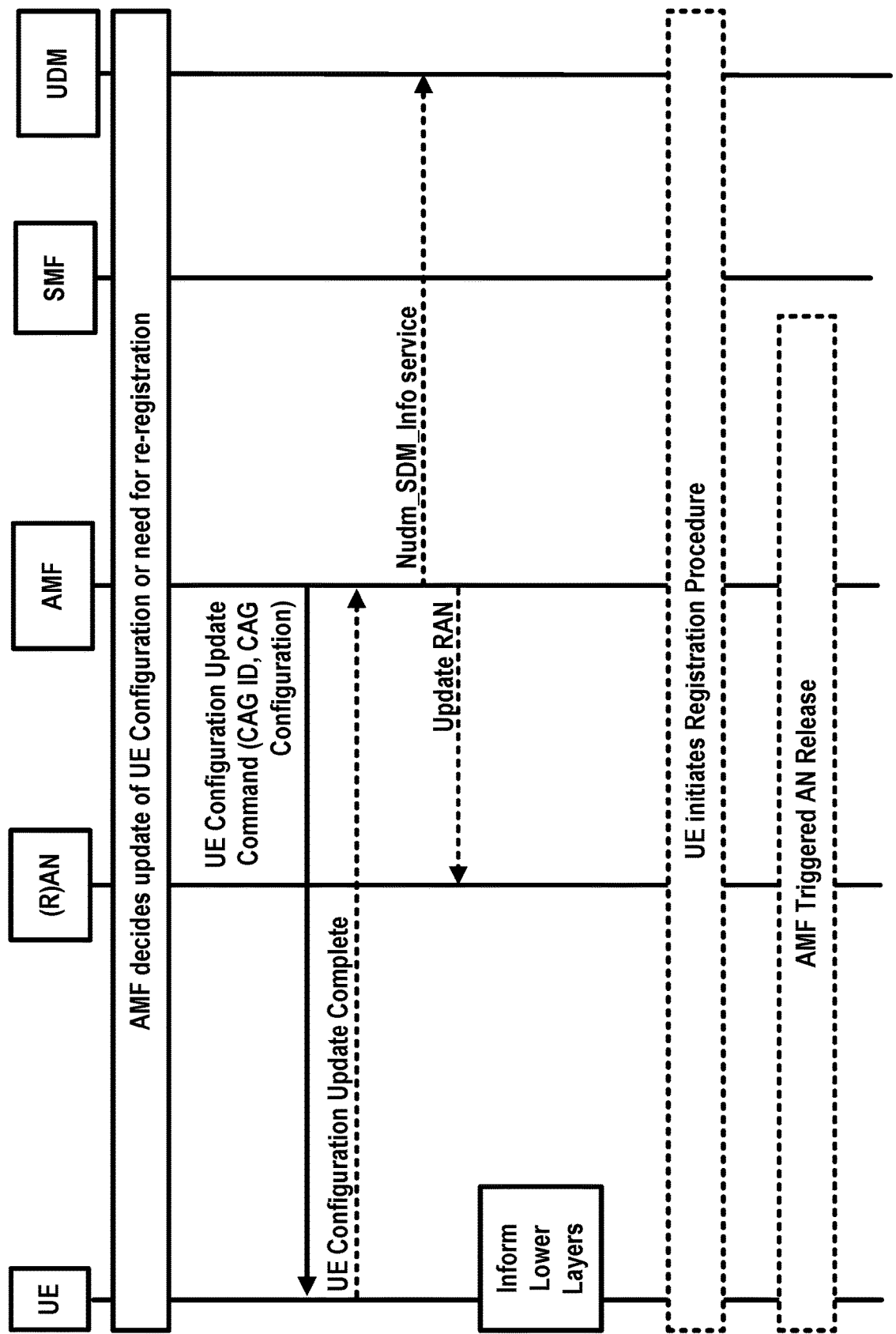
FIG. 16 is an example call flow as per an aspect of an embodiment of the present disclosure.

In an example, to support CAG, a wireless device (UE) may be configured by employing a UE configuration update procedure as depicted in example FIG. 16, for access and mobility management related parameters. The UE configuration update may provide the following CAG information, included in the subscription as part of the mobility restrictions: an Allowed CAG list e.g., a list of CAG Identifiers the UE is allowed to access; and, an indication whether the UE is only allowed to access 5GS via CAG cells. In an example, mobility restrictions may comprise RAT restriction, forbidden area, service area restrictions, core network type restriction and closed access group information, and/or the like.

In an example, a CAG cell may broadcast information such that the UEs supporting CAG may access the cell. The broadcast information may comprise mobility restrictions that may restrict the UE's mobility according to the allowed CAG list (if configured in the subscription) and may comprise an indication whether the UE is only allowed to access CAG cells (if configured in the subscription).

In an example, during transition from CM-IDLE to CM-CONNECTED, if the UE is accessing the 5GS via a CAG cell, the NG-RAN may provide the CAG Identifier to the AMF. The AMF may verify whether an access of the UE is allowed by mobility restrictions, e.g., if the CAG Identifier received from the NG-RAN is part of the UE's Allowed CAG list, then the AMF may accept a NAS request, if the CAG Identifier received from the NG-RAN is not part of the UE's Allowed CAG list, then the AMF may reject the NAS request with an appropriate cause code, whereas the UE may remove that CAG identifier, if it exists, from its allowed CAG list. The AMF may release the NAS signaling connection for the UE by triggering the AN release procedure. If the UE is accessing the network via a non-CAG cell and the UE's subscription contains an indication that the UE is only allowed to access CAG cells, then the AMF may reject the NAS request with an appropriate cause code, whereas the UE may update its local configuration. The AMF may release the NAS signaling connection for the UE by triggering the AN release procedure.

In an example, during connected mode mobility procedures, based on the mobility restrictions received from the AMF, source NG-RAN may not handover the UE to a target NG-RAN node if the target is a CAG cell and the related CAG Identifier is not part of the UE's Allowed CAG list. Source NG-RAN may not handover the UE to a non-CAG cell if the UE is only allowed to access CAG cells.

In an example, the AMF may update mobility restrictions when the AMF receives the Nudm_SDM_Notification from the UDM and the AMF determines that the Allowed CAG list or the indication whether the UE is only allowed to access CAG cells have changed. The AMF may update the mobility restrictions in the UE and NG-RAN accordingly. If the UE is currently accessing a CAG cell and the related CAG Identifier has been removed from the allowed CAG list or if the UE is currently accessing a non-CAG cell and the indication that the UE is only allowed to access CAG cells has been set in the subscription, then the AMF may release the NAS signaling connection for the UE by triggering the AN release procedure.

Figure 17:
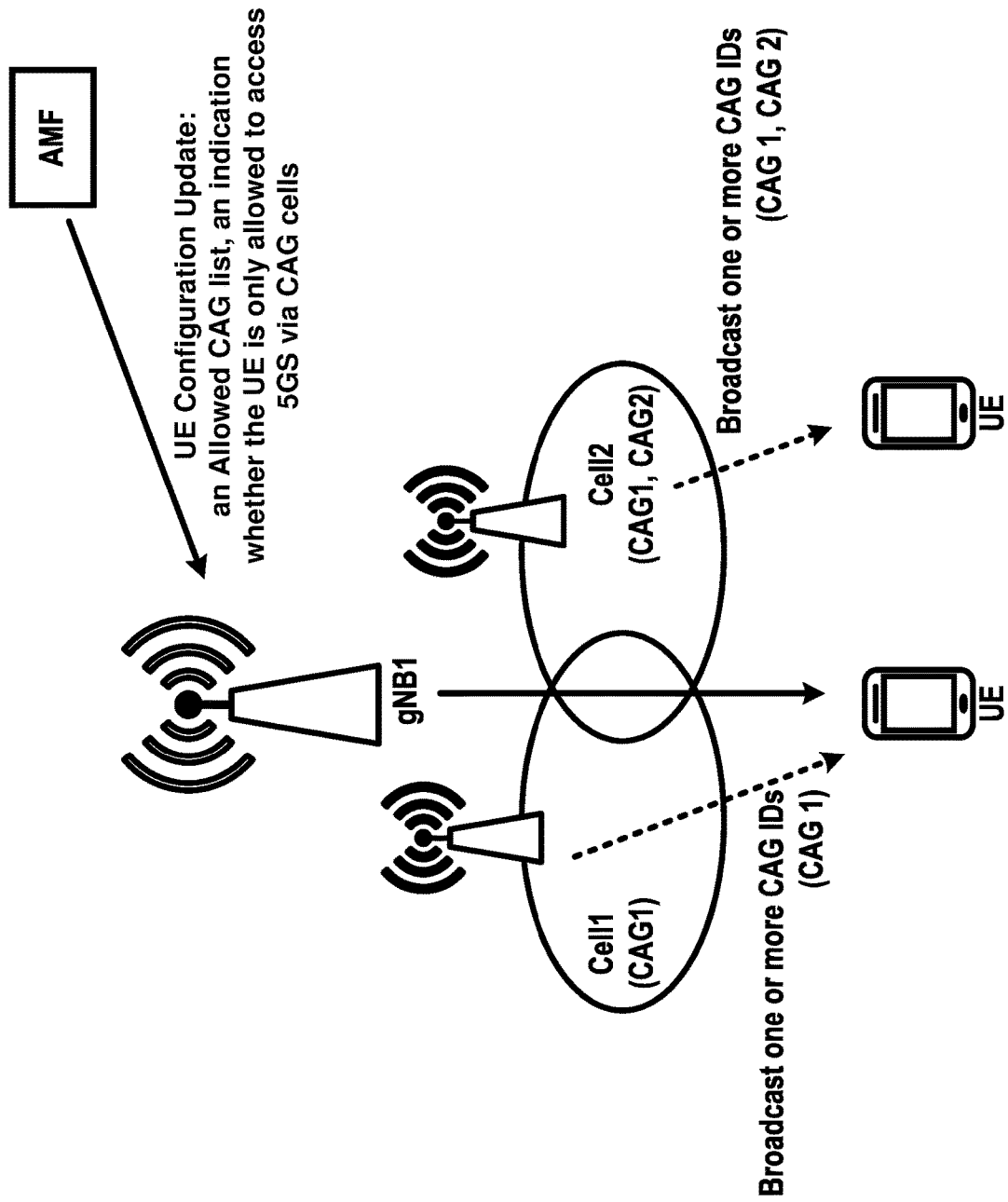
FIG. 17 is an example call flow as per an aspect of an embodiment of the present disclosure.

In an example as depicted in FIG. 17, a core network entity/function may provide a list of allowed CAG IDs to one or more UEs (wireless devices). The core network entity, element/function may be a PCF, SMF, UDM/UDR, AMF, and/or the like. The wireless network may employ a procedure such as UE configuration update procedure to provide CAG related configurations to the wireless device. The CAG related configurations may be an indication of whether the UE is a CAG only UE, a list of allowed CAGs, CAG IDs that the UE may access, and/or the like. The wireless device may receive the configurations or CAG related configurations via a broadcast message. The broadcast message may comprise a system information block (SIB), a master information block (MIB), and/or the like.

Figure 18:
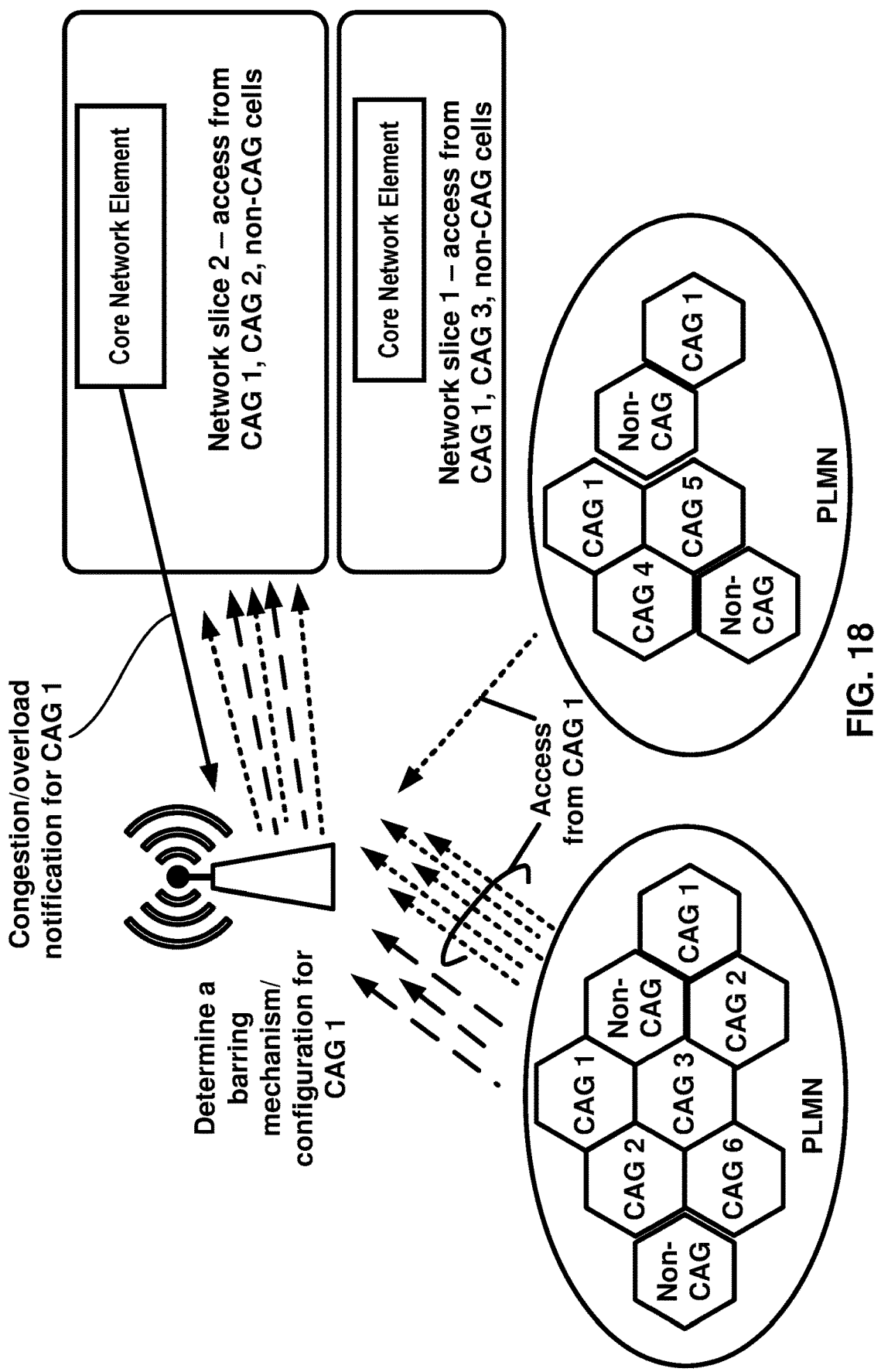
FIG. 18 is an example call flow as per an aspect of an embodiment of the present disclosure.

In an example as depicted in FIG. 18, one or more wireless devices may access the wireless network via one or more CAGs, CAG IDs. The access may employ a service request message, a PDU session establishment message, an RRC message, and/or the like. The wire device may include a CAG ID during an access attempt (the message that is employed for the access attempt). The core network entity/element of the wireless device may receive an excessive number of messages that comprise a CAG ID. The wireless network, or the core network entity may determine that the number of messages that comprise the CAG ID has exceeded a threshold. The wireless network, or the core network entity may determine that the wireless network or the core network entity is congested and/or overloaded. The wireless network may determine that signaling traffic originating from wireless devices that access via the CAG, or CAG ID may be reduced e.g., for a period of time, until the overload/congestion is reduced/eliminated/alleviated, and/or the like.

In an example embodiment as depicted in FIG. 19, a core network element such as an AMF may initiate an overload notification, control, and/or the like. The overload notification may comprise an overload start message. The overload start message may be over an N2, NGAP, and/or the like interface. Overload control of NGAP based on network slice information such as S-NSSAI, NSSAI, slice ID, and/or the like may be inefficient when access of a wireless device to the wireless network is critical or essential. When overload control is employed, wireless devices that request the network resources, NSSAI, and/or the like may be subject to barring, and access of the wireless device may be delayed. The RAN node may reject the requests, delay forwarding the requests, and/or the like. The wireless device may be configured with an access control to prevent the wireless device to attempt access based on e.g., S-NSSAI. When the wireless device is authorized to access the wireless network via a CAG cell, the CAG may be restricted to some wireless devices that are authorized to access the network during an overload condition. Other CAGs may have less priority of access to the CAG cell. Overload control based on CAG may enable access control that may allow high priority, critical, location based, cell based, and/or the like requests (access attempts) of wireless devices. The AMF may receive signaling messages from wireless devices. The signaling messages may comprise a CAG information, CAG ID, slice information, location information, NPN related information, and/or the like. In an example, the AMF may determine to reduce signaling to overcome a congestion, an overload, and/or the like of the wireless network or the AMF. In an example, the AMF may determine a CAG (e.g. CAG 1) among multiple CAGs which a RAN node supports. The AMF may send an overload reduction request on the basis of a CAG to a RAN node. In an example, the AMF may send an overload reduction request comprising the CAG 1 to the RAN node. The determining of overload reduction/control on the basis of a CAG (e.g. CAG 1) may enable access to the network slices by wireless devices that access the network slices or network resources via other CAGs (CAG IDs, except CAG ID 1). Overload control/reduction on the basis of network slice e.g., based on NSSAI, S-NSSAI, network slice ID, and/or the like may not be sufficient to prevent a selected group of wireless devices to access the resources in an event of overload or congestion. As depicted in example FIG. 19, the AMF in response to determining that the AMF is overloaded, may send an overload start message to a RAN node. The overload start message may comprise the CAG ID, CAG information, and/or the like. The AMF may send an overload stop message indicating stop of overload control. The overload stop message may comprise the CAG ID, CAG information, and/or the like. In an example, CAG information may comprise a list of attributes associated with the CAG ID, such as location information, list of cells (cell IDs) that support the CAG, restrictions associated with the CAG, services that are supported by the CAG, and/or the like.

In an example as depicted in FIG. 19, an overload start procedure (N2 overload, NGAP overload, and/or the like) may be employed to inform a RAN node, an NG-RAN node, a base station, and/or the like to reduce the signaling load towards the AMF. The procedure may employ non-UE associated signaling. The NG-RAN node that receives the overload start message may determine that the AMF from which it receives the message is in an overloaded state. If an overload action IE is included the AMF overload response IE within the overload start message, the NG-RAN node may use it to identify the related signaling traffic. When the overload action IE is set to reject RRC connection establishments for non-emergency mobile originated data transfer (e.g., reject traffic corresponding to RRC cause mo-data, mo-SMS, mo-VideoCall and mo-VoiceCall, mo-data, and/or the like), the NG-RAN node may if the AMF traffic load reduction indication IE is included in the overload start message, reduce the signaling traffic by an indicated percentage, and/or ensure that the signaling traffic not indicated as to be rejected is sent to the AMF.

In an example, when the overload action IE is set to reject RRC connection establishments for signalling (e.g., reject traffic corresponding to RRC cause mo-data, mo-SMS, mo-signalling, mo-VideoCall, mo-VoiceCall, mo-data, and/or the like), the NG-RAN node may if the AMF traffic load reduction indication IE is included in the overload start message, reduce the signaling traffic by an indicated percentage, and/or ensure that the signaling traffic not indicated as to be rejected is sent to the AMF.

In an example, when the overload action IE is set to permit RRC connection establishments for emergency sessions and mobile terminated services the NG-RAN node may if the AMF traffic load reduction indication IE is included in the overload start message, reduce the signaling traffic by an indicated percentage, and/or ensure that the signaling traffic not indicated as to be rejected is sent to the AMF.

In an example, when the overload action IE is set to permit RRC connection establishments for high priority sessions and mobile terminated services such as traffic corresponding to RRC cause "highPriorityAccess", "mps-PriorityAccess", "mcs-PriorityAccess" and "mt-Access", and/or the like, the NG-RAN node may if the AMF traffic load reduction indication IE is included in the overload start message, reduce the signaling traffic by an indicated percentage, and/or ensure that the signaling traffic not indicated as to be rejected is sent to the AMF.

If an overload start NSSAI List IE is included in the overload start message, the NG-RAN node may if the slice traffic load reduction indication IE is present, reduce the signaling traffic by the indicated percentage for the UE(s) whose requested NSSAI include S-NSSAI(s) contained in the overload start NSSAI List IE, and the signaling traffic indicated as to be reduced by the Overload Action IE in the Slice Overload Response IE if the IE is present. The NG-RAN node may ensure that the signaling traffic from UE(s) whose requested NSSAI includes S-NSSAI(s) other than the ones contained in the Overload Start NSSAI List IE, or the signaling traffic not indicated as to be reduced by the Overload Action IE in the Slice Overload Response IE for the UE(s) if the requested NSSAI matched, is sent to the AMF. If an overload control is ongoing and the NG-RAN node receives a further overload start message, the NG-RAN node may replace the contents of the previously received information with the new one.

In an example, the overload start message may comprise an overload start CAG List information element IE. If an overload start CAG List IE is included in the overload start message, the NG-RAN node may if the CAG traffic load reduction indication IE is present, reduce the signaling traffic by the indicated percentage for the UE(s) whose access requests or service requests comprise the CAG ID that belongs to the list as in CAG List IE. In an example, the signaling traffic may be indicated as to be reduced by the overload action IE in a CAG overload response IE if the IE is present. The NG-RAN node may ensure that the signaling traffic from UE(s) whose access requests, service requests, and/or the like comprise CAG IDs other than the CAG IDs that belong to the CAG List IE contained in the Overload Start CAG List IE, or the signaling traffic not indicated as to be reduced by the Overload Action IE in the CAG overload response IE for the UE(s), is sent to the AMF. If an overload control is ongoing and the NG-RAN node receives a further overload start message, the NG-RAN node may replace the contents of the previously received information with the new one.

In an example, overload stop procedure may be employed to signal to an NG-RAN node that the AMF overload situation has ended and normal operation may resume at the AMF. The procedure may employ non-UE associated signaling. The NG-RAN node may receive the overload stop message. The NG-RAN node may determine that the overload situation at the AMF from which it receives the message has ended and may resume normal operation for the applicable traffic towards this AMF.

In an example, the overload response IE may indicate a required behavior of the RAN node, NG-RAN node, and/or the like in an overload situation. The overload response IE may comprise a choice overload response IE, overload action, and/or the like.

Figure 20:
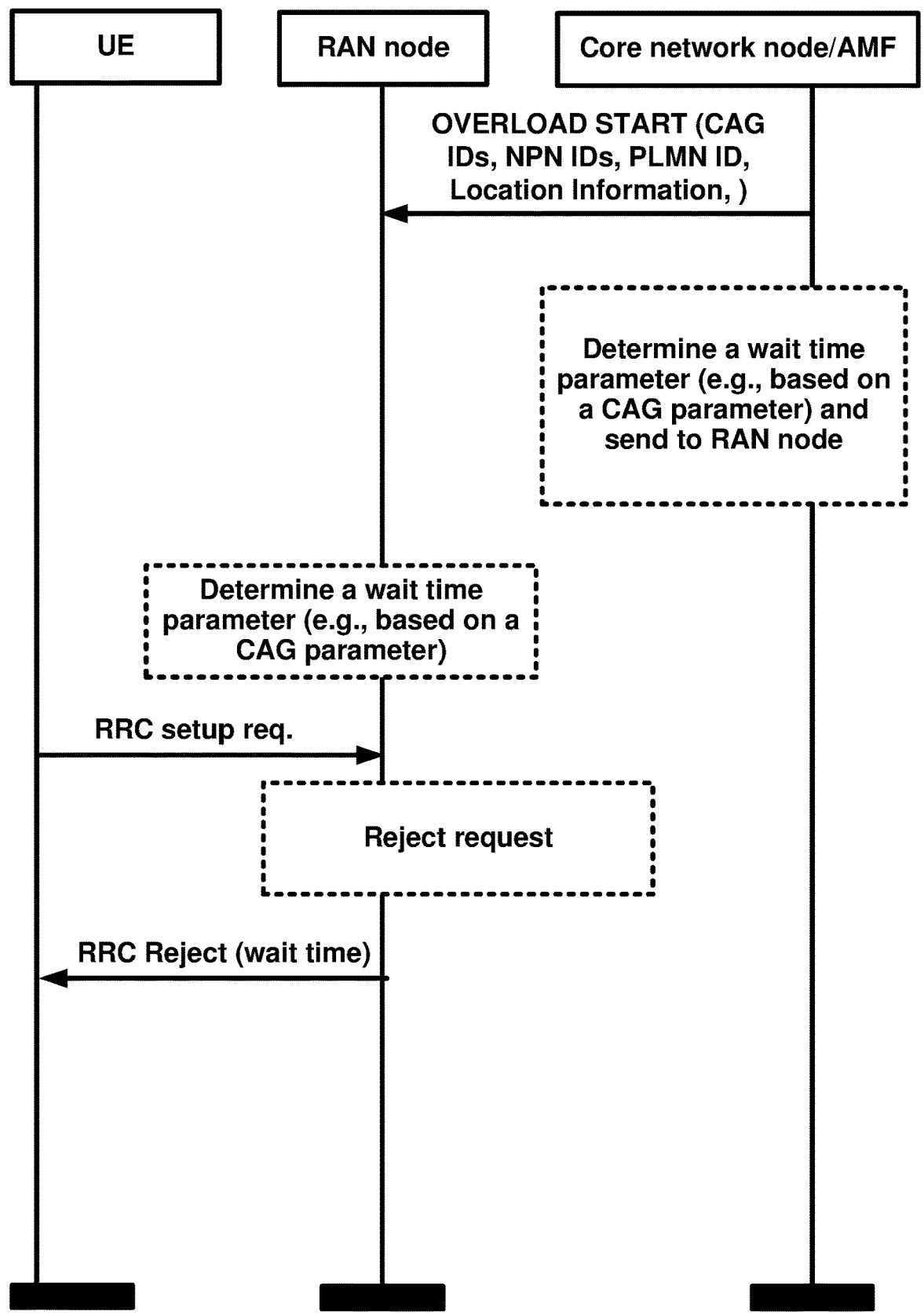
FIG. 20 is an example call flow as per an aspect of an embodiment of the present disclosure.

In an example as depicted in FIG. 20, when the RAN node receives the overload start message, the RAN node may determine a barring mechanism to prevent or reduce traffic associated with the corresponding CAG information, CAG ID, and/or the like. The barring mechanism may comprise rejecting an RRC connection request, RRC message, and/or the like that may comprise the CAG ID. The barring mechanism may comprise rejecting a proportion/ratio/percentage (e.g., 20% of the requests, 70% of the requests, and/or the like) of the RRC connection request, RRC message, and/or the like that comprises the CAG ID. The RAN node may determine a wait time parameter based on the CAG ID, the CAG information, and/or the like, and send the wait time parameter to the wireless device via an RRC reject message, a connection reject message, and/or the like. The wireless device may wait for the period of time determined by the wait time parameter and send the RRC connection request. In an example, the wireless device in response to receiving the reject message from the RAN node may attempt/send the RRC connection request that comprises another CAG ID if the cell supports that CAG ID.

Figure 21:
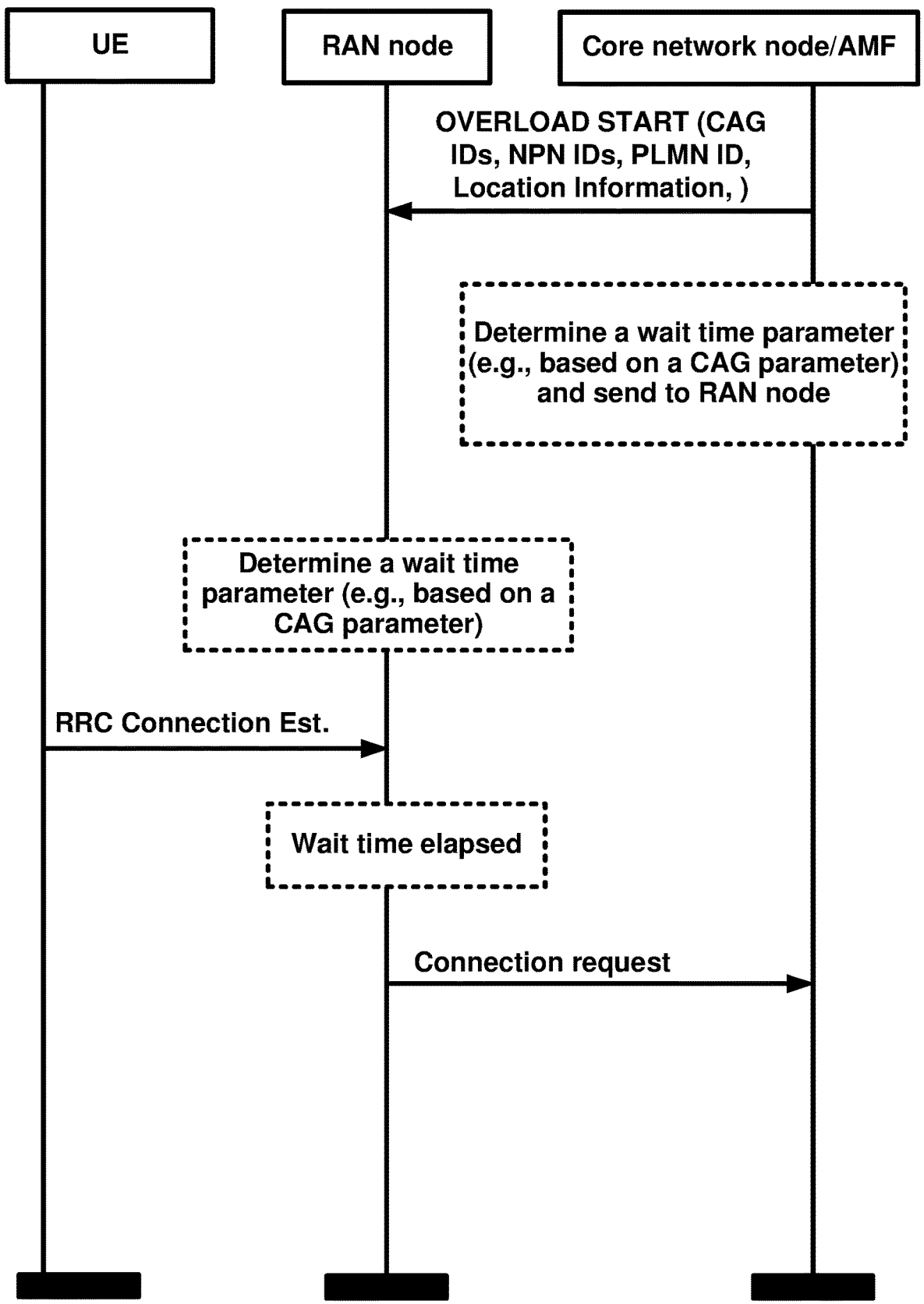
FIG. 21 is an example call flow as per an aspect of an embodiment of the present disclosure.

In an example as depicted in FIG. 21, the barring mechanism employed by the RAN node may comprise determining a wait time parameter based on the CAG ID or the CAG information. For example, gNB, base station, RAN node, and/or the like may determine a wait time of 1 minutes for a first service of CAG1 and a wait time of 2 minutes for a second service of CAG2. In an example, the wait time parameter may be configured in the base station. The wait time parameter may be provided by the AMF or a core network entity to the base station. The wait time parameter (e.g., that may be determined/configured at the base station, or provided by the network) may be per NPN, per CAG, per CAG ID, per combination of CAG ID and a second parameter such as a DNN, S-NSSAI, and/or the like. The wait time parameter may be based on a load information, load condition, congestion level, and/or the like of the wireless network, AMF, base station, a RAN or core network element of the wireless network. The wait time parameter may be based on a priority of the CAG, type of service that the CAG supports, cell id, and/or the like.

When the RAN node receives a request from a wireless device to access the network and the request comprises the CAG ID that is subject to overload control, the RAN node may wait for a period of time based on the wait time parameter, and upon elapsing the wait time, the RAN node may send the request to the AMF and may send an acknowledgment/response to the wireless device. In an example, the RAN node may receive the wait time parameter from the core network element or the AMF as part of the overload start message, a control message, and/or the like. By employing the barring mechanism and wait time in the RAN node, the number of retransmissions from the wireless device(s) may be decreased and may yield a better efficiency. Implementation of example embodiments provide an enhanced load control mechanism, for example, when CAG network causes network overload/congestion.

In an example as depicted in FIG. 20 and FIG. 21, the core network element, the AMF, and/or the like may determine a wait time parameter for a CAG. Upon determining that the AMF is overloaded and an overload control for the CAG is required, the AMF may send an overload start message to the RAN node that may comprise the CAG ID. The overload start message may comprise the wait time parameter as determined by the core network element or the AMF. The RAN node may employ the wait time parameter for the barring mechanism(s).

In an example embodiment as depicted in FIG. 22, the wireless device (UE) may attempt to access to the network. The attempt to access the network may comprise an RRC connection establishment procedure, a service request procedure, RRC resume procedure, and/or the like. The RRC connection establishment procedure may be employed to establish an RRC connection. RRC connection establishment may comprise establishment of a signaling radio bearer e.g., SRB1 establishment. The procedure may be employed to transfer the initial NAS dedicated information/message from the UE to the network. The network may apply the procedure when establishing an RRC connection, when UE is resuming or re-establishing an RRC connection, and the network is not able to retrieve or verify the UE context, and/or the like. In an example, the UE may receive RRCSetup and may respond with RRCSetupComplete. The RRC connection establishment may comprise reception of an RRC reject message by the wireless device (UE) from the network.

Figure 23:
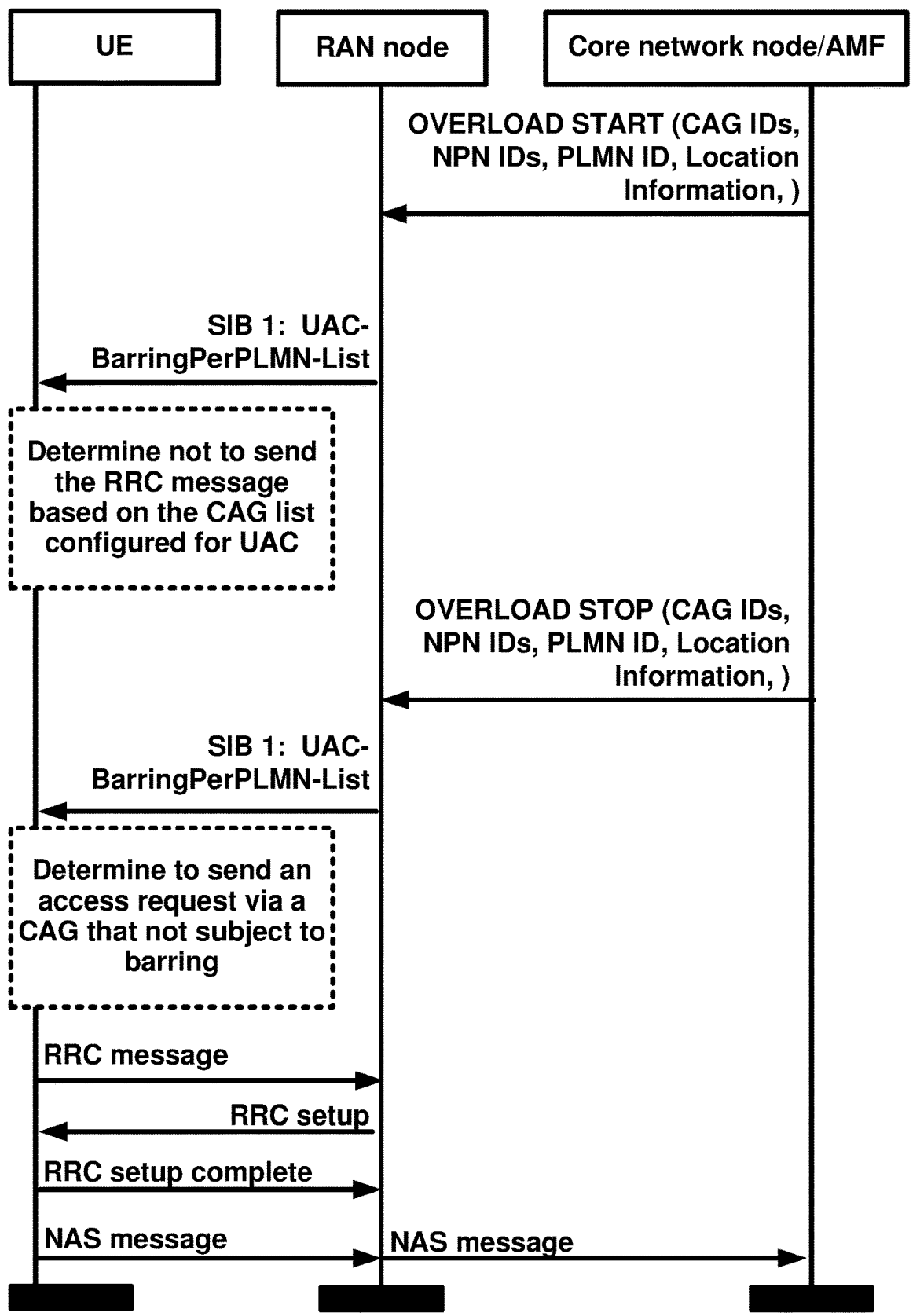
FIG. 23 is an example diagram as per an aspect of an embodiment of the present disclosure.

In an example embodiment as depicted in FIG. 23, an access control mechanism may be employed by the wireless device. The access control mechanism may be a unified access control (UAC), and/or the like. A CAG based access control or UAC configured in the UE may reduce signaling load via reduction of reject messages, multiple access attempts, and/or the like. When network resources of one or more network slices are overloaded or congested, the UE may determine whether or not to send the access request to the network. When a CAG based access control is employed, based on the CAG access control mechanism, the UE may still access the network if the access barring to the network slice can be overridden/exempted for the wireless device that is authorized to use the CAG. In an example, the CAG may be dedicated to special priority, high priority, emergency and/or a critical service. The UAC barring based on slice information may not be sufficient and efficient when access to the network is critical. The UAC may employ information elements that are provided by the network via SIB, MIB, and/or the like. The UAC may be employed to perform access barring check for an access attempt associated with a given access category and one or more access identities upon request from upper layers. The UAC may employ a SIB to configure the UE to determine whether or not to initiate a request based on one or more barring configurations. The barring configuration may be based on CAG IDs, CAG information, CAG IDs per PLMN, NPN ID, Network ID, location information, and/or the like. The CAG IDs, and/or the like may be mapped to/correspond to one or more access category, access identity, access class and/or the like.

In an example, the UE may initiate the RRC connection establishment procedure as in FIG. 22 and FIG. 23 when upper layers request establishment of an RRC connection while the UE is in RRC_IDLE and it has acquired essential system information. The UE may determine/ensure whether having valid and up to date essential system information before initiating the procedure. Upon initiation of the procedure, the UE may if the upper layers provide an access category and one or more access identities upon requesting establishment of an RRC connection, perform the unified access control procedure using the Access Category and Access Identities provided by upper layers. Based on the UAC, if the access attempt is barred, the procedure may end or be terminated.

In an example, the UAC may be employed during an RRC connection resume procedure. The RRC connection resume procedure may be employed to resume a suspended RRC connection, including resuming SRB(s) and data radio bearers DRB(s) or to perform a RAN-based notification area RNA update.

In an example, the wireless device may perform an access control based on the UAC mechanism. The UAC mechanism may be configured in the wireless device based on system information. System information may be provided via system information block SIB e.g., SIB1 to the wireless device. The SIB1 may be provide by the network to the UE and may comprise information relevant when evaluating if a UE is allowed to access a cell and may determine/define the scheduling of other system information. It may comprise radio resource configuration information that is common for all UEs and barring information applied to the unified access control.

Figure 24:
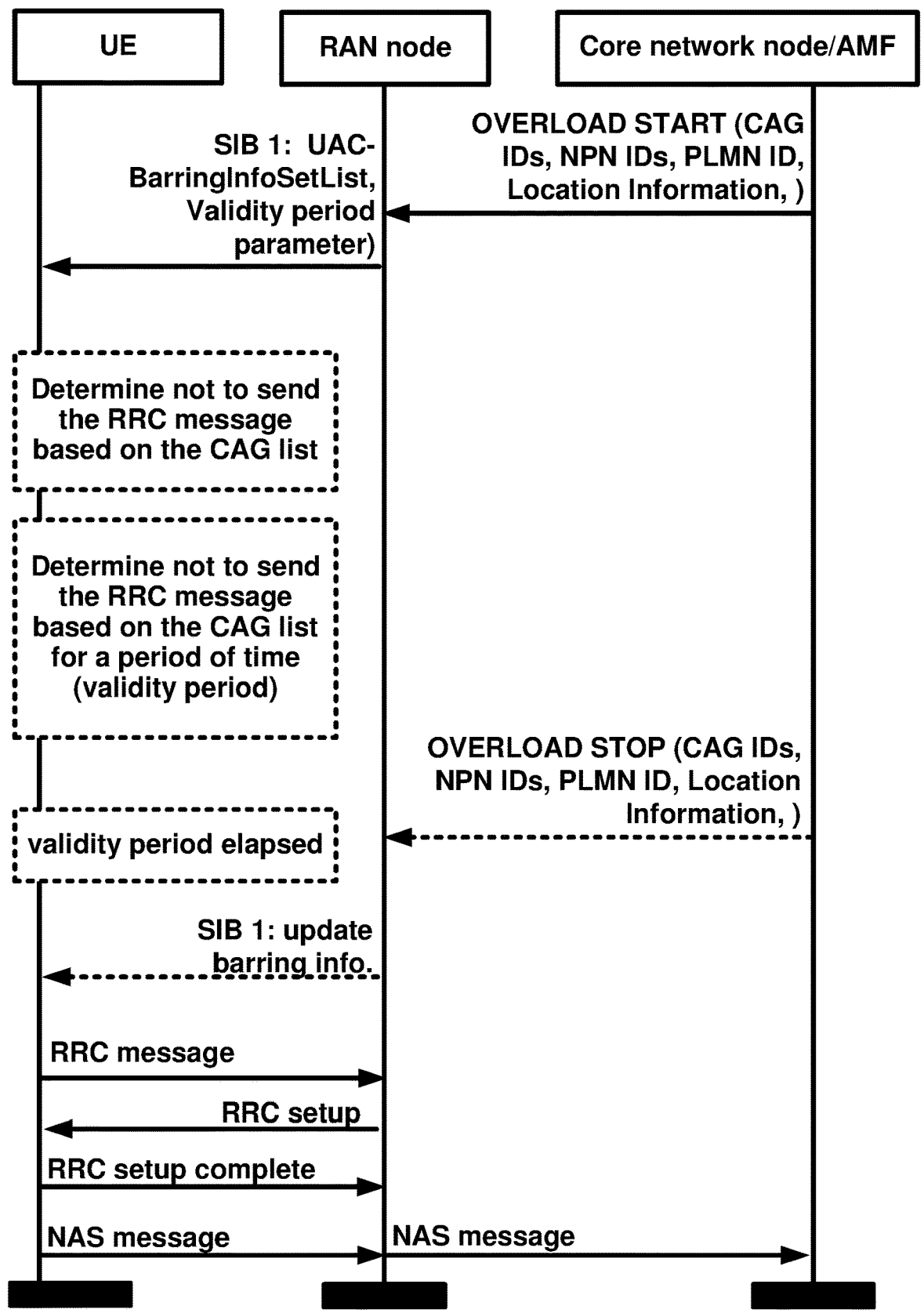
FIG. 24 is an example diagram as per an aspect of an embodiment of the present disclosure.

In an example as depicted in FIG. 24, the AMF or a core network entity may send an overload start message that may comprise the CAG IDs, CAG information pertaining to an area that excessive signaling is originated from, NPN ID, and/or the like. In an example, the overload start message may comprise a validity period indicating a time period that the overload control is in effect. In an example, the RAN node upon elapsing the time period may determine that overload control, access control, barring, and/or the like is not required. The RAN node based on one or more elements of the overload start message may transmit SIB message(s) to one or more wireless devices. The SIB message, e.g., SIB1, and/or the like may comprise barring information, access barring mechanism and/or the like that the wireless device(s) may employ to determine whether or not to access the network. In an example, when the wireless device determines based on the barring information of the SIB that CAG ID 1 is subject to barring, the wireless device may access the network by including a different CAG ID (e.g., CAG ID 2) if the cell supports the CAG ID 2 and the wireless device is authorized/allowed to access via CAG ID 2. If the wireless device is a CAG only UE and allowed to access one CAG, e.g., CAG ID 1, the wireless device may be subject to barring of access. The wireless device may be subject to barring of access via CAG ID 1 until the AMF sends an overload stop message to the RAN node and the RAN node transmits a SIB that indicates CAG ID 1 is not subject to access barring. The AMF may send the overload stop message in response to a determining that overload of the network is alleviated/reduced/resolved.

In an example, the RAN node may determine to forward the request based on CAG ID 2 to an AMF that is not overloaded. Access attempt based on a different CAG ID e.g., CAG ID 2 may enhance load balancing if access via different CAGs are forwarded to different (instances) of the core network entity (e.g., AMF).

The SIB1 may comprise information relevant when evaluating if a UE is allowed to access a cell and may define the scheduling of other system information. SIB1 may comprise radio resource configuration information that is common for one or more UEs and barring information applied to the unified access control. SIB1 may comprise information about cell selection. The SIB1 may comprise barring information (e.g., uac-BarringInfo element within the SIB1). In an example, the CAGs or CAG IDs may correspond to one or more access categories, access classes, access identities, service related identifiers, access related information, and/or the like. The uac-BarringInfo element for example, may comprise a sequence, set, list, and/or the like of CAGs or CAG IDs that are subject to barring. The uac-BarringInfo element for example, may comprise a sequence, set, list, and/or the like of access categories, access classes, access identities, access information, and/or the like associated with CAGs or CAG IDs that are subject to barring. The wireless device with determine an action based on one or more elements of SIB1 message e.g., the uac-BarringInfo element, and/or the like. If the access request by the wireless device corresponds to an entry in the sequence, set, list, and/or the like of CAGs or CAG IDs that are subject to barring, the wireless device may determine not to attempt accessing the network. The wireless device within a period of time may receive a SIB1 message that indicates that the CAGs or CAG IDs are not subject to barring. The wireless device may determine to send an access request that corresponds to the CAGs that are not subject to barring based on one or more elements of the SIB, SIB1, and/or the like message.

In an example as depicted in FIG. 23, the SIB1 message may be employed to determine the CAGs or CAG IDs that re subject to barring by employing a field, element, and/or the like that indicates a list or a set of CAGs that are subject to barring on a per PLMN basis. For example, an element of the SIB1 message such as uac-BarringPerPLMN-List may be employed to determine one or more CAG IDs that are subject to barring.

In an example as in FIG. 24, one or more elements of SIB1 that indicates one or more CAGs are subject to barring, may further indicate a time period for validity of the barring. For example, SIB1 may indicate that CAG ID 1 is subject to barring for a specified period of time or a designated time and/or date.

In an example as in FIG. 24, upon alleviation of the overload/congestion, the core network entity or the AMF may send an overload stop message (e.g., may comprise the CAG IDs, location information, and/or the like) to the RAN node indicating that the barring for the CAG IDs may be removed and the access via the CAGs may be allowed. The RAN node may send update the UAC information in the next SIB transmission. The wireless device upon receiving the updated SIB e.g., SIB1 and receiving a request from upper layers to access the wireless network via the CAG, may send the access request.

In an example as depicted in FIG. 24, if the wireless device received a SIB/SIB1 that comprises the barring information for one or more CAGs/CAG IDs indicating that the one or more CAGs are subject to access barring, and a validity period parameter is provided, the wireless device may attempt to access the network upon elapsing the time for the validity period, and send an access request e.g., RRC message, service request, and/or the like. In an example, in response to elapsing the validity period, the wireless device may restart RRC connection setup request (e.g., as depicted in FIG. 22). The wireless device may employ the updated SIB/SIB1 to determine whether or not to attempt access/restart the RRC connection setup request.

In an example embodiment, system information (SI) may be transmitted to the wireless device. System Information (SI) may be divided into the MIB and one or more of SIBs. The MIB may be transmitted on a broadcast channel (BCH) with a periodicity of e.g., 80 ms and repetitions may be made within e.g., 80 ms, and/or the like. The MIB may comprise parameters that are required to acquire SIB1 from the cell. The first transmission of the MIB may be scheduled in one or more corresponding subframes and repetitions may be scheduled according to the period of synchronization signal block (SSB).

In an example, the SIB1 may be transmitted on a downlink shared channel (DL-SCH) with a periodicity of e.g., 160 ms and may have a variable transmission repetition periodicity within e.g., 160 ms. The default transmission repetition periodicity of SIB1 may be for example 20 ms, and/or the like but the actual transmission repetition periodicity may be up to network implementation. For SSB and control resource set (CORESET) multiplexing pattern 1, SIB1 repetition transmission period may be 20 ms. For SSB and CORESET multiplexing pattern 2/3, SIB1 transmission repetition period may be the same as the SSB period. SIB1 may comprise information regarding the availability and scheduling (e.g., mapping of SIBs to SI message, periodicity, SI-window size, and/or the like) of other SIBs with an indication whether one or more SIBs are provided on-demand and, in that case, the configuration may be required by the UE to perform the SI request. SIB1 may be cell-specific SIB.

In an example, SIBs may be carried in SystemInformation (SI) messages, which are transmitted on the DL-SCH. SIBs having the same periodicity may be mapped to the same SI message. Each SI message is transmitted within periodically occurring time domain windows (referred to as SI-windows with same length for all SI messages). One or more SI message may be associated with an SI-window and the SI-windows of different SI messages do not overlap. An SI message may be transmitted a number of times within the SI-window. A SIB may be configured to be cell specific or area specific, using an indication in SIB 1. The cell specific SIB may be applicable within a cell that provides the SIB. The area specific SIB may be applicable within an area referred to as SI area, which consists of one or several cells and may be identified by systemInformationAreaID.

In an example, for a UE in RRC_CONNECTED, the network may provide system information through dedicated signalling using the RRCReconfiguration message, e.g., if the UE has an active BWP with no common search space configured to monitor system information or paging. In an example, for primary SCG (secondary cell group) cell (PSCell) and secondary cell (SCells), the network may provide the required SI by dedicated signalling, e.g., within an RRCReconfiguration message. The UE may acquire MIB of the PSCell to get system frame number SFN timing of the SCG (which may be different from MCG). Upon change of relevant SI for SCell, the network may release and may add the concerned SCell. For PSCell, SI may be changed with reconfiguration with Sync.

In an example embodiment, an AMF may send to a base station an overload start message. The overload start message may comprise a CAG, CAG ID, NSSAI, S-NSSAI, DNN, and/or the like. The base station based on the one or more elements of the overload start message may determine to implement an access control or barring for one or more CAGs or CAG IDs. For example, when a network slice is overloaded/congested, the base station may determine that CAG 1, CAG 2, and CAG 3 are accessing the network slice. The base station may prioritize a CAG such as CAG 2 and bar or restrict access of CAG 1 and CAG 3 until an overload stop message is received from the AMF or the overload condition is alleviated. For example, the base station may admit a percentage of signaling/access request messages from one or more of the CAGs, e.g., 20% from CAG 1, 50% from CAG 2, and 30% from CAG 3. For example, the base station may admit a CAG based on a probability value, e.g., the probability of admitting CAG 1 may be 1/3, the probability of admitting CAG 2 may be 3/4, and the probability of admitting CAG 3 may be 7/8.

Figure 25:
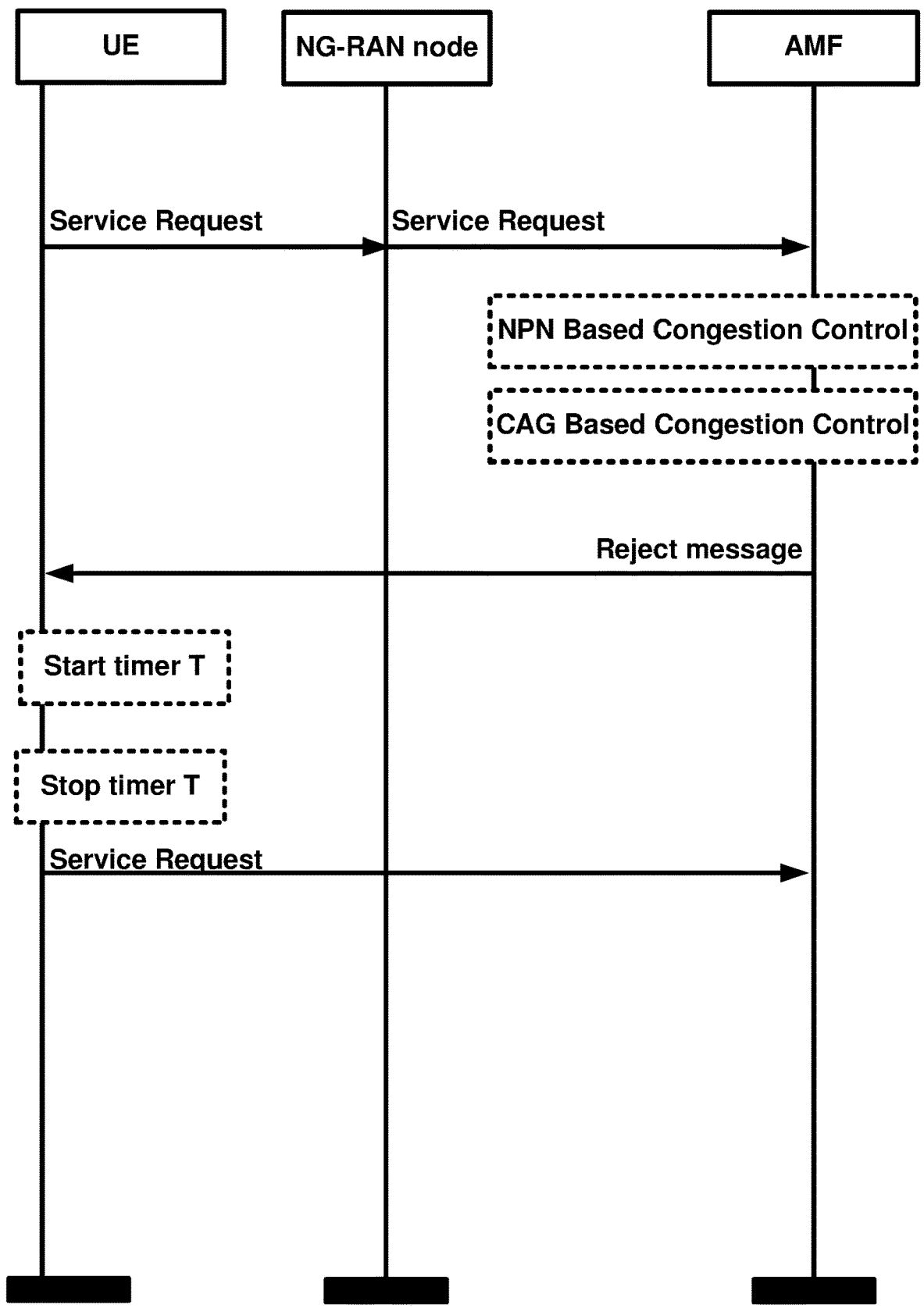
FIG. 25 is an example diagram as per an aspect of an embodiment of the present disclosure.

In an example embodiment as depicted in FIG. 25, an AMF may detect 5GMM (mobility management) signalling congestion and may perform general NAS level congestion control. Under the 5GMM signalling congestion conditions the AMF may reject 5GMM signalling requests from UEs. The AMF may determine not to reject the following requests: requests for emergency services, requests for emergency services fallback, requests from UEs configured for high priority access in selected PLMN, deregistration request message, and/or the like. When general NAS level congestion control is active, the AMF may include a value for the mobility management back-off timer (e.g., T3346) in reject messages. The UE may start the timer T3346 with the value received in the 5GMM reject messages. To avoid that large numbers of UEs simultaneously initiate deferred requests, the AMF may select the value for the timer T3346 for the rejected UEs so that timeouts are not synchronized. If the UE is registered in the same PLMN over the 3GPP access and non-3GPP access, and the UE receives the timer T3346 from the AMF, the timer T3346 may apply to both 3GPP access and non-3GPP access. If the timer T3346 is running when the UE enters state 5GMM-DEREGISTERED, the UE remains switched on, and the USIM in the UE remains the same, then the timer T3346 may be kept running until it expires or it is stopped.

In an example, the AMF may detect and start performing DNN based congestion control when one or more DNN congestion criteria are met. The AMF may store a DNN congestion back-off timer on a per UE and congested DNN basis. If the UE does not provide a DNN for a non-emergency PDU session, then the AMF may employ the selected DNN or the DNN associated with the PDU session corresponding to the 5GSM procedure. When DNN based congestion control is activated at the AMF, the AMF may perform the congestion control and the UE may perform the congestion control. The AMF may detect and start performing S-NSSAI based congestion control when one or more S-NSSAI congestion criteria are met. The AMF may store an S-NSSAI congestion back-off timer on a per UE, congested S-NSSAI, and optionally DNN basis. If the UE does not provide a DNN for a non-emergency PDU session, then the AMF may employ the selected DNN or the DNN associated with the PDU session corresponding to the 5GSM procedure. If the UE does not provide an S-NSSAI for a non-emergency PDU session, then the AMF may employ the selected S-NSSAI or the S-NSSAI associated with the PDU session corresponding to the 5GSM procedure. When S-NSSAI based congestion control is activated at the AMF, the AMF may perform the congestion control and the UE may perform the congestion control.

In an example embodiment, the network may detect and start performing DNN based congestion control when one or more DNN congestion criteria are met. The network may store a DNN congestion back-off timer on a per UE and congested DNN basis. If the UE does not provide a DNN for a non-emergency PDU session, then the network may use the selected DNN. In the UE, 5GS session management timers T3396 for DNN based congestion control are started and stopped on a per DNN basis. The DNN associated with T3396 may be the DNN provided by the UE during the PDU session establishment. If no DNN is provided by the UE along the PDU session establishment request, then T3396 may be associated with no DNN. For this purpose the UE may retain/store the DNN provided to the network during the PDU session establishment. The timer T3396 associated with no DNN may never be started due to any 5GSM procedure related to an emergency PDU session. If the timer T3396 associated with no DNN is running, it may not affect the ability of the UE to request an emergency PDU session. If T3396 is running or is deactivated, and the UE is a UE configured for high priority access in selected PLMN, then the UE may be allowed to initiate 5GSM procedures for the respective DNN or without a DNN.

In an example embodiment, the network may detect and start performing S-NSSAI based congestion control when one or more S-NSSAI congestion criteria are met. The network may store an S-NSSAI congestion back-off timer on a per UE, S-NSSAI, and optionally DNN basis. If the UE does not provide a DNN for a non-emergency PDU session, then the network may use the selected DNN. If the UE does not provide an S-NSSAI for a non-emergency PDU session, then the network may use the selected S-NSSAI. In the UE, 5GS session management timers T3584 for the S-NSSAI based congestion control may be started and stopped on a per S-NSSAI and DNN basis. In the UE, 5GS session management timers T3585 for the S-NSSAI based congestion control may be started and stopped on a per S-NSSAI basis. The S-NSSAI associated with T3584 may be the S-NSSAI provided by the UE during the PDU session establishment. The DNN associated with T3584 may be the DNN provided by the UE during the PDU session establishment. If no S-NSSAI but DNN is provided by the UE along the PDU session establishment request message, then T3584 is associated with no S-NSSAI and a DNN provided to the network during the PDU session establishment. If no DNN but S-NSSAI is provided by the UE along the PDU session establishment request message, then T3584 may be associated with no DNN and an S-NSSAI provided to the network during the PDU session establishment. If no DNN and no S-NSSAI is provided by the UE along the PDU session establishment request message, then T3584 may be associated with no DNN and no S-NSSAI. For this purpose, the UE may retain/store the DNN and S-NSSAI provided to the network during the PDU session establishment. The timer T3584 associated with no DNN and an S-NSSAI may never be started due to any 5GSM procedure related to an emergency PDU session. If the timer T3584 associated with no DNN and an S-NSSAI is running, it may not affect the ability of the UE to request an emergency PDU session. The S-NSSAI associated with T3585 may be the S-NSSAI provided by the UE during the PDU session establishment. If no S-NSSAI is provided by the UE along the PDU SESSION ESTABLISHMENT REQUEST message, then T3585 may be associated with no S-NSSAI. If T3584 is running or is deactivated, and the UE may be a UE configured for high priority access in selected PLMN, then the UE may be allowed to initiate 5GSM procedures for the respective S-NSSAI or [S-NSSAI, DNN] combination. If T3585 is running or is deactivated, and the UE is configured for high priority access in selected PLMN, then the UE may be allowed to initiate 5GSM procedure for the respective S-NSSAI.

In an example embodiment, a group specific NAS level congestion control may be applied to a specific group of UEs. Group specific NAS level congestion control is performed at the 5GC. The AMF and SMF may apply NAS level congestion control for a UE associated to an Internal-Group Identifier.

In an example, a SMF may employ mechanisms for avoiding and handling overload situations. This may include the measures such as SMF overload control that may result in rejections of NAS requests. The SMF overload control may be activated by SMF due to congestion situation at SMF e.g., configuration, by a restart or recovery condition of a UPF, or by a partial failure or recovery of a UPF for a particular UPF(s). Under unusual circumstances, if the SMF has reached overload situation, the SMF may activates NAS level congestion control. The SMF may restrict the load that the AMF(s) are generating, if the AMF is configured to enable the overload restriction.

In an example embodiment, the network may detect and start performing CAG based congestion control when one or more CAG related congestion criteria are met. The wireless network may reject an access request with a cause value indicating that a CAG based congestion control is in effect. The wireless device may receive a response message indicating that the request is rejected, the response message may comprise a cause value indicating that the CAG ID that the UE requested is subject to congestion/overload control or barring. The network may store a CAG congestion back-off timer on a per UE, per CAG ID, NPN ID, and/or the like. In the UE, 5GS session management timers for CAG may be employed. The UE or the network may reuse/employ an existing timer such as T3584, and/or the like. The UE and/or the network may define/determine a new timer dedicated for CAG related congestion and overload. In the UE, 5GS session management timers for the CAG based congestion control may be started and stopped on a per CAG ID basis. The CAG or CAG ID associated with the timer may be the CAG ID provided by the UE during the PDU session establishment. If no The UE may retain/store the CAG or CAG UD provided to the network during the PDU session establishment. If the timer for CAG overload/congestion is running or is deactivated, and the UE may be a UE configured for high priority access in selected PLMN, then the UE may be allowed to initiate 5GSM procedures via the respective CAG for the S-NSSAI or [S-NSSAI, DNN] combination that the UE is required to access. If the timer is running or is deactivated, and the UE is configured for high priority access in selected PLMN, then the UE may be allowed to initiate 5GSM procedure via the CAG for the respective S-NSSAI.

Figure 26:
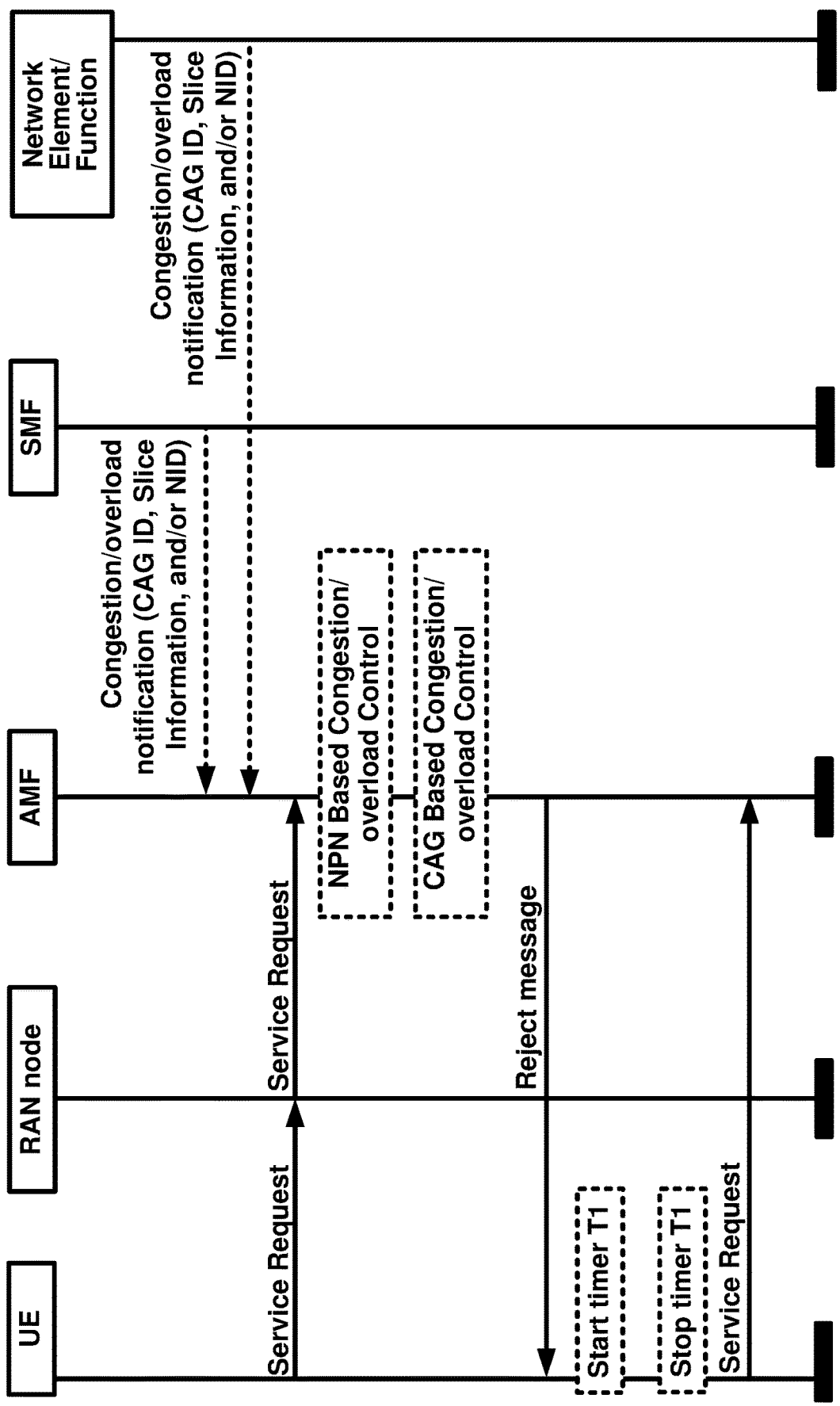
FIG. 26 is an example diagram as per an aspect of an embodiment of the present disclosure.

In an example as depicted in FIG. 25 and FIG. 26, a PDU session may be established using the PDU session establishment procedure. The PDU session establishment request from the UE to the network (e.g., AMF, SMF, and/or the like) may comprise the CAG ID, location information, cell information, and/or the like that the UE is accessing the network. A network element such as a SMF, AMF, or other network functions such as a messaging function for CIoT, IoT, and/or the like, may determine that the number of signaling messages, NAS requests, SM-NAS requests, and/or the like associated with the UEs accessing CAG ID 1 exceed a threshold and/or cause an overload/congestion in the network. The network function, AMF, SMF, and/or the like may send a congestion/overload notification message to the AMF. The congestion/overload notification message may comprise the CAG ID that causes the congestion, CAG ID 1, slice information, DNN, NPN ID, NID, and/or the like.

In an example, the AMF may perform a CAG overload control or NPN based overload control. The NAS level overload control may be performed by the AMF, SMF, or a network function within the wireless network. In an example, the AMF may receive from a UE via RAN node, a service request message. If the service request message comprises the CAG ID, that is subject to barring or overload/congestion, the AMF may send a reject message, a service reject message, and/or the like. The reject message may comprise a wait time. The wait time may be employed by the UE. When the UE receives the reject message, the UE may wait for a period of time determined by the wait time and send the service request message. The wait time may be employed by the RAN node. When the RAN receives a reject message or an overload indication from the AMF, the RAN node may delay transmission of the service request to the AMF for a period of time determined by the wait time. The reject message may comprise a CAG ID that is rejected or is the case of rejection. In an example, the UE may determine to access the network via a different CAG other than the one that is rejected.

In an example, the SMF may perform a CAG based overload control or NPN based overload control. The NAS level overload control may be performed by the SMF or the AMF, or a network function within the wireless network. In an example, the SMF may receive from a UE via RAN node and the AMF, a service request message. If the service request message comprises the CAG ID that is subject to barring or overload/congestion control, the SMF may send a reject message to the AMF. The AMF may send to the wireless device, a service reject message, and/or the like. The service reject message may comprise a wait time, the CAG ID, and/or the like. The wait time may be employed by the UE for an access attempt. When the UE receives the reject message, the UE may wait for a period of time determined by the wait time and send the service request message. The wait time may be employed by the AMF. When the AMF receives a reject message or an overload indication from the SMF, the AMF may delay transmission of the NAS message or SM-NAS message to the SMF for a period of time determined by the wait time. In an example, the wait time parameter may be configured in the SMF, AMF, and/or the like. The wait time parameter may be provided by the SMF or a core network entity to the AMF or the base station. The wait time parameter (e.g., that may be determined/configured at the SMF, AMF, the base station, or provided by the network) may be per NPN, CAG or CAG ID. The wait time parameter may be based on a load information, load condition, congestion level, and/or the like of the wireless network, AMF, base station, a RAN or core network element of the wireless network. The wait time parameter may be based on a priority of the CAG, type of service that the CAG supports, cell id, and/or the like.

In an example, the UE and/or the network may be configured with a CAG overload/congestion back off timer (Timer T1 as depicted in FIG. 25 and FIG. 26). When the UE receives the reject message with a cause code indicating the CAG ID is barred or congestion/overload is caused by the CAG, CAG ID, the Timer T1 may be started and upon elapsing the time period of timer T1, the UE may retransmit the message, or service request to the network.

Figure 27:
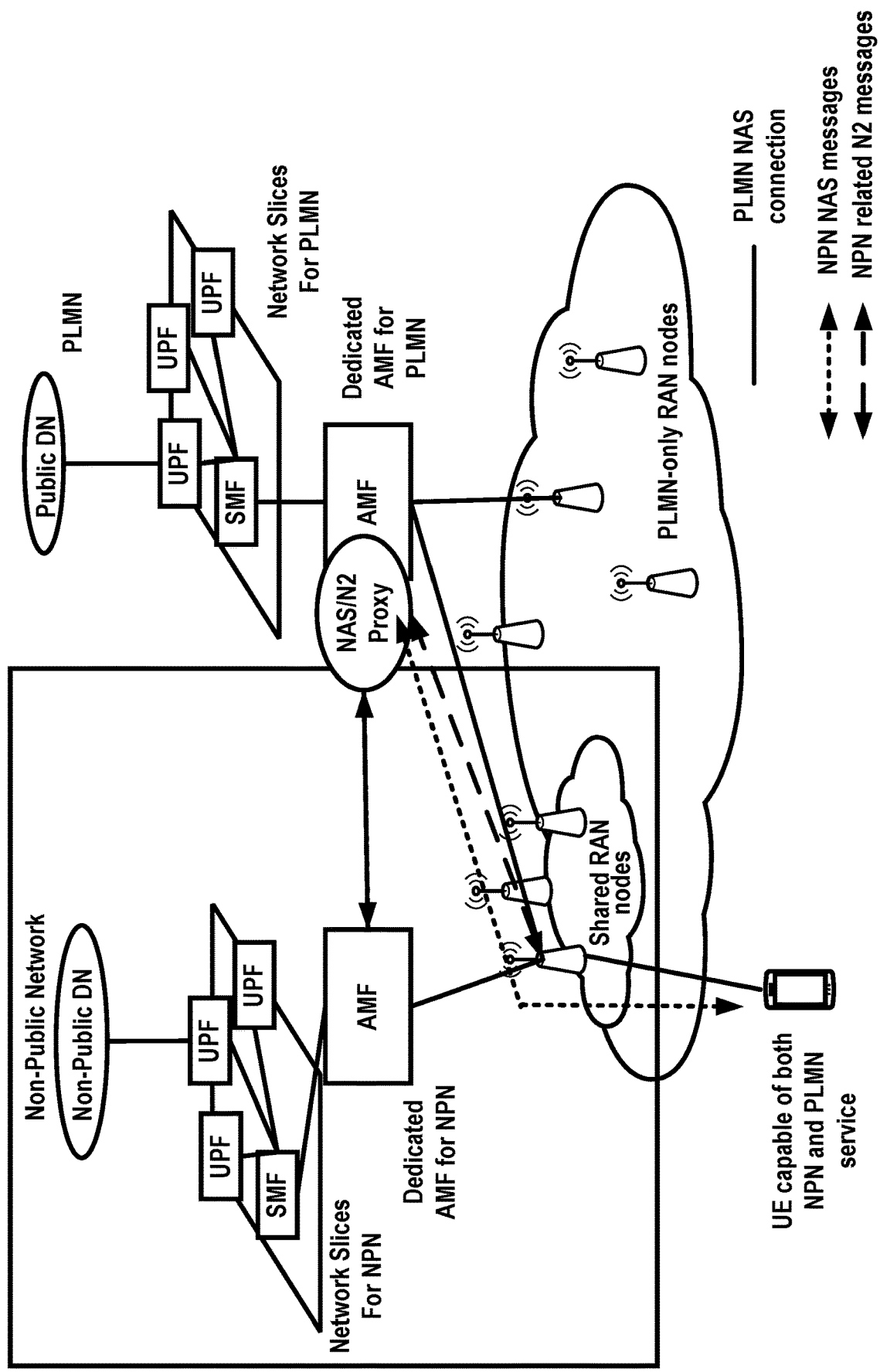
FIG. 27 is an example diagram as per an aspect of an embodiment of the present disclosure.

As depicted in example FIG. 27, a network model for hosting a Non-Public Network with a PLMN infrastructure may be employed. In this model, a Non-Public Network may be deployed using the infrastructure resources of a PLMN. Some RAN nodes may be shared by both the NPN and the PLMN so the UEs that are capable of both NPN and PLMN services may access both networks through these shared RAN nodes. Besides the shared RAN nodes, the NPN may have its dedicated network functions/resources such as dedicated AMFs, dedicated Network Slices, data network, and/or the like.

Figure 28:
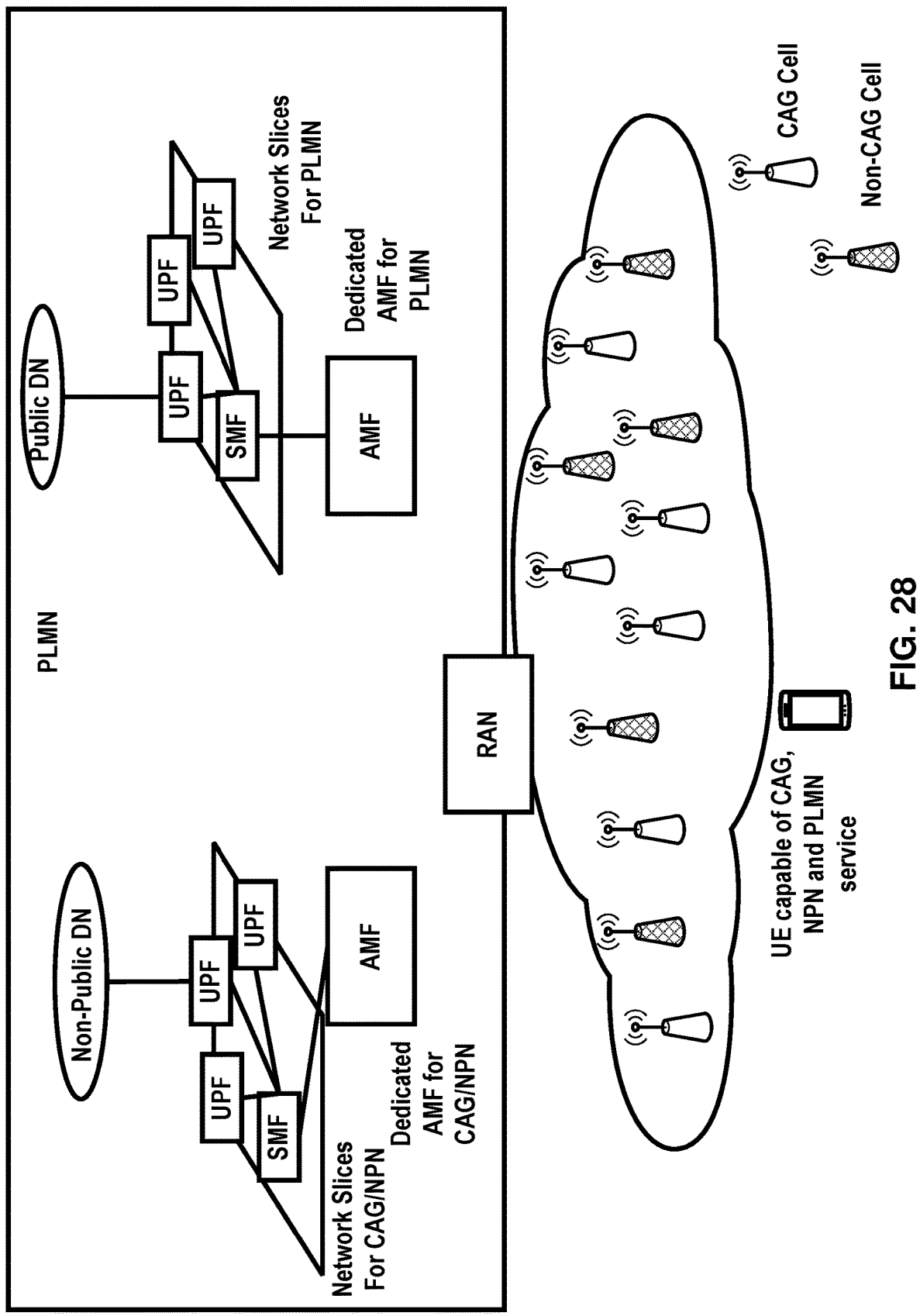
FIG. 28 is an example diagram as per an aspect of an embodiment of the present disclosure.

As depicted in example FIG. 28, Public network integrated NPNs are NPNs made available via PLMNs e.g., by means of dedicated DNNs, or by one (or more) Network Slice instances allocated for the NPN or a CAG. The existing network slicing functionalities may apply. When an NPN is made available via a PLMN, then the UE may have a subscription for the PLMN. As network slicing may not enable the possibility to prevent UEs from trying to access the network in areas which the UE is not allowed to use the Network Slice allocated for the NPN, Closed Access Groups may be employed in addition to network slicing to apply access control.

Figure 29:
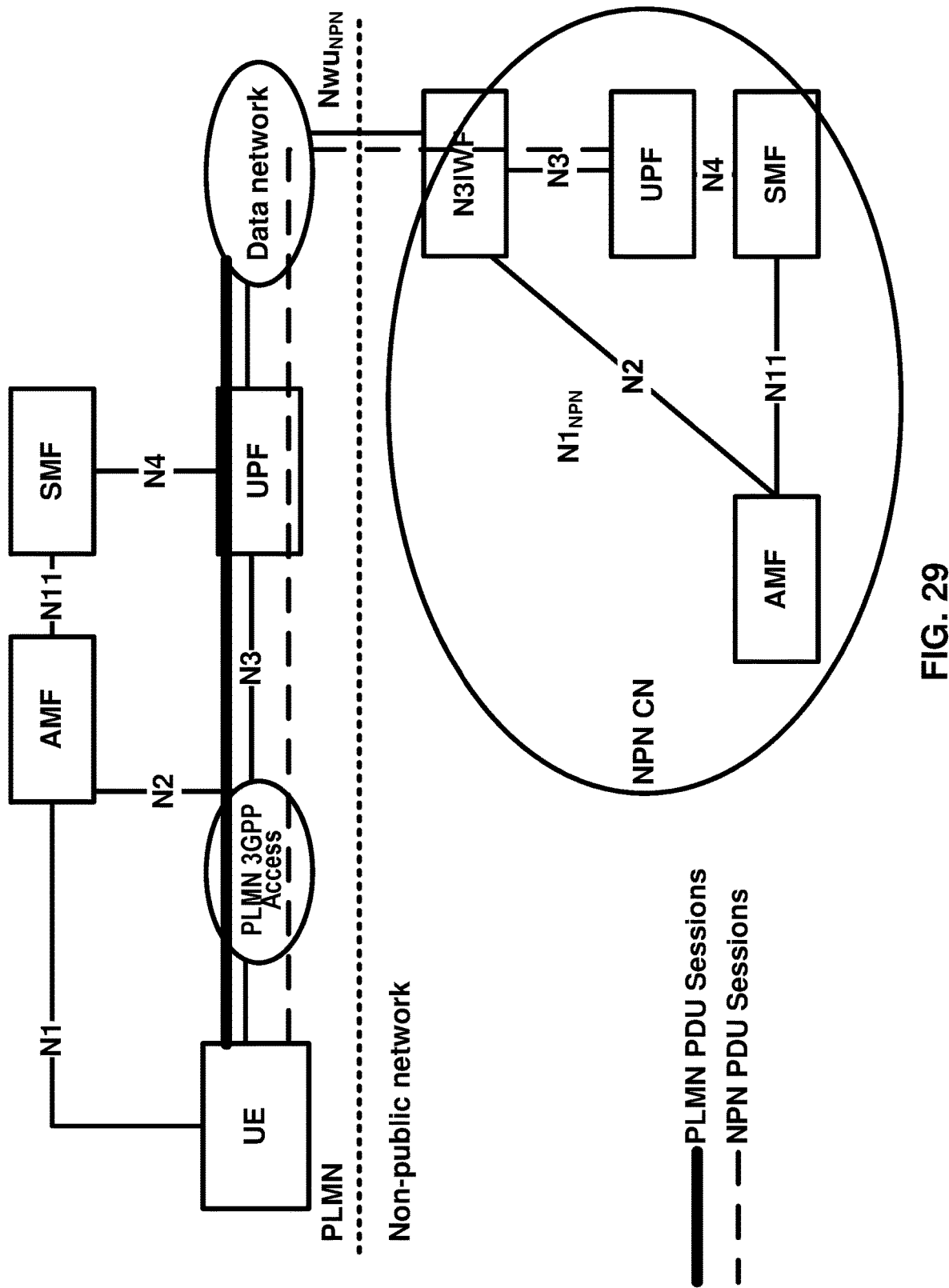
FIG. 29 is an example diagram as per an aspect of an embodiment of the present disclosure.
Figure 30:
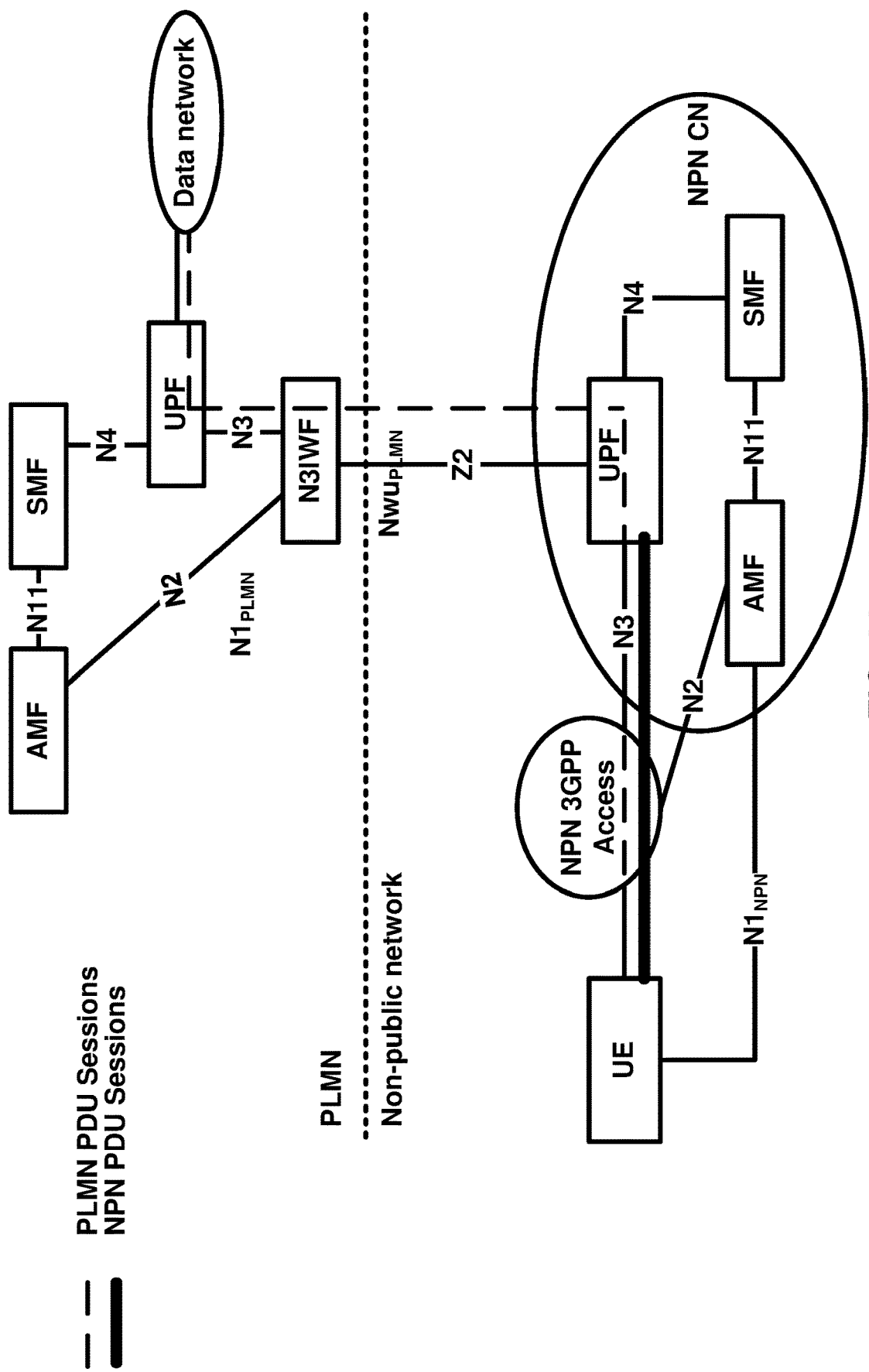
FIG. 30 is an example diagram as per an aspect of an embodiment of the present disclosure.

As depicted in example FIG. 29, and FIG. 30, non-public networks may be restricted for use by authorized subscribers and may not be available for public use. The UE may be authorized to use both a Public PLMN and non-public networks in which case, it may be possible for the UE to obtain service continuity for services offered by Public PLMN via non-public network and vice versa.

Figure 31:
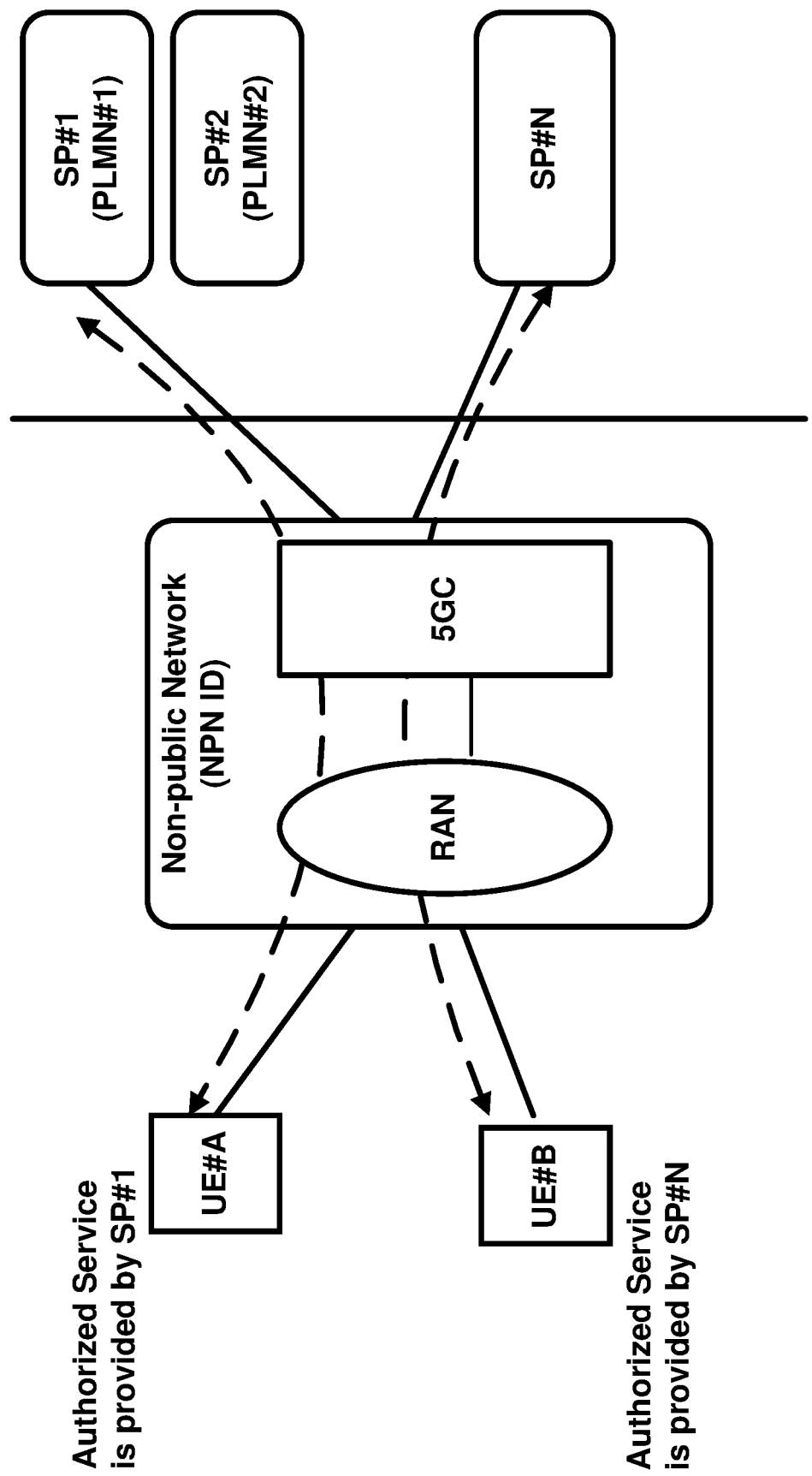
FIG. 31 is an example diagram as per an aspect of an embodiment of the present disclosure.
Figure 32:
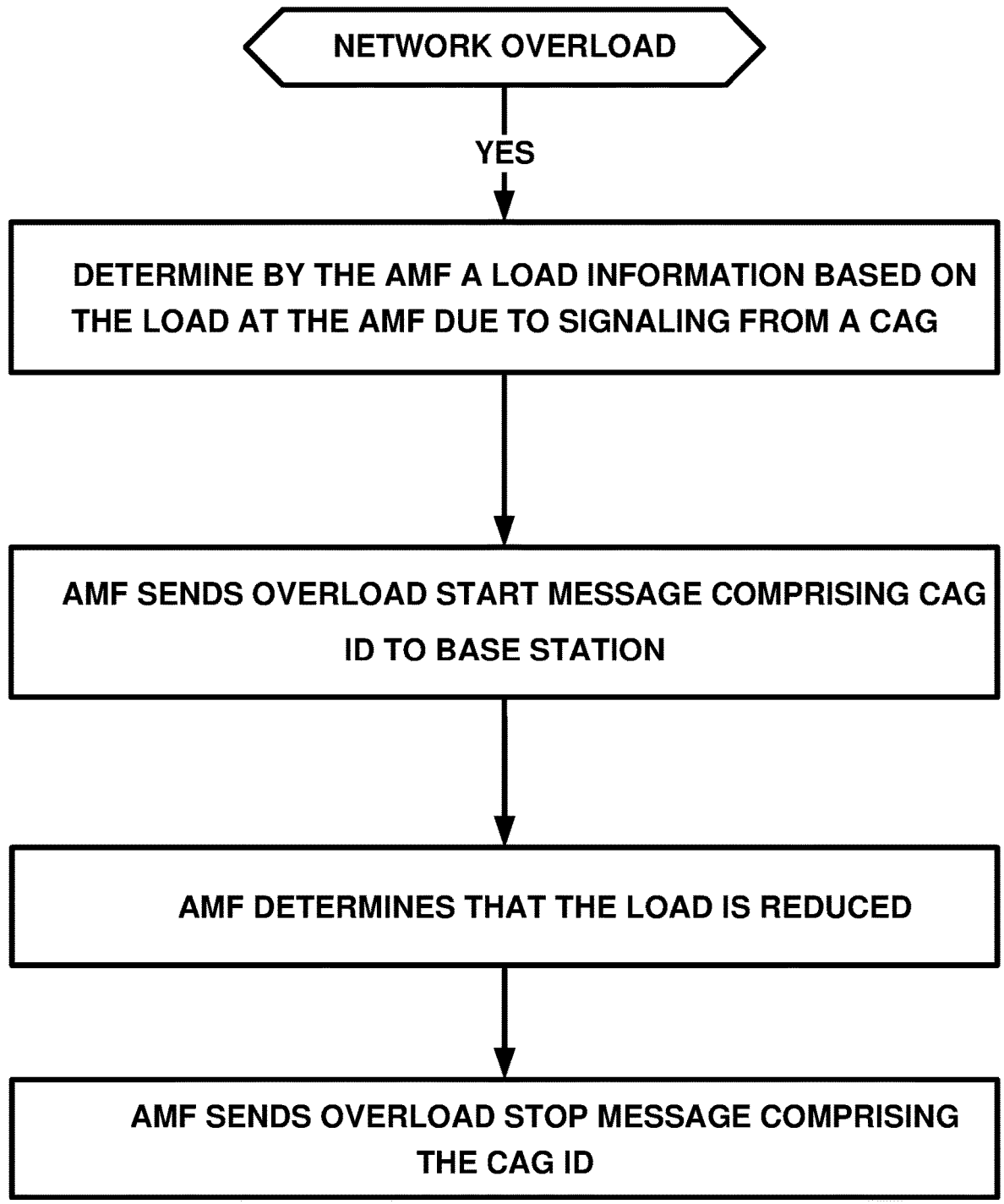
FIG. 32 is an example diagram as per an aspect of an embodiment of the present disclosure.
Figure 33:
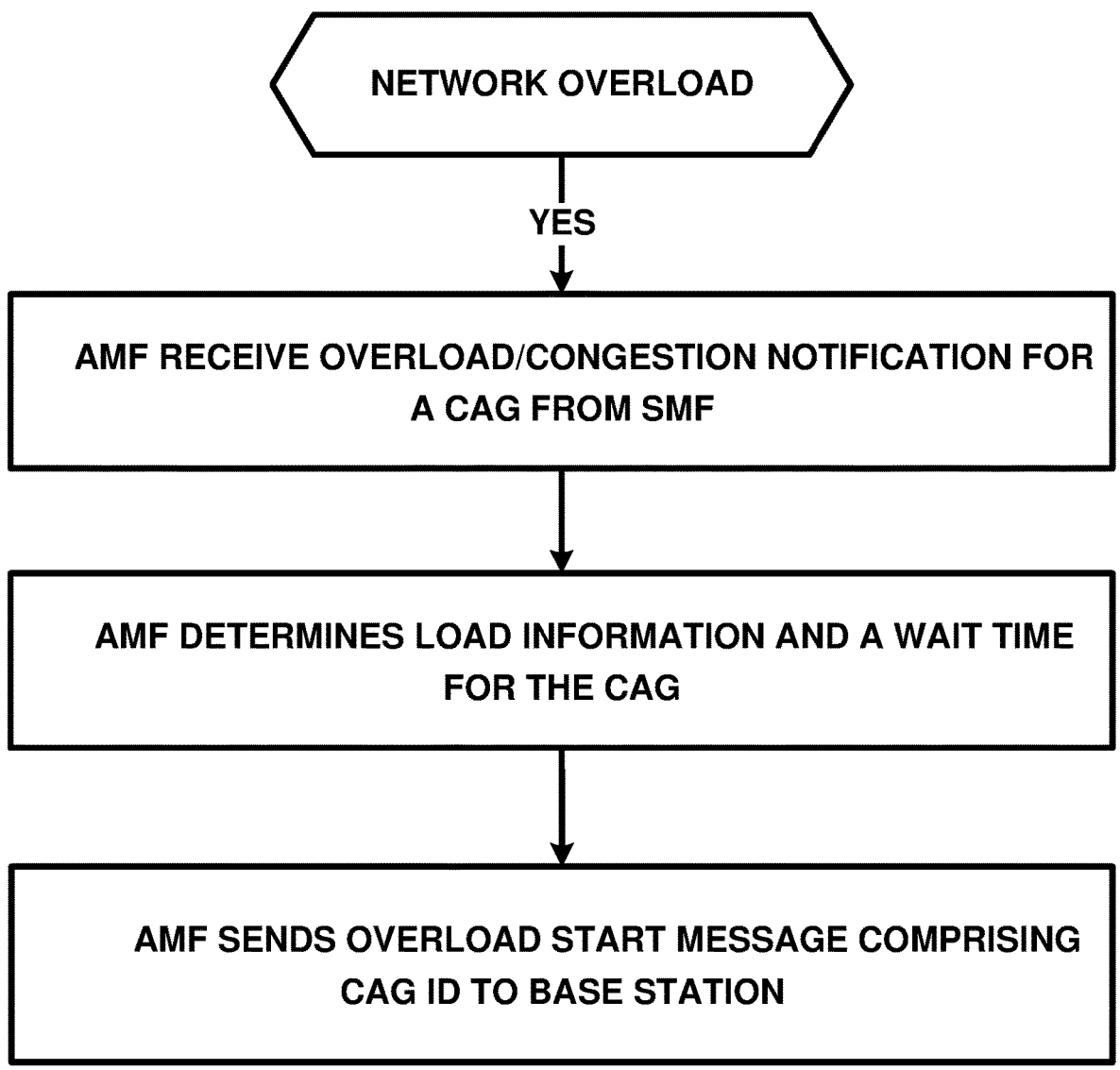
FIG. 33 is an example diagram as per an aspect of an embodiment of the present disclosure.
Figure 34:
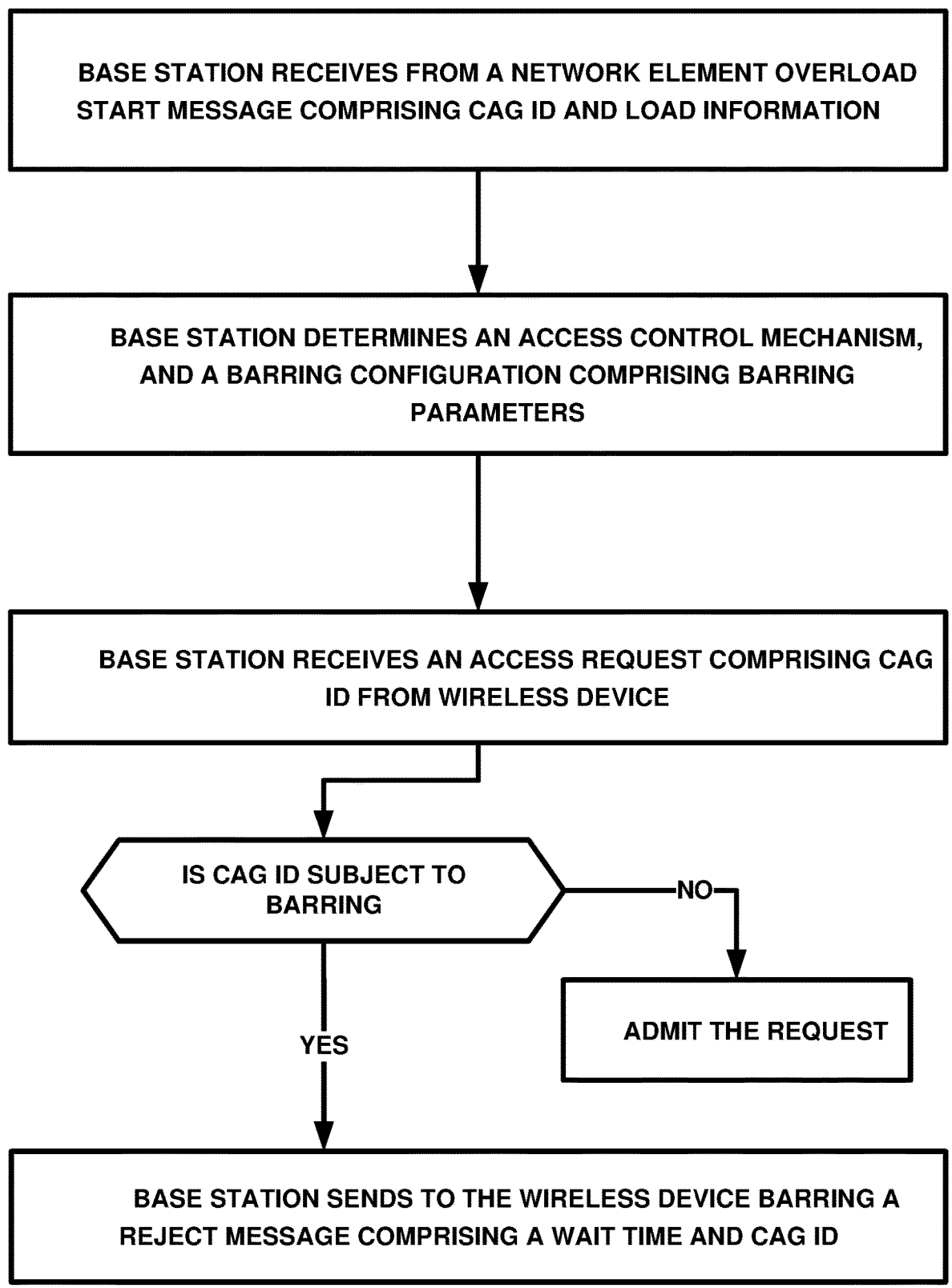
FIG. 34 is an example diagram as per an aspect of an embodiment of the present disclosure.
Figure 35:
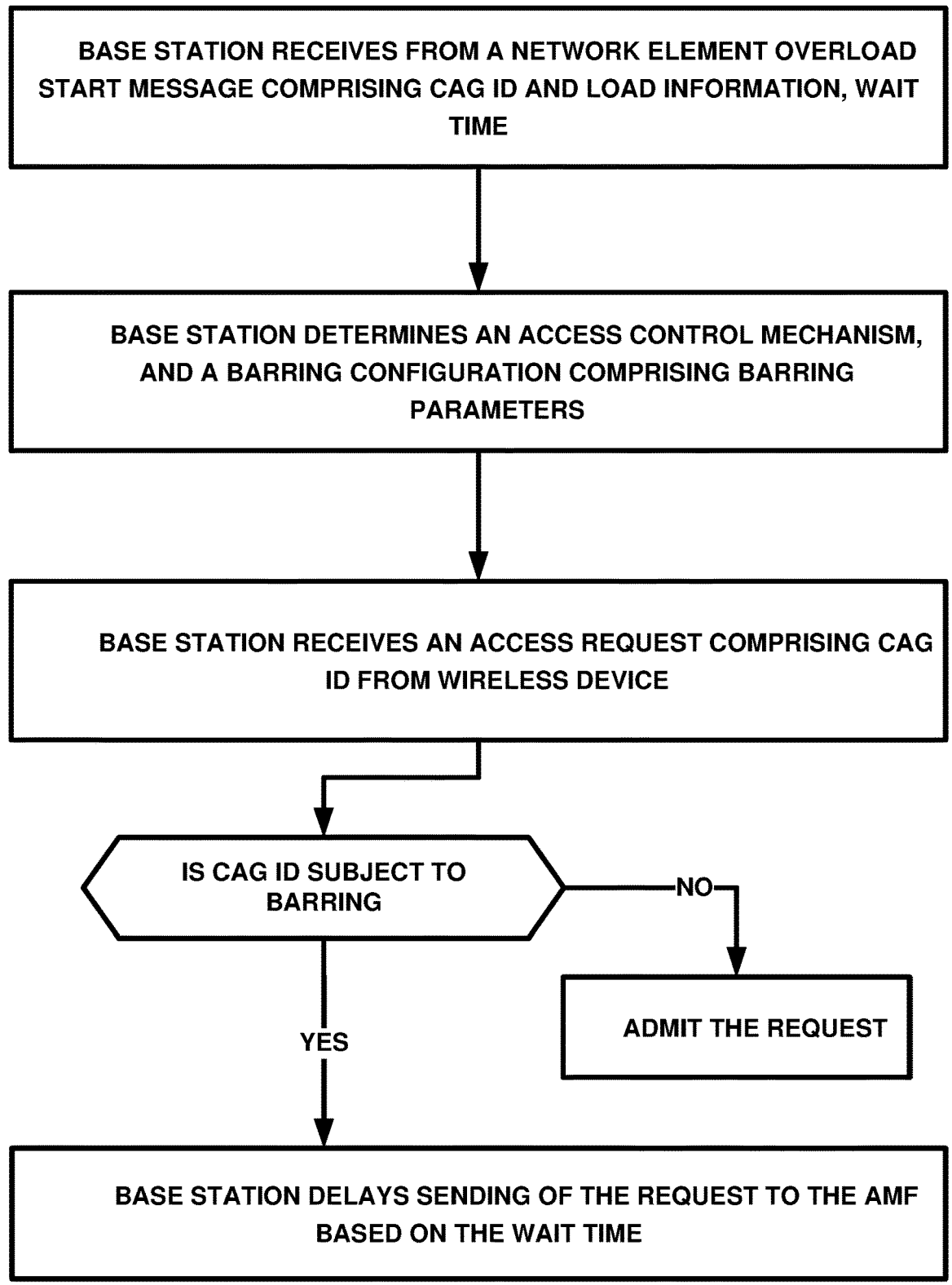
FIG. 35 is an example diagram as per an aspect of an embodiment of the present disclosure.
Figure 36:
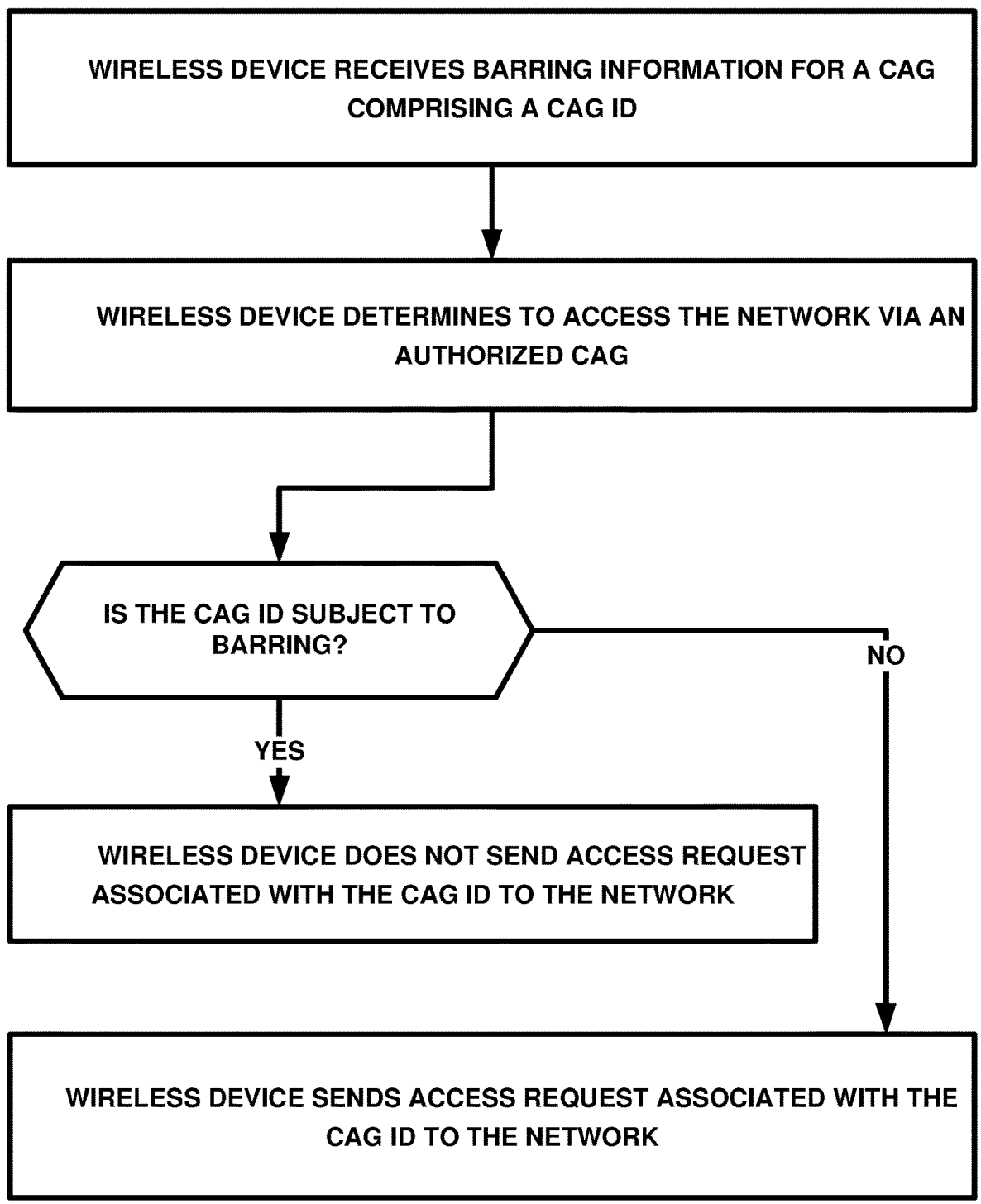
FIG. 36 is an example diagram as per an aspect of an embodiment of the present disclosure.
Figure 37:
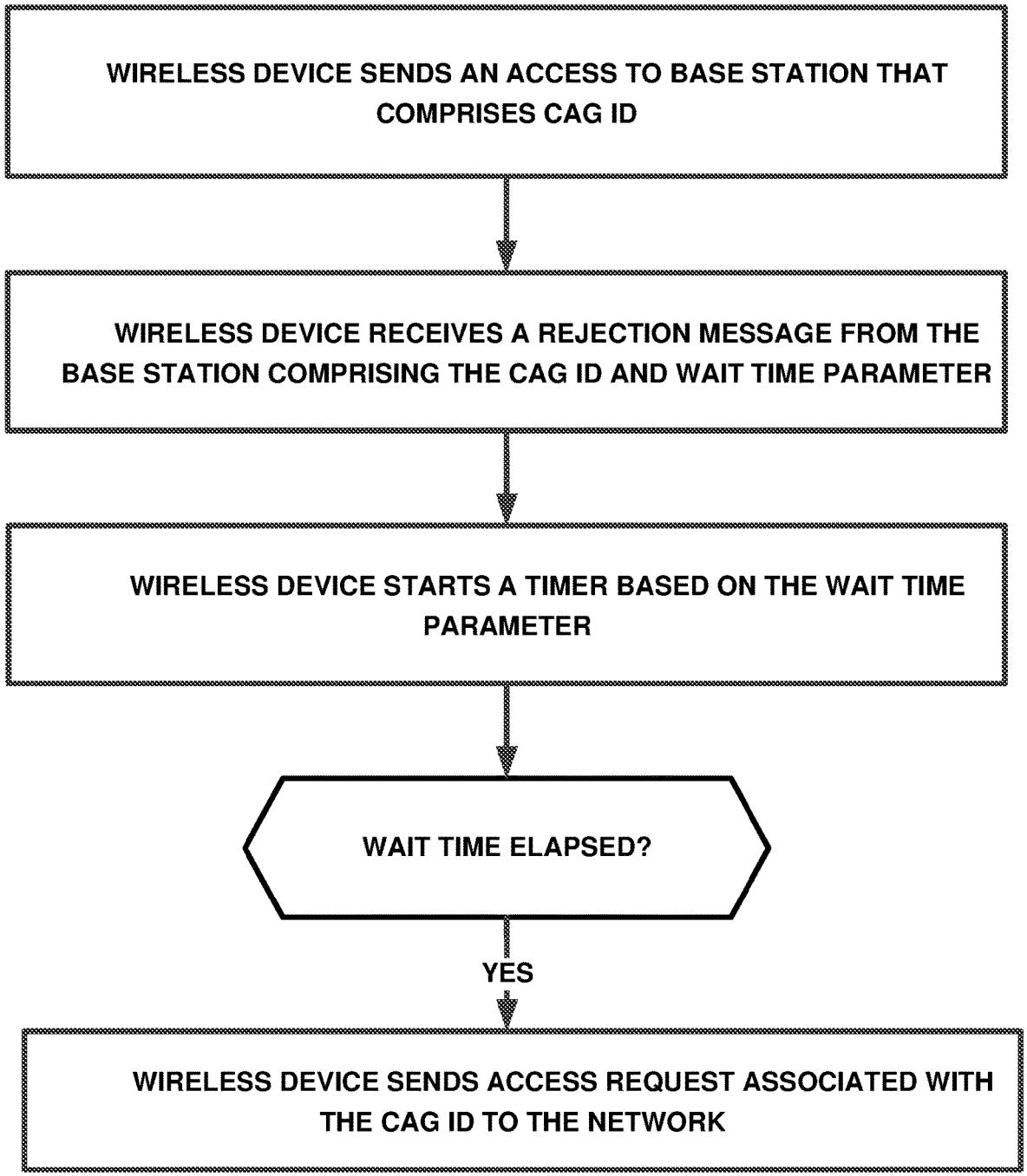
FIG. 37 is an example diagram as per an aspect of an embodiment of the present disclosure.

As depicted in example FIG. 31, a network may be identified with a non-public network identifier (e.g., NPN ID, NID, and/or the like) advertised in the broadcast channels of a non-public network cell. A non-public network may support services provided by one or more Service Providers (SP), which may comprise MNOs, 3rd party service provider, and/or the like. As depicted in example FIG. 31, UE #A and UE #B may be registered to the non-public network (NPN) identified by a Non-public network ID (NPN-ID). Service provider represented by SP #1, which is a PLMN, may provide the authorized service for UE #A. Service provider represented by SP #N, which is 3rd party service provider, may provide the authorized service for UE #B.

In an example embodiment, a wireless device may receive from a wireless network, a barring information for a closed access group. The barring information may comprise a first closed access group identifier (CAG ID). The wireless device may determine to access the wireless network based on one or more authorized CAG IDs authorized by the network. The wireless device may determine a barring decision based on the first CAG ID included in the barring information. The first CAG ID may be one of the one or more authorized CAG IDs. The wireless device may send to the wireless network, an access request associated with the first CAG ID. The access request may be in response to the barring decision indicating not to bar the access attempt The wireless device may determine not to send the access request associated with the first CAG ID, in response to the barring decision indicating to bar the access attempt associated with the first CAG ID. The wireless device may receive the barring information in response to an overload/congestion condition of the wireless network. The barring decision may comprise delaying the access attempt for a period of time. The barring decision may comprise determining not to send the access attempt. The wireless device may send an access request that may comprise a second CAD ID. The wireless device may send an access attempt for a second CAG ID. The wireless device may receive the barring information indicating that access associated with the CAG ID is allowed. The allowance may be based on an indication from a network element of the wireless network that the wireless network is not congested/overloaded. The barring information may comprise a time duration indicating that the wireless device is not allowed to access the wireless network for the time duration. The time duration may be based on a time duration parameter received from a base station. The barring information may comprise an access category associated with the closed access group. The barring information may comprise an access class associated with the closed access group. The barring information may comprise an access identity associated with the closed access group. In an example, the wireless device may receive one or more authorized CAG IDs broadcast by the wireless network. The wireless device may determine based on at least one of the one or more authorized CAG IDs that the wireless device is authorized to access the wireless network. The wireless device may access the wireless network prior to receiving the barring information from the wireless network. In an example, the wireless device may determine that the first CAG ID is allowed to access the network. The wireless device may send an access request associated with a second CAG ID of the one or more authorized CAG IDs, in response to the barring decision indicating to bar the access attempt associated with the first CAG ID.

In an example embodiment, a wireless device may send to a base station a first request to access the network. The first request may comprise a closed access group identifier (CAG ID). The wireless device may receive from the base station, a rejection message indicating that the access is rejected. The rejection message may comprise a wait time parameter, the CAG ID, a cause, and/or the like. The wireless device may send to the base station a second request to access the network upon elapsing a period of time derived/determined by the wait time. The base station may determine the wait time parameter based on the CAG ID. In an example, the wait time parameter may be configured in the base station. The wait time parameter may be provided by the AMF or a core network entity to the base station. The wait time parameter (e.g., that may be determined/configured at the base station, or provided by the network) may be per CAG ID. The wait time parameter may be based on a load information, load condition, congestion level, and/or the like of the wireless network, AMF, base station, a RAN or core network element of the wireless network. The wait time parameter may be based on a priority of the CAG, type of service that the CAG supports, cell id, and/or the like. The first request may further comprise a network slice identifier, S-NSSAI, and/or the like (e.g., a combination of S-NSSAI, CAG ID, DNN, and/or the like may be employed for determining whether to send an access request to the network, or to determine a barring mechanism, barring decision, and/or the like).

In an example embodiment, a base station may receive from a network element of a wireless network, a message requesting start of overload control for a closed access group (CAG). The message may comprise a load information, a CAG ID associated with the closed access group, and/or the like. The base station may determine based on the load information, a barring configuration that indicates a set of barring parameters for an access attempt of the CAG. The base station may send to a wireless device, a barring information based on the barring configuration. In an example the network element may be an access and mobility management function (AMF). The network element may be a session management function (SMF). The network element may be an operations, administration and maintenance (OAM). The overload message may comprise a location information, mobility restriction, and/or the like. The overload message may comprise a network identifier, a PLMN ID, an NPN ID, and/or the like. The base station may determine that overload control for the closed access group is required. The message may comprise an NGAP overload start message, N2 message, N2 overload message and/or the like. The message may indicate start of an overload control for the CAG. The message may comprise an NGAP overload stop message indicating stop of an overload control for the CAG. In an example, the wireless device may receive one or more authorized CAG IDs broadcast by the wireless network. The wireless device may determine based on at least one of the one or more authorized CAG IDs that the wireless device is authorized to access the wireless network. The wireless device may access the wireless network prior to receiving the barring information from the wireless network. The base station may send to the wireless device, one or more authorized closes access group identifiers (CAG IDs). The barring configuration may comprise sending to the wireless device from the base station a reject message, delaying sending access request to the AMF for a period of time, and/or the like. The reject message may comprise a wait time parameter. The wireless device may send an access attempt to the wireless network upon elapsing the wait time of the wait time parameter (e.g., determined by the wait time parameter). The load information may comprise a utilization factor indicating a load level of the wireless network, a load metric determining the load level of the wireless network, and/or the like. The barring information may comprise a wait time parameter, a time parameter indicating a period of time that access via the CAG ID is barred, an access category associated with the CAG ID, an access identity associated with the CAG ID, an access class associated with the CAG ID, and/or the like. The barring parameter(s) may comprise a parameter indicating a validity period for barring of CAG ID, a wait time parameter, a rule for handling of access requests, and/or the like. The rule for handling of access requests may comprise rejecting the access request by the base station, delaying the forward of access request to the AMF, and/or the like. In an example, the base station may reject based on the load information, a percentage of requests that comprise the CAG ID, and/or the like. n an example, the base station may reject access requests based on the load information, a percentage of wireless devices that attempt access via the CAG.

In an example embodiment, a base station may receive from a network element of a wireless network, a message requesting start of overload control for a closed access group (CAG). The overload message may comprise a load information, a CAG ID associated with the closed access group, and/or the like. The base station may receive from a wireless device, a radio resource control (RRC) message. The RRC message may indicate a request to access the base station and/or a wireless network. The RRC message may comprise the CAG ID. The base station may determine based on the load information, the RRC message, the CAG ID, and/or the like to reject the RRC message or an access attempt by a wireless device. The base station may send to the wireless device, a reject message. The reject message may comprise a cause, a wait time parameter for an access attempt of the wireless device for the CAG, and/or the like. The load information may comprise a utilization factor. In an example embodiment, an AMF may receive from a session management function (SMF), a first message indicating overload/congestion notification for a closed access group. The first message may comprise a closed access group identifier, a wait time parameter, and/or the like. The AMF may determine a load information associated with the CAG. The SMF may determine the load information and send it to the AMF. The AMF may send to a base station, a second message indicating start of overload control. The second message may comprise the load information, the CAG identifier, the wait time, and/or the like. The AMF may send to the base station a third message indicating stop of overload in response to a determining that a load is reduced. The load information may comprise an indication that the network is congested/overloaded. The load information may indicate a utilization factor indicating a load level. The second message may comprise a time parameter that may be employed to indicate that overload control is in effect for a duration indicated by the time parameter. The second message may comprise an indication to reject an access request for the CAG received by the base station.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 38:
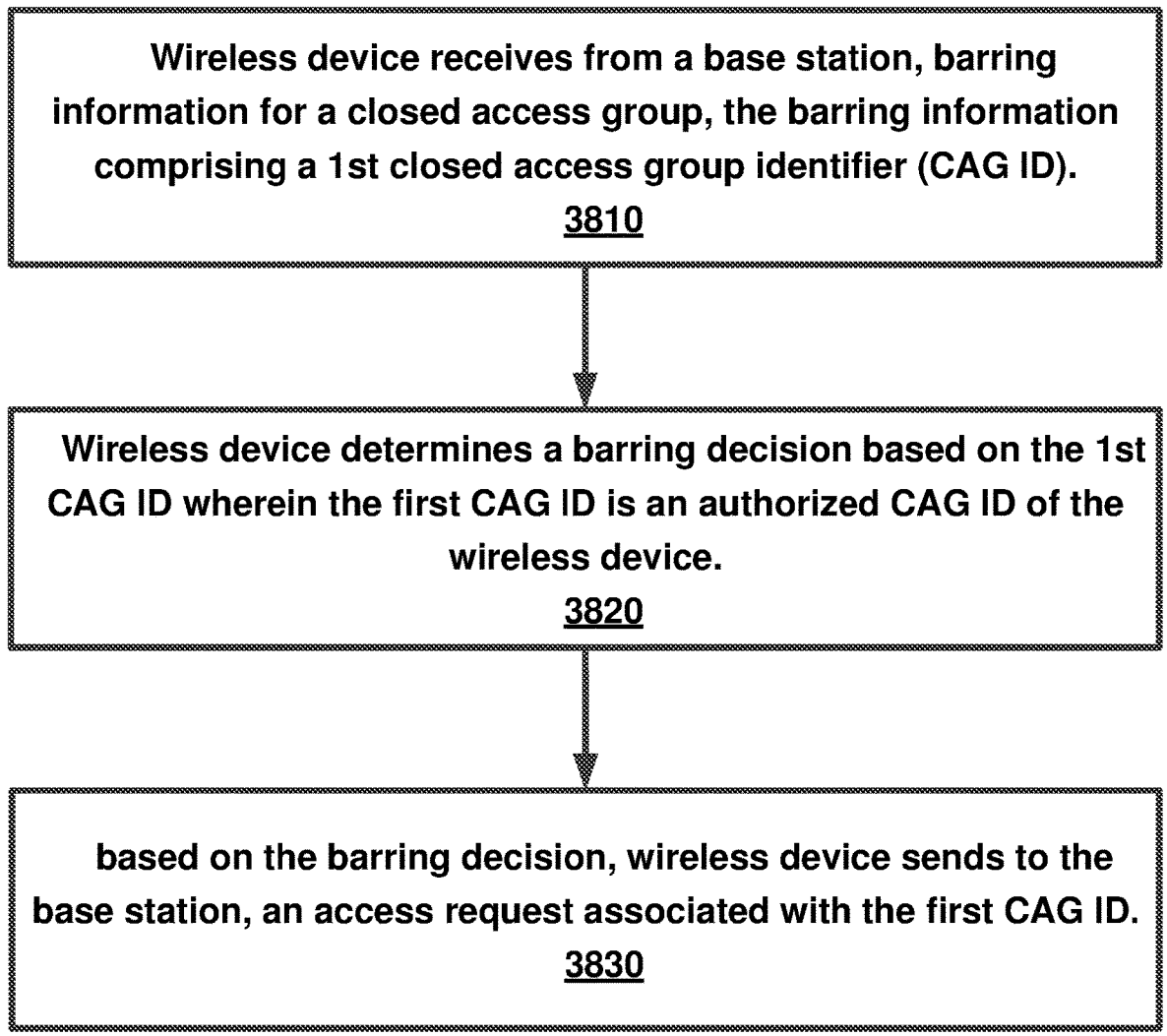
FIG. 38 is a flow chart of an aspect of an example embodiment of the present disclosure.

FIG. 38 is an flow diagram as per an aspect of an example embodiment of the present disclosure. At 3810, a wireless device may receive from a base station, barring information for a closed access group. The barring information may comprise a first closed access group identifier (CAG ID). At 3820, the wireless device may determine a barring decision based on the first CAG ID. The first CAG ID may be an authorized CAG ID of the wireless device. At 3830, the wireless device, based on the barring decision, may send to the base station, an access request associated with the first CAG ID.

FIG. 39 is an flow diagram as per an aspect of an example embodiment of the present disclosure. At 3910, a base station may receive from a network entity of a core network, a message indicating a start of an overload of the core network. The message may comprise a first closed access group identifier (CAG ID). At 3920, the base station may send to a wireless device, barring information for a closed access group. The barring information may comprise the first CAG ID. At 3930, the base station may receive from the wireless device, an access request based on a barring decision by the wireless device.

According to an example embodiment, a wireless device may receive from a base station, barring information for a closed access group. The barring information comprising a first closed access group identifier (CAG ID).

A barring decision may be determined based on the first CAG ID. The first CAG ID may be an authorized CAG ID of the wireless device. Based on the barring decision, the wireless device may send to the base station, an access request associated with the first CAG ID. According to an example embodiment, the wireless device may receive the barring information in a message comprising a system information block (SIB). According to an example embodiment, the barring decision may comprise delaying sending the access request for a period of time. According to an example embodiment, the barring decision may comprise determine not to send the access request. According to an example embodiment, based on a response to the access request, a second access request to access a wireless network may be sent. The second access request may comprise the first CAG ID. A rejection message may be received indicating that the second access request is rejected. The second access request may be sent to the base station after a period of time equal to a barring time has elapsed from the rejection message. According to an example embodiment, the barring information further may comprises a time duration indicating that the wireless device is not allowed to access a wireless network for the time duration.

According to an example embodiment, a base station may receive a message from a network entity of a core network. The message may indicate a start of an overload of the core network. The message may comprise a first closed access group identifier (CAG ID). The base station may send to a wireless device, barring information for a closed access group. The barring information may comprise the first CAG ID. The base station may receive from the wireless device, an access request based on a barring decision by the wireless device.

According to an example embodiment, sending one or more authorized CAG IDs broadcast by a wireless network. According to an example embodiment, the barring decision may comprise delaying sending the access request for a period of time. According to an example embodiment, the barring decision may comprise determining not to send the access request. According to an example embodiment, based on a response to the access request, a second access request to access a wireless network may be received. The second access request may comprise the first CAG ID. A rejection message indicating that the second access request is rejected may be sent. The second access request to the base station after a period of time equal to a barring time has elapsed from the rejection message may be received. According to an example embodiment, the barring information may comprises a time duration indicating that the wireless device is not allowed to access a wireless network for the time duration.

According to an example embodiment, a wireless device may receive from a base station, barring information for a closed access group. The barring information may comprise a first closed access group identifier (CAG ID). The wireless device may determine a barring decision based on the first CAG ID. The first CAG ID may be an authorized CAG ID of the wireless device. The wireless device may send, based on the barring decision, to the base station, an access request associated with the first CAG ID.

According to an example embodiment, the wireless device may receive the barring information based on an overload condition of a wireless network. According to an example embodiment, wireless device may send a second access request, associated with a second CAG ID of one or more authorized CAG IDs, in response to a barring decision indicating to bar the access request. In response to an indication that a wireless network is not overloaded, the barring information may indicate that the access request is allowed. According to an example embodiment, the barring information may be determined based on load information of the wireless network. According to an example embodiment, the load information may comprise a utilization factor associated with the first CAG ID indicating a load level of the wireless network. According to an example embodiment, the load information may comprise a load metric indicating the load level of the wireless network. According to an example embodiment, the wireless device may receive the barring information in a message comprising a system information block (SIB). The SIB message may comprise SIB 1. According to an example embodiment, the barring decision may comprise delaying sending the access request for a period of time. The barring decision may comprise determining not to send the access request. According to an example embodiment, the wireless device may send, based on a response to the access request, a second access request to access a wireless network. According to an example embodiment, the second access request may comprise the first CAG ID. According to an example embodiment, the wireless device may receive a rejection message indicating that the second access request is rejected. According to an example embodiment, the wireless device may send the second access request to the base station after a period of time equal to a barring time has elapsed from the rejection message. According to an example embodiment, the rejection message may comprise a time duration. According to an example embodiment, the barring information may comprise a time duration indicating that the wireless device is not allowed to access a wireless network for the time duration.

According to an example embodiment, a base station may receive from a network node of a core network, a message indicating a start of an overload of the core network. The message may comprise one or more closed access group (CAG) identifiers.

According to an example embodiment, the base station may receive from a wireless device, a radio resource control (RRC) message indicating an access request, the RRC message comprising a CAG identifier. According to an example embodiment, the base station may determine to reject the access request based on the CAG identifier being one of the one or more CAG identifiers in the message indicating the start of the overload. Based on the determining, transmitting a message to the wireless device. The message may reject the access request. According to an example embodiment, the message indicating the start of the overload further comprises load information. According to an example embodiment, the load information may comprise a utilization factor indicating a load level of the core network. According to an example embodiment, the load information may comprise a load metric determining the load level of the core network. According to an example embodiment, the load information may comprise a load of one or more CAGs. The CAGs are identified by the one or more closed access group (CAG) identifiers. According to an example embodiment, the base station may reject, based on the load information, a percentage of access requests that comprise the CAG identifier. According to an example embodiment, the base station may reject, based on the load information, a percentage of wireless devices that attempt access via a CAG associated with one of the one or more CAG identifiers. According to an example embodiment, the base station may determine a wait time parameter base on the load information. According to an example embodiment, the base station may determine to perform a unified access control for the wireless device, wherein the unified access control comprises transmitting, to the wireless device, a system information block comprising a unified access control barring information element comprising the one or more CAG identifiers. According to an example embodiment, the message may reject the access request comprises a wait time parameter. According to an example embodiment, the message may indicate the start of an overload of the core network is a next generation application protocol (NGAP) overload start message indicating a start of an overload control for the one or more CAG identifiers. The message indicating the start of the overload of the core network may further comprise a network identifier. The message indicating the start of the overload of the core network may further comprise a non-public network (NPN) identifier. The message indicating the start of the overload of the core network may further comprise a wait time parameter. According to an example embodiment, the network node of the core network is an access and mobility management function network element. According to an example embodiment, the network node of the core network is a session management function network element. According to an example embodiment, the network node of the core network is an operations, administration and maintenance network element. According to an example embodiment, the base station may receive, from the network node of the core network, a message indicating a stop of an overload of the core network comprising the one or more CAG identifiers; According to an example embodiment, a determination may be made to accept the access request based on the CAG identifier being one of the one or more CAG identifiers in the message indicating the stop of the overload of the core network. According to an example embodiment, a message accepting the access request may be transmitted to the wireless device.

According to an example embodiment, a base station may receive, from a network node of a core network, a message indicating a start of an overload of the core network, the message comprising one or more closed access group (CAG) identifiers. According to an example embodiment, the base station may receive from a wireless device, a radio resource control (RRC) message indicating an access request, the RRC message comprising a CAG identifier.

According to an example embodiment, a determination may be made to reject the access request based on the CAG identifier being one of the one or more CAG identifiers in the message indicating the start of the overload. According to an example embodiment, a message may be transmitted to the wireless device. The message may reject the access request based on the determining. The message may indicate the start of the overload further comprises load information. The load information may comprise a utilization factor indicating a load level of the core network. The load information may comprise a load metric determining the load level of the core network. The load information may comprise a load of one or more CAGs. The CAGs may be identified by the one or more closed access group (CAG) identifiers. According to an example embodiment, based on the load information, a percentage of access requests that comprise the CAG identifier may be rejected. According to an example embodiment, a percentage of wireless devices that attempt access via a CAG associated with one of the one or more CAG identifiers may be rejected based on the load information. According to an example embodiment, a determination may be made of a wait time parameter based on the load information. According to an example embodiment, a determination may be made to perform a unified access control for the wireless device. The unified access control may comprises transmitting, to the wireless device, a system information block comprising a unified access control barring information element comprising the one or more CAG identifiers. According to an example embodiment, the message rejecting the access request may comprises a wait time parameter. According to an example embodiment, the message may indicate the start of an overload of the core network is a next generation application protocol (NGAP) overload start message indicating a start of an overload control for the one or more CAG identifiers. The message indicating the start of the overload of the core network further may comprise a network identifier. The message indicating the start of the overload of the core network further may comprise a non-public network (NPN) identifier. The message indicating the start of the overload of the core network further may comprise a wait time parameter. According to an example embodiment, the network node of the core network may be an access and mobility management function network element. According to an example embodiment, the network node of the core network may be a session management function network element. According to an example embodiment, the network node of the core network may be an operations, administration and maintenance network element. According to an example embodiment, the base station may receive from the network node of the core network, a message indicating a stop of an overload of the core network comprising the one or more CAG identifiers. According to an example embodiment, the base station may determine to accept the access request based on the CAG identifier being one of the one or more CAG identifiers in the message indicating the stop of the overload of the core network. According to an example embodiment, a message accepting the access request may be transmitted to the wireless device.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   receiving, by a base station from an access and mobility management function (AMF) of a core network, a message indicating a start of an overload of the core network, the message comprising a first closed access group identifier (CAG ID);
   sending, by the base station to a wireless device and based on the overload of the core network, barring information indicating that access via a first closed access group associated with the first CAG ID is barred; and
   receiving, by the base station from the wireless device and during a time duration associated with the barring information, an access request associated with a second closed access group.

2. The method of claim 1, wherein the message comprises a public land mobile network identifier (PLMN ID).

3. The method of claim 1, wherein the message comprises a non-public network identifier (NPN ID).

4. The method of claim 1, wherein the sending the barring information to the wireless device comprises broadcasting the barring information in a system information block (SIB).

5. The method of claim 1, wherein the barring information comprises a time duration parameter indicating the time duration associated with the barring information.

6. The method of claim 5, further comprising not receiving, by the base station from the wireless device and during the time duration, an access request associated with the first closed access group.

7. The method of claim 5, further comprising:
   receiving, by the base station from the wireless device and during the time duration, an access request associated with the first closed access group; and sending, to the wireless device, a rejection message indicating that the access request is rejected.

8. The method of claim 5, further comprising:
receiving, by the base station from the wireless device and after the time duration, an access request associated with the first closed access group; and
sending, to the wireless device, an acceptance message indicating that the access request is accepted.

9. The method of claim 5, wherein:
the base station receives the access request associated with the second closed access group from the wireless device during the time duration; and
the base station sends, to the wireless device based on the message not comprising a second CAG ID associated with the second closed access group, an acceptance message indicating that the access request is accepted.

10. The method of claim 1, further comprising:
receiving, by the base station from the AMF, a second message indicating a stop of the overload of the core network; and
sending, by the base station to the wireless device and based on the stop of the overload of the core network, barring information that does not comprise an indication that access via the first closed access group associated is barred.

11. A base station comprising:
one or more processors; and
memory storing instructions that, when executed by the one or more processors, cause the base station to:
receive, from an access and mobility management function (AMF) of a core network, a message indicating a start of an overload of the core network, the message comprising a first closed access group identifier (CAG ID);
send, to a wireless device and based on the overload of the core network, barring information indicating that access via a first closed access group associated with the first CAG ID is barred; and
receive, from the wireless device and during a time duration associated with the barring information, an access request associated with a second closed access group.

12. The base station of claim 11, wherein the message comprises one or more of:
a public land mobile network identifier (PLMN ID); and
a non-public network identifier (NPN ID).

13. The base station of claim 11, wherein to send the barring information to the wireless device, the instructions further cause the base station to broadcast the barring information in a system information block (SIB).

14. The base station of claim 11, wherein the barring information comprises a time duration parameter indicating the time duration associated with the barring information.

15. The base station of claim 14, wherein the instructions further cause the base station to not receive, from the wireless device and during the time duration, an access request associated with the first closed access group.

16. The base station of claim 14, wherein the instructions further cause the base station to:

receive, from the wireless device and during the time duration, an access request associated with the first closed access group; and
send, to the wireless device, a rejection message indicating that the access request is rejected.

17. The base station of claim 14, wherein the instructions further cause the base station to:
receive, by the base station from the wireless device and after the time duration, an access request associated with the first closed access group; and
send, to the wireless device, an acceptance message indicating that the access request is accepted.

18. The base station of claim 14, wherein the instructions further cause the base station to:
receive the access request associated with the second closed access group from the wireless device during the time duration; and
send, to the wireless device based on the message not comprising a second CAG ID associated with the second closed access group, an acceptance message indicating that the access request is accepted.

19. The base station of claim 11, wherein the instructions further cause the base station to:
receive, by the base station from the AMF, a second message indicating a stop of the overload of the core network; and
send, to the wireless device and based on the stop of the overload of the core network, barring information that does not comprise an indication that access via the first closed access group associated is barred.

20. A system comprising:
a base station comprising:
one or more first processors; and
first memory storing first instructions that, when executed by the one or more first processors, cause the base station to:
receive, from an access and mobility management function (AMF) of a core network, a message indicating a start of an overload of the core network, the message comprising a first closed access group identifier (CAG ID);
send, to a wireless device and based on the overload of the core network, barring information indicating that access via a first closed access group associated with the first CAG ID is barred; and
receive, from the wireless device and during a time duration associated with the barring information, an access request associated with a second closed access group; and
the wireless device, wherein the wireless device comprises:
one or more second processors; and
second memory storing second instructions that, when executed by the one or more second processors, cause the wireless device to receive the barring information; and
send, to the base station, the access request associated with the second closed access group.

* * * * *